(12) United States Patent
Park et al.

(10) Patent No.: US 12,200,261 B2
(45) Date of Patent: Jan. 14, 2025

(54) IMAGE DECODING DEVICE USING TOOL SET AND IMAGE DECODING METHOD THEREBY, AND IMAGE CODING DEVICE AND IMAGE CODING METHOD THEREBY

(71) Applicant: SAMSUNG ELECTRONICS CO., LTD., Suwon-si (KR)

(72) Inventors: Minwoo Park, Suwon-si (KR); Minsoo Park, Suwon-si (KR); Kiho Choi, Suwon-si (KR); Yinji Piao, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/689,641

(22) Filed: Mar. 8, 2022

(65) Prior Publication Data

US 2022/0217409 A1 Jul. 7, 2022

Related U.S. Application Data

(63) Continuation of application No. PCT/KR2020/012259, filed on Sep. 10, 2020.
(Continued)

(51) Int. Cl.
*H04N 19/70* (2014.01)
*H04N 19/124* (2014.01)
(Continued)

(52) U.S. Cl.
CPC ........... *H04N 19/70* (2014.11); *H04N 19/124* (2014.11); *H04N 19/159* (2014.11); *H04N 19/52* (2014.11); *H04N 19/593* (2014.11); *H04N 19/60* (2014.11)

(58) Field of Classification Search
CPC .... H04N 19/70; H04N 19/124; H04N 19/159; H04N 19/52; H04N 19/593; H04N 19/60;
(Continued)

(56) References Cited

U.S. PATENT DOCUMENTS

| 9,414,055 B2 | 8/2016 | Han et al. |
| 10,277,894 B2 | 4/2019 | Gisquet et al. |

(Continued)

FOREIGN PATENT DOCUMENTS

| CN | 105532000 A | 4/2016 |
| CN | 106489267 A | 3/2017 |

(Continued)

OTHER PUBLICATIONS

Communication dated Oct. 21, 2022 issued by the Korean Intellectual Property Office in application No. 10-2020-0116390.
(Continued)

*Primary Examiner* — Matthew K Kwan
(74) *Attorney, Agent, or Firm* — Sughrue Mion, PLLC

(57) ABSTRACT

An image decoding method includes: obtaining, from a bitstream, first coding tool enable flag information of a first coding tool, indicating whether or not the first coding tool is applicable to an image sequence; obtaining, from the bitstream, second coding tool enable flag information of at least one second coding tool related to the first coding tool, based on the obtained first coding tool enable flag information; identifying at least one coding tool of the first coding tool and the second coding tool that is applicable to the image sequence included in the bitstream, based on at least one of the first coding tool enable flag information and the second coding tool enable flag information; and performing decoding on the image sequence based on the identified at least one coding tool.

4 Claims, 37 Drawing Sheets

Related U.S. Application Data

(60) Provisional application No. 62/956,697, filed on Jan. 3, 2020, provisional application No. 62/898,197, filed on Sep. 10, 2019.

(51) Int. Cl.
  *H04N 19/159* (2014.01)
  *H04N 19/52* (2014.01)
  *H04N 19/593* (2014.01)
  *H04N 19/60* (2014.01)

(58) Field of Classification Search
  CPC .... H04N 19/117; H04N 19/119; H04N 19/12; H04N 19/174; H04N 19/179; H04N 19/157; H04N 19/184; H04N 19/42; H04N 19/176
  USPC ................................................. 375/240.03
  See application file for complete search history.

(56) References Cited

U.S. PATENT DOCUMENTS

| | | | |
|---|---|---|---|
| 10,623,774 | B2 | 4/2020 | Zhao et al. |
| 10,979,732 | B2 | 4/2021 | Chen et al. |
| 2015/0023414 | A1 | 1/2015 | Han et al. |
| 2015/0103914 | A1 | 4/2015 | Xu et al. |
| 2015/0103925 | A1 | 4/2015 | Chen et al. |
| 2016/0227244 | A1 | 8/2016 | Rosewarne |
| 2017/0078683 | A1 | 3/2017 | Seregin et al. |
| 2017/0118484 | A1 | 4/2017 | Maeda et al. |
| 2017/0280162 | A1 | 9/2017 | Zhao et al. |
| 2018/0041762 | A1 | 2/2018 | Ikai et al. |
| 2019/0238839 | A1* | 8/2019 | Ikeda ............... H04N 19/11 |
| 2019/0273935 | A1 | 9/2019 | Li et al. |
| 2020/0154139 | A1 | 5/2020 | Hannuksela |
| 2021/0014535 | A1* | 1/2021 | Rusanovskyy ........ H04N 19/12 |
| 2021/0392336 | A1 | 12/2021 | Tamse et al. |
| 2022/0182669 | A1* | 6/2022 | Zhu ............... H04N 19/157 |

FOREIGN PATENT DOCUMENTS

| | | |
|---|---|---|
| JP | 2018534827 A | 11/2018 |
| KR | 1020110044487 A | 4/2011 |
| KR | 101743665 B1 | 6/2017 |
| KR | 1020170107503 A | 9/2017 |
| KR | 1020170142973 A | 12/2017 |
| KR | 1020180120200 A | 11/2018 |
| KR | 1020190055109 A | 5/2019 |

OTHER PUBLICATIONS

Communication date Jul. 20, 2022 issued by the Korean Intellectual Property in Korean Patent Application No.

Xin Zhao et al., "Non-CE6: Configurable max transform size in VVC", (JVET-N0362-v2), JVET of ITU-T SG 16 WP 3 and ISO/IEC JTC 1/SC29/WG 11 14th Meeting: Geneva, CH, (May 17, 2019), Total 8 pages.

International Search Report (PCT/ISA/210) dated Dec. 3, 2020 issued by the International Searching Authority in International Application No. PCT/KR2020/012259.

David Flynn et al., "High Efficiency Video Coding (HEVC) Range Extensions text specification: Draft 4", Joint Collaborative Team on Video Coding (JCT-VC) of ITU-T SG 16 WP 3 and ISO/IEC JTC 1/SC 29/WG 11, JCTVC-N1005_v1, Apr. 2013, 324 pages.

Adarsh K. Ramasubramonian et al., "MV-HEVC/SHVC HLS: On parameter sets", Joint Collaborative Team on Video Coding (JCT-VC) of ITU-T SG 16 WP 3 and ISO/IEC JTC 1/SC 29/WG 11, JCTVC-O0214, Joint Collaborative Team on 3D Video Coding Extensions of ITU-T SG 16 WP 3 and ISO/IEC JTC 1/SC 29/WG 11, JCT3V-F0074, Oct. 2013, 12 pages.

David Flynn et al., "High Efficiency Video Coding (HEVC) Range Extensions text specification: Draft 5" Joint Collaborative Team on Video Coding (JCT-VC) of ITU-T SG 16 WP 3 and ISO/IEC JTC 1/SC 29/WG 11, JCTVC-O1005_v4, Oct. 2013, 393 pages.

Jill Boyce, "Conditional SPS extension syntax for RExt, SHVC, and MV-HEVC," Joint Collaborative Team on Video Coding (JCT-VC) of ITU-T SG 16 WP 3 and ISO/IEC JTC 1/SC 29/WG 11, JCTVC-O0142, Joint Collaborative Team on 3D Video Coding Extensions of ITU-T SG 16 WP 3 and ISO/IEC JTC 1/SC 29/WG 11, JCT3V-F0055, Oct. 2013, 5 pages.

Office Action issued Apr. 4, 2023 by the Chinese Patent Office in corresponding CN Patent Application No. 202080075857.3.

Office Action dated Sep. 25, 2023, issued by Chinese Patent Office in Chinese Patent Application No. 202080075857.3.

Extended European Search Report dated Aug. 8, 2023, issued by European Patent Office in European Patent Application No. 20863217.4.

Flynn, "High Efficiency Video Coding (HEVC) Range Extensions text specification: Draft 4", Joint Collaborative Team on Video Coding (JCT-VC) of ITU-T SG 16 WP 3 and ISO/IEC JTC 1/SC 29/WG 11, Aug. 8, 2013, 12 total pages.

Choi et al., "Working Draft 2 of Essential Video Coding", Motion Picture Expert Group or ISO/IEC JTC1/SC29/WG11, May 17, 2019, 235 total pages.

Piao et al., "[EVC] Suggested profile setting for EVC main profile", Motion Picture Group or ISO/IEC JTC1/SC29/WG11, Jan. 9, 2020, 6 total pages.

Communication issued on Dec. 28, 2023 by the China National Intellectual Property Administration for Chinese Patent Application No. 202080075857.3.

Communication issued on Jan. 23, 2024 by the Intellectual Property India for Indian Patent Application No. 202247016872.

Communication issued on Jul. 22, 2024 by the China National Intellectual Property Administration for Chinese Patent Application No. 202080075857.3.

\* cited by examiner

FIG. 4
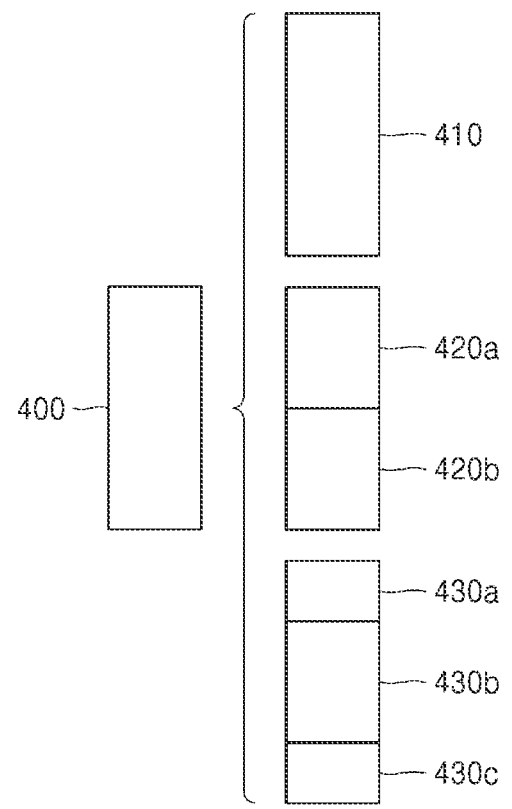
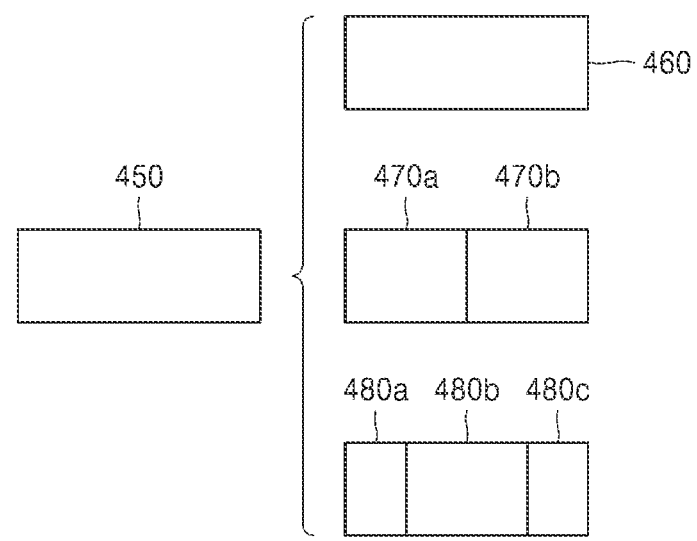

FIG. 13

| BLOCK SHAPE<br>DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 17

| SQUARE BLOCK | |
|---|---|
| (00)b | □ |
| (01)b | ⊞ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 18

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 22

| tools_idc binIdx | SPS tool flag | Tool on | Tool off |
|---|---|---|---|
| 0 | sps_btt_flag | BTT | QT |
| 1 | sps_suco_flag | SUCO | n/a |
| 2 | sps_amvr_flag | AMVR | n/a |
| 3 | sps_mmvd_flag | MMVD | n/a |
| 4 | sps_affine_flag | AFFINE | n/a |
| 5 | sps_dmvr_flag | DMVR | n/a |
| 6 | sps_alf_flag | ALF | n/a |
| 7 | sps_admvp_flag | Main_Merge, HMVP | Baseline_Merge (Direct) |
| 8 | sps_eipd_flag | Intra 33 prediction modes | Intra 5 prediction modes |
| 9 | sps_adcc_flag | Advanced coefficient coding | Run-length based coefficient coding |
| 10 | sps_amis_flag | Main_SKIP, Main_interpolation, Memory BW handling | Baseline_SKIP, Baseline_interpolation |
| 11 | sps_ibc_flag | IBC | n/a |
| 12 | sps_iqt_flag | Main_quantization and transform | Baseline_quantization and transform |
| 13 | sps_htdf_flag | HTDF | n/a |
| 14 | sps_addb_flag | Advanced deblocking filter | H.263 deblocking filter |
| 15 | sps_cm_init_flag | Using context modeling with initialization values | One context modeling with 256 values |
| 16 | sps_ats_flag | ATS | n/a |
| 17 | sps_rpl_flag | RPL | Sliding window method |
| 18 | sps_pocs_flag | Explicit PoC | Implicit PoC |
| 19 | sps_dquant_flag | Area based dQP | CU based dQP |
| 20~31 | Reserved for future use by ISO/IEC. | n/a | n/a |

FIG. 23A

| BIT INDEX | TOOL |
|---|---|
| 0 | btt |
| 1 | suco |
| 2 | amvr |
| 3 | mmvd |
| 4 | affine |
| 5 | dmvr |
| 6 | alf |
| 7 | admvp |
| 8 | eipd |
| 9 | adcc |
| 10 | ibc |
| 11 | iqt |
| 12 | htdf |
| 13 | addb |
| 14 | cm_init |
| 15 | ats |
| 16 | rpl |
| 17 | pocs |
| 18 | dquant |
| 19 | dra |
| 20 | hmvp |
| 21 ··· 31 | reserved |

FIG. 23B

| BIT INDEX | SPS tool flag | Conformance requirement |
|---|---|---|
| 0 | sps_btt_flag | sps_btt_flag <= toolset_idc_h & 0x1 && <br> sps_btt_flag >= toolset_idc_l & 0x1 |
| 1 | sps_suco_flag | sps_suco_flag <= ( toolset_idc_h & 0x2 ) >> 1 && <br> sps_suco_flag >= ( toolset_idc_l & 0x2 ) >> 1 |
| 2 | sps_amvr_flag | sps_amvr_flag <= ( toolset_idc_h & 0x4 ) >> 2 && <br> sps_amvr_flag >= ( toolset_idc_l & 0x4 ) >> 2 |
| 3 | sps_mmvd_flag | sps_mmvd_flag <= ( toolset_idc_h & 0x8 ) >> 3 && <br> sps_mmvd_flag >= ( toolset_idc_l & 0x8 ) >> 3 |
| 4 | sps_affine_flag | sps_affine_flag <= ( toolset_idc_h & 0x10 ) >> 4 && <br> sps_affine_flag >= ( toolset_idc_l & 0x10 ) >> 4 |
| 5 | sps_dmvr_flag | sps_dmvr_flag <= ( toolset_idc_h & 0x20 ) >> 5 && <br> sps_dmvr_flag >= ( toolset_idc_l & 0x20 ) >> 5 |
| 6 | sps_alf_flag | sps_alf_flag <= ( toolset_idc_h & 0x40 ) >> 6 && <br> sps_alf_flag >= ( toolset_idc_l & 0x40 ) >> 6 |
| 7 | sps_admvp_flag | sps_admvp_flag <= ( toolset_idc_h & 0x80 ) >> 7 && <br> sps_admvp_flag >= ( toolset_idc_l & 0x80 ) >> 7 |
| ⋮ | ⋮ | ⋮ |
| 14 | sps_cm_init_flag | sps_cm_init_flag <= ( toolset_idc_h & 0x4000 ) >>14 && <br> sps_cm_init_flag >= ( toolset_idc_l & 0x4000 ) >>14 |
| 15 | sps_ats_flag | sps_ats_flag <= ( toolset_idc_h & 0x8000 ) >> 15 && <br> sps_ats_flag >= ( toolset_idc_l & 0x8000 ) >> 15 |
| 16 | sps_rpl_flag | sps_rpl_flag <= ( toolset_idc_h & 0x10000 ) >> 16 && <br> sps_rpl_flag >= ( toolset_idc_l & 0x10000 ) >> 16 |
| 17 | sps_pocs_flag | sps_pocs_flag <= ( toolset_idc_h & 0x20000 ) >> 17 && <br> sps_pocs_flag >= ( toolset_idc_l & 0x20000 ) >> 17 |
| 18 | sps_dquant_flag | sps_dquant_flag <= ( toolset_idc_h & 0x40000 ) >> 18 && <br> sps_dquant_flag >= ( toolset_idc_l & 0x40000 ) >> 18 |
| 19 | sps_dra_flag | sps_dra_flag <= ( toolset_idc_h & 0x80000 ) >> 19 && <br> sps_dra_flag >= ( toolset_idc_l & 0x80000 ) >> 19 |
| 20 | sps_hmvp_flag | sps_hmvp_flag <= ( toolset_idc_h & 0x100000 ) >> 20 && <br> sps_hmvp_flag >= ( toolset_idc_l & 0x100000 ) >> 20 |
| 21 ⋯ 31 | Reserved | |

FIG. 23C

| binIdx BIT INDEX | SPS tool flag | Conformance requirement |
|---|---|---|
| 0 | sps_btt_flag | sps_btt_flag <= toolset_idc & 0x1 |
| 1 | sps_suco_flag | sps_suco_flag <= toolset_idc & 0x2 |
| 2 | sps_amvr_flag | sps_amvr_flag <= toolset_idc & 0x4 |
| 3 | sps_mmvd_flag | sps_mmvd_flag <= toolset_idc & 0x8 |
| 4 | sps_affine_flag | sps_affine_flag <= toolset_idc & 0x10 |
| 5 | sps_dmvr_flag | sps_dmvr_flag <= toolset_idc & 0x20 |
| 6 | sps_alf_flag | sps_alf_flag <= toolset_idc & 0x40 |
| 7 | sps_admvp_flag | sps_admvp_flag <= toolset_idc & 0x80 |
| 8 | sps_eipd_flag | sps_eipd_flag <= toolset_idc & 0x100 |
| 9 | sps_adcc_flag | sps_adcc_flag <= toolset_idc & 0x200 |
| 10 | sps_ibc_flag | sps_ibc_flag <= toolset_idc & 0x400 |
| 11 | sps_iqt_flag | sps_iqt_flag <= toolset_idc & 0x800 |
| 12 | sps_htdf_flag | sps_htdf_flag <= toolset_idc & 0x1000 |
| 13 | sps_addb_flag | sps_addb_flag <= toolset_idc & 0x2000 |
| 14 | sps_cm_init_flag | sps_cm_init_flag <= toolset_idc & 0x4000 |
| 15 | sps_ats_flag | sps_ats_flag <= toolset_idc & 0x8000 |
| 16 | sps_rpl_flag | sps_rpl_flag <= toolset_idc & 0x10000 |
| 17 | sps_pocs_flag | sps_pocs_flag <= toolset_idc & 0x20000 |
| 18 | sps_dquant_flag | sps_dquant_flag <= toolset_idc & 0x4000 |
| 19...31 | Reserved for future use by ISO/IEC. | Reserved for future use by ISO/IEC. |

FIG. 24A

| coding_unit( x0, y0, log2CbWidth, log2CbHeight, ctDepth, cuQpDeltaCode ) { | Descripto |
|---|---|
| if( slice_type != I && ! ( sps_admvp_flag && log2CbWidth == 2 && log2CbHeight == 2 ) ) | |
|   cu_skip_flag[ x0 ][ y0 ] | ae(v) |
| if( cu_skip_flag[ x0 ][ y0 ] ) { | |
|   if( sps_mmvd_flag ) | |
|     mmvd_flag[ x0 ][ y0 ] | ae(v) |
|   if( mmvd_flag[ x0 ][ y0 ] ) { | |
|     if( mmvd_group_enable_flag && log2CbWidth + log2CbHeight > 5 ) | |
|       mmvd_group_idx[ x0 ][ y0 ] | ae(v) |
|     mmvd_merge_idx[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { | |
|     if( sps_affine_flag && log2CbWidth >= 3 && log2CbHeight >= 3) | |
|       affine_flag[ x0 ][ y0 ] | ae(v) |
|     if( affine_flag[ x0 ][ y0 ] ) | |
|       affine_merge_idx[ x0 ][ y0 ] | ae(v) |
|     else { | |
|       if( !sps_admvp_flag ) { | |
|         mvp_idx_l0[ x0 ][ y0 ] | ae(v) |
|         if( slice_type != B ) | |
|           mvp_idx_l1[ x0 ][ y0 ] | ae(v) |
|       } else | |
|         merge_idx[ x0 ][ y0 ] | ae(v) |
|     } | |
|   } | |

FIG. 24B

| | |
|---|---|
| else { | |
| if( slice_type != I && | |
| ! ( !sps_ibc_enabled_flag && sps_admvp_flag | |
| && log2CbWidth = = 2 && log2CbHeight = = 2 ) ) | |
| pred_mode_flag[ x0 ][ y0 ] | ae(v) |
| if( sps_ibc_enabled_flag && log2CbWidth < = log2MaxIbcCandSize && | |
| log2CbHeight < = log2MaxIbcCandSize && | |
| ( slice_type = = I \|\| CuPredMode[ x0 ][ y0 ] != MODE_INTRA ) ) | |
| ibc_flag[ x0 ][ y0 ] | ae(v) |
| if( CuPredMode[ x0 ][ y0 ] = = MODE_INTRA ) { | |
| if( !sps_eipd_flag) | |
| intra_pred_mode[ x0 ][ y0 ] | ae(v) |
| else if( sps_eipd_flag = = 1 ) { | |
| intra_luma_pred_mpm_flag[ x0 ][ y0 ] | ae(v) |
| if( intra_luma_pred_mpm_flag[ x0 ][ y0 ] ) | |
| intra_luma_pred_mpm_idx[ x0 ][ y0 ] | ae(v) |
| else { | |
| intra_luma_pred_pims_flag[ x0 ][ y0 ] | ae(v) |
| if( intra_luma_pred_pims_flag[ x0 ][ y0 ] ) | |
| intra_luma_pred_pims_idx[ x0 ][ y0 ] | ae(v) |
| else | |
| intra_luma_pred_rem_mode[ x0 ][ y0 ] | ae(v) |
| } | |
| if( ChromaArrayType != 0 ) | |
| intra_chroma_pred_mode[ x0 ][ y0 ] | ae(v) |
| } | |
| } | |

FIG. 24C

| | |
|---|---|
| else { /* (CuPredMode[ x0 ][ y0 ] != MODE_INTRA) */ | |
|   if( ibc_flag ) | |
|   { | |
|     abs_mvd_l0[ x0 ][ y0 ][ 0 ] | ae(v) |
|     if( abs_mvd_l0[ x0 ][ y0 ][ 0 ] ) | |
|       mvd_l0_sign_flag[ x0 ][ y0 ][ 0 ] | ae(v) |
|     abs_mvd_l0[ x0 ][ y0 ][ 1 ] | ae(v) |
|     if( abs_mvd_l0[ x0 ][ y0 ][ 1 ] ) | |
|       mvd_l0_sign_flag[ x0 ][ y0 ][ 1 ] | ae(v) |
|   } | |
|   else{ | |
|     if( sps_amvr_flag ) | |
|       amvr_idx[ x0 ][ y0 ] | ae(v) |
|     if( slice_type == B && sps_admvp_flag == 0 ) | |
|       direct_mode_flag[ x0 ][ y0 ] | ae(v) |
|     else if( sps_admvp_flag == 1 ) { | |
|       if( amvr_idx[ x0 ][ y0 ] == 0 ) | |
|         merge_mode_flag[ x0 ][ y0 ] ) { | ae(v) |
|       if( merge_mode_flag[ x0 ][ y0 ] ) { | |
|         if( sps_mmvd_flag ) | |
|           mmvd_flag[ x0 ][ y0 ] | ae(v) |
|         if( mmvd_flag[ x0 ][ y0 ] ) { | |
|           if( mmvd_group_enable_flag && log2CbWidth + log2CbHeight > 5 ) | |
|             mmvd_group_idx[ x0 ][ y0 ] | ae(v) |
|           mmvd_merge_idx[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } | |
|         else { | |
|           if( sps_affine_flag && log2CbWidth >= 3 && log2CbHeight >= 3 ) | |
|             affine_flag[ x0 ][ y0 ] | ae(v) |
|           if( affine_flag[ x0 ][ y0 ] ) | |
|             affine_merge_idx[ x0 ][ y0 ] | ae(v) |
|           else | |
|             merge_idx[ x0 ][ y0 ] | ae(v) |
|         } | |
|       } | |
|     } | |

FIG. 24D

| | |
|---|---|
| if( direct_mode_flag[ x0 ][ y0 ] == 0 && merge_mode_flag[ x0 ][ y0 ] == 0 ) { | |
|   if( slice_type == B) | |
|   } | |
|     inter_pred_idc[ x0 ][ y0 ] | ae(v) |
|   if( sps_admvp_flag == 0 ) { | |
|     if( inter_pred_idc[ x0 ][ y0 ] != PRED_L1 ) { | |
|       if( num_ref_idx_active_minus1[ 0 ] > 0 ) | |
|         ref_idx_l0[ x0 ][ y0 ] | ae(v) |
|       mvp_idx_l0[ x0 ][ y0 ] | ae(v) |
|       abs_mvd_l0[ x0 ][ y0 ][ 0 ] | ae(v) |
|       if( abs_mvd_l0[ x0 ][ y0 ][ 0 ] ) | |
|         mvd_l0_sign_flag[ x0 ][ y0 ][ 0 ] | ae(v) |
|       abs_mvd_l0[ x0 ][ y0 ][ 1 ] | ae(v) |
|       if( abs_mvd_l0[ x0 ][ y0 ][ 1 ] ) | |
|         mvd_l0_sign_flag[ x0 ][ y0 ][ 1 ] | ae(v) |
|     } | |
|     if( inter_pred_idc[ x0 ][ y0 ] != PRED_L0 ) { | |
|       if( num_ref_idx_active_minus1[ 1 ] > 0 ) | |
|         ref_idx_l1[ x0 ][ y0 ] | ae(v) |
|       mvp_idx_l1[ x0 ][ y0 ] | ae(v) |
|       abs_mvd_l1[ x0 ][ y0 ][ 0 ] | ae(v) |
|       if( abs_mvd_l1[ x0 ][ y0 ][ 0 ] ) | |
|         mvd_l1_sign_flag[ x0 ][ y0 ][ 0 ] | ae(v) |
|       abs_mvd_l1[ x0 ][ y0 ][ 1 ] | ae(v) |
|       if( abs_mvd_l1[ x0 ][ y0 ][ 1 ] ) | |
|         mvd_l1_sign_flag[ x0 ][ y0 ][ 1 ] | ae(v) |
|     } | |
|   } | |
|   else if( sps_admvp_flag == 1 ) { | |
|     if( sps_affine_flag && log2CbWidth >= 4 && log2CbHeight >= 4 && | |
|       amvr_idx[ x0 ][ y0 ] == 0 ) | |
|       affine_flag[ x0 ][ y0 ] | ae(v) |
|     if( affine_flag[ x0 ][ y0 ] ) { | |
|       affine_mode_flag[ x0 ][ y0 ] | ae(v) |
|       vertexNum = 1+ affine_flag[ x0 ][ y0 ] + affine_mode_flag[ x0 ][ y0 ] | |
|       if( inter_pred_idc[ x0 ][ y0 ] != PRED_L1 \|\| | |
|         inter_pred_idc[ x0 ][ y0 ] == PRED_BI) { | |
|         ref_idx_l0[ x0 ][ y0 ] | ae(v) |
|         affine_mvp_flag_l0[ x0 ][ y0 ] | ae(v) |
|         affine_mvd_flag_l0[ x0 ][ y0 ] | ae(v) |
|         for( vertex = 0; vertex < vertexNum; vertex++ ) { | |
|           if ( affine_mvd_flag_l0[ x0 ][ y0 ] ) { | |
|             abs_mvd_l0[ vertex ][ 0 ][ x0 ][ y0 ] | ae(v) |
|             if( abs_mvd_l0[ vertex ][ 0 ][ x0 ][ y0 ] ) | |
|               mvd_l0_sign_flag[ vertex ][ 0 ][ x0 ][ y0 ] | ae(v) |
|             abs_mvd_l0[ vertex ][ 1 ][ x0 ][ y0 ] | ae(v) |
|             if( abs_mvd_l0[ vertex ][ 1 ][ x0 ][ y0 ] ) | |
|               mvd_l0_sign_flag[ vertex ][ 1 ][ x0 ][ y0 ] | ae(v) |
|           } | |
|         } | |
|       } | |

FIG. 24E

Specification of the luma interpolation filter coefficients f_L[ p ] for each 1/16 fractional sample position p for sps_admvp_flag == 1

| Fractional sample position p | f_L[p][0] | f_L[p][1] | f_L[p][2] | f_L[p][3] | f_L[p][4] | f_L[p][5] | f_L[p][6] | f_L[p][7] |
|---|---|---|---|---|---|---|---|---|
| | | | | interpolation filter coefficients | | | | |
| 1 | 0 | 1 | -3 | 63 | 4 | -2 | 1 | 0 |
| 2 | -1 | 2 | -5 | 62 | 8 | -3 | 1 | 0 |
| 3 | -1 | 3 | -8 | 60 | 13 | -4 | 1 | 0 |
| 4 | -1 | 4 | -10 | 58 | 17 | -5 | 1 | -1 |
| 5 | -1 | 4 | -11 | 52 | 26 | -8 | 3 | -1 |
| 6 | -1 | 3 | -9 | 47 | 31 | -10 | 4 | -1 |
| 7 | -1 | 4 | -11 | 45 | 34 | -10 | 4 | -1 |
| 8 | -1 | 4 | -11 | 40 | 40 | -11 | 4 | -1 |
| 9 | -1 | 4 | -10 | 34 | 45 | -11 | 4 | -1 |
| 10 | -1 | 4 | -10 | 31 | 47 | -11 | 4 | -1 |
| 11 | -1 | 3 | -8 | 26 | 52 | -10 | 4 | -1 |
| 12 | 0 | 1 | -5 | 17 | 58 | -8 | 3 | -1 |
| 13 | 0 | 1 | -4 | 13 | 60 | -4 | 3 | -1 |
| 14 | 0 | 1 | -3 | 8 | 62 | -5 | 2 | -1 |
| 15 | 0 | 1 | -2 | 4 | 63 | -3 | 1 | 0 |

FIG. 24F

Specification of the luma interpolation filter coefficients $f_L[p]$ for each 1/16 fractional sample position p for sps_admvp_flag == 0

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | n/a | n/a | n/a | n/a | n/a | n/a | n/a | n/a |
| 2 | n/a | n/a | n/a | n/a | n/a | n/a | n/a | n/a |
| 3 | n/a | n/a | n/a | n/a | n/a | n/a | n/a | n/a |
| 4 | 0 | 1 | -5 | 52 | 20 | -5 | 1 | 0 |
| 5 | n/a | n/a | n/a | n/a | n/a | n/a | n/a | n/a |
| 6 | n/a | n/a | n/a | n/a | n/a | n/a | n/a | n/a |
| 7 | n/a | n/a | n/a | n/a | n/a | n/a | n/a | n/a |
| 8 | 0 | 1 | -5 | 40 | 40 | -10 | 2 | 0 |
| 9 | n/a | n/a | n/a | n/a | n/a | n/a | n/a | n/a |
| 10 | n/a | n/a | n/a | n/a | n/a | n/a | n/a | n/a |
| 11 | n/a | n/a | n/a | n/a | n/a | n/a | n/a | n/a |
| 12 | 0 | 1 | -5 | 20 | 52 | -5 | 1 | 0 |
| 13 | n/a | n/a | n/a | n/a | n/a | n/a | n/a | n/a |
| 14 | n/a | n/a | n/a | n/a | n/a | n/a | n/a | n/a |
| 15 | n/a | n/a | n/a | n/a | n/a | n/a | n/a | n/a |

FIG. 24G

Specification of the chroma interpolation filter coefficients $f_c[\,p\,]$ for each 1/32 fractional sample position p for sps_admvp_flag == 1

| Fractional sample position p | interpolation filter coefficients | | | |
|---|---|---|---|---|
| | $f_c[\,p\,][\,0\,]$ | $f_c[\,p\,][\,1\,]$ | $f_c[\,p\,][\,2\,]$ | $f_c[\,p\,][\,3\,]$ |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

FIG. 24H

Specification of the chroma interpolation filter coefficients $f_c[\,p\,]$ for each 1/32 fractional sample position p for sps_admvp_flag == 0

| Fractional sample position p | interpolation filter coefficients | | | |
|---|---|---|---|---|
| | $f_c[\,p\,][\,0\,]$ | $f_c[\,p\,][\,1\,]$ | $f_c[\,p\,][\,2\,]$ | $f_c[\,p\,][\,3\,]$ |
| 1 | n/a | n/a | n/a | n/a |
| 2 | n/a | n/a | n/a | n/a |
| 3 | n/a | n/a | n/a | n/a |
| 4 | −2 | 58 | 10 | −2 |
| 5 | n/a | n/a | n/a | n/a |
| 6 | n/a | n/a | n/a | n/a |
| 7 | n/a | n/a | n/a | n/a |
| 8 | −4 | 52 | 20 | −4 |
| 9 | n/a | n/a | n/a | n/a |
| 10 | n/a | n/a | n/a | n/a |
| 11 | n/a | n/a | n/a | n/a |
| 12 | −6 | 46 | 30 | −6 |
| 13 | n/a | n/a | n/a | n/a |
| 14 | n/a | n/a | n/a | n/a |
| 15 | n/a | n/a | n/a | n/a |
| 16 | −8 | 40 | 40 | −8 |
| 17 | n/a | n/a | n/a | n/a |
| 18 | n/a | n/a | n/a | n/a |
| 19 | n/a | n/a | n/a | n/a |
| 20 | −4 | 28 | 46 | −6 |
| 21 | n/a | n/a | n/a | n/a |
| 22 | n/a | n/a | n/a | n/a |
| 23 | n/a | n/a | n/a | n/a |
| 24 | −4 | 20 | 52 | −4 |
| 25 | n/a | n/a | n/a | n/a |
| 26 | n/a | n/a | n/a | n/a |
| 27 | n/a | n/a | n/a | n/a |
| 28 | −2 | 10 | 58 | −2 |
| 29 | n/a | n/a | n/a | n/a |
| 30 | n/a | n/a | n/a | n/a |
| 31 | n/a | n/a | n/a | n/a |

FIG. 24I

Syntax elements and associated binarizations

| inter_pred_idc | Syntax element | Binarization | |
|---|---|---|---|
| | | Process | Input parameters |
| coding_unit( ) | inter_pred_idc[ ][ ] | TR | cMax = (!sps_admvp_flag \|\| nCbW + nCbH > 12 ) ? 2 : 1, cRiceParam = 0 |

IMAGE DECODING DEVICE USING TOOL SET AND IMAGE DECODING METHOD THEREBY, AND IMAGE CODING DEVICE AND IMAGE CODING METHOD THEREBY

CROSS-REFERENCE TO RELATED APPLICATION

This application claims priority from International Patent Application No. PCT/KR2020/012259 filed on Sep. 10, 2020, which claims priority to U.S. Provisional Application No. 62/898,197 filed on Sep. 10, 2019 and U.S. Provisional Application No. 62/956,697 filed on Jan. 3, 2020, in the United States Patent and Trademark Office, the disclosures of which are incorporated herein by reference in their entireties.

TECHNICAL FIELD

The present disclosure relates to the fields of image encoding and decoding. More particularly, the present disclosure relates to a method and apparatus for decoding an image and a method and apparatus for encoding an image, by using a coding tool identified by using a coding tool enable flag.

BACKGROUND ART

In image encoding and decoding, an image is split into blocks, and each block is prediction-encoded and prediction-decoded via inter-prediction or intra-prediction.

Inter-prediction is a technique of compressing images by removing temporal redundancy between the images. In inter-prediction, blocks of a current image are predicted by using a reference image. A reference block that is most similar to a current block may be searched in a predetermined search range within the reference image. The current block is predicted based on the reference block, and a prediction block generated as a result of prediction is subtracted from the current block to generate a residual block.

In codecs such as H.264 advanced video coding (AVC) and high efficiency video coding (HEVC), in order to predict a motion vector of a current block, a motion vector of previously encoded blocks adjacent to the current block or a motion vector of blocks included in a previously encoded image is used as a prediction motion vector of the current block. A differential motion vector, which is a difference between the motion vector and the prediction motion vector of the current block, is signaled to a decoder by using a predetermined method.

Intra-prediction is a technique of compressing an image by removing spatial redundancy within the image. In intra-prediction, a prediction block is generated based on neighboring pixels of a current block according to a prediction mode. Also, a residual block is generated by subtracting the prediction block from the current block.

The residual block generated through the inter-prediction or the intra-prediction is transformed and quantized and then transmitted to the decoder. The decoder inversely quantizes and inversely transforms the residual block and reconstructs the current block by adding the prediction block of the current block to the residual block. In predetermined cases, the decoder removes an artifact in the reconstructed current block by filtering the reconstructed current block.

SUMMARY

An image decoding method performed by an image decoding apparatus, according to various embodiments, includes: obtaining, from a bitstream, first coding tool enable flag information of a first coding tool, indicating whether or not the first coding tool is applicable to an image sequence; obtaining, from the bitstream, second coding tool enable flag information of at least one second coding tool related to the first coding tool, based on the obtained first coding tool enable flag information; identifying at least one coding tool of the first coding tool and the second coding tool that is applicable to the image sequence included in the bitstream, based on at least one of the first coding tool enable flag information and the second coding tool enable flag information; and performing decoding on the image sequence based on the identified at least one coding tool.

When the first coding tool enable flag information indicates that the first coding tool is not applicable to the image sequence, the second coding tool enable flag information may not be obtained from the bitstream, and the second coding tool is identified as not being applicable to the image sequence. When the first coding tool enable flag information indicates that the first coding tool is applicable to the image sequence, the second coding tool enable flag information may be obtained from the bitstream.

The second coding tool may be in a dependent relationship with the first coding tool, and may be included in a coding tool group related to the first coding tool.

The first coding tool enable flag information and the second coding tool enable flag information may be obtained from a sequence parameter set.

The first coding tool enable flag information may be enable flag information for enabling a coding tool that operates based on at least one of an advanced motion signaling and interpolation method and an advanced motion vector prediction method, and the second coding tool enable flag information may be enable flag information for enabling a coding tool that operates based on at least one of an affine model-based motion compensation method, an adaptive motion vector resolution method, a decoder-side motion vector refinement method, a merge with motion vector difference method, and a history-based motion vector prediction method.

The first coding tool enable flag information may be enable flag information for enabling a coding tool that operates based on an extended intra prediction mode method, and the second coding tool enable flag information may be enable flag information for enabling a coding tool that operates based on an intra block copy method.

The first coding tool enable flag information may be enable flag information for enabling a coding tool that operates based on a context modeling and initialization process method, and the second coding tool enable flag information may be enable flag information for enabling a coding tool that operates based on an advanced residual coding method.

The first coding tool enable flag information may be enable flag information for enabling a coding tool that operates based on an improved quantization and transform method, and the second coding tool enable flag information may be enable flag information for enabling a coding tool that operates based on at least one of an adaptive transform selection method and an improved delta quantization parameter signaling method.

A sequence parameter set of the bitstream conforming with a main profile indicates a coding tool applicable when a value of the first coding tool enable flag information from among the first coding tool enable flag information and the second coding tool enable flag information is 0, and coding tool enable flag information whose value is always 1 when a coding tool identified when the coding tool enable flag information is 1 is not compatible for a predetermined coding operation.

A sequence parameter set of the bitstream conforming with a baseline profile may include the first coding tool enable flag information always having a value of 0. The second coding tool enable flag information may not be obtained from the sequence parameter set, and a value of the second coding tool enable flag information may be identified as 0.

The image decoding method may further include obtaining, from the bitstream, motion information included in at least one coding unit in a frame of the image sequence, according to a condition based on a value of the first coding tool enable flag information.

The performing of the decoding on the image sequence based on the identified at least one coding tool may include: identifying an interpolation filter according to the value of the first coding tool enable flag information; and performing inter-prediction including motion vector prediction and interpolation with respect to the at least one coding unit according to the motion information and the interpolation filter.

A plurality of pieces of coding tool enable flag information may be pre-classified into a plurality of coding tool groups based on coding operations corresponding to coding tools, and representative flag information of each of the pre-classified coding tool groups may be pre-identified. The first coding tool enable flag information may be the representative flag information of each coding tool group, and the second coding tool enable flag information may be remaining flag information of each coding tool group except for the representative flag information.

When current coding tool enable flag information is dependent on information of a previous coding tool corresponding to previous coding tool enable flag information previously obtained from the bitstream, the current coding tool enable flag information may be obtained from the bitstream, according to a condition based on the information of the previous coding tool.

An image decoding apparatus according to various embodiments includes at least one processor configured to: obtain, from a bitstream, first coding tool enable flag information of a first coding tool indicating whether or not the first coding tool is applicable to an image sequence; obtain, from the bitstream, second coding tool enable flag information of at least one second coding tool related to the first coding tool, based on the obtained first coding tool enable flag information; identify at least one coding tool of the first coding tool and the second coding tool that is applicable to the image sequence included in the bitstream, based on at least one of the first coding tool enable flag information and the second coding tool enable flag information; and perform decoding on the image sequence based on the identified at least one coding tool.

An image encoding method performed by an image encoding apparatus, according to an embodiment, includes: encoding an image sequence based on at least one coding tool from among a plurality of coding tools including a first coding tool and a second coding tool; generating at least one of first coding tool enable flag information indicating whether or not the first coding tool is applicable to the image sequence and second coding tool enable flag information indicating whether or not the second coding tool is applicable to the image sequence; and generating a bitstream including image sequence data including syntax elements generated as a result of the encoding, and a sequence parameter set including at least one of the first coding tool enable flag information and the second coding tool enable flag information, wherein, when a value of the first coding tool enable flag information is 1, the bitstream includes both of the first coding tool enable flag information and the second coding tool enable flag information, and when the value of the first coding tool enable flag information is 0, the bitstream includes the first coding tool enable flag information and may not include the second coding tool enable flag information.

A program for executing a method according to various embodiments may be recorded on a computer-readable recording medium.

According to an image decoding apparatus and method and an image encoding apparatus and method according to an embodiment, hardware may be easily implemented in the image encoding apparatus and the image decoding apparatus, by achieving bit saving with respect to a coding tool enable flag by considering dependency between coding tools, and by always activating one or more tools according to a profile.

However, effects achievable by the image decoding apparatus and method and the image encoding apparatus and method, according to an embodiment, are not limited to those mentioned above, and other effects that are not mentioned could be clearly understood by one of ordinary skill in the art from the following descriptions.

BRIEF DESCRIPTION OF DRAWINGS

A brief description of each drawing is provided to better understand the drawings cited herein.

FIG. 4 illustrates a process of determining at least one coding unit by splitting a non-square coding unit, according to an embodiment.

FIG. 13 illustrates a process of determining a depth of a coding unit as a shape and a size of the coding unit change, when the coding unit is recursively split such that a plurality of coding units are determined, according to an embodiment.

FIG. 17 illustrates various shapes of a coding unit, which may be determined based on split shape mode information represented as a binary code, according to an embodiment.

FIG. 18 illustrates another shape of a coding unit, which may be determined based on split shape mode information represented as a binary code, according to an embodiment.

FIG. 22 is a diagram illustrating a tool flag and a functionality according to value of each tool flag.

FIG. 23A is a table illustrating a tool corresponding to each of bits of a first bit string.

FIG. 23B is an example diagram illustrating a value of tool flags that is restricted according to a value of a first tool set index and a value of a second tool set index.

FIG. 23C is an example diagram illustrating a value of tool flags that is restricted according to a value of a first tool set index, according to an embodiment.

FIGS. 24A through 24D are diagrams illustrating the syntax of a coding unit based on a value of sps_admvp_flag 2310 of Table 3, according to an embodiment.

FIGS. 24E, 24F, 24G, and 24H are diagrams illustrating an interpolation filter based on the value of sps_admvp_flag 2310 of Table 3, according to an embodiment. FIG. 24I is a diagram illustrating a binarization parameter based on the value of sps_admvp_flag 2310 of Table 3.

DETAILED DESCRIPTION

Figure 1:
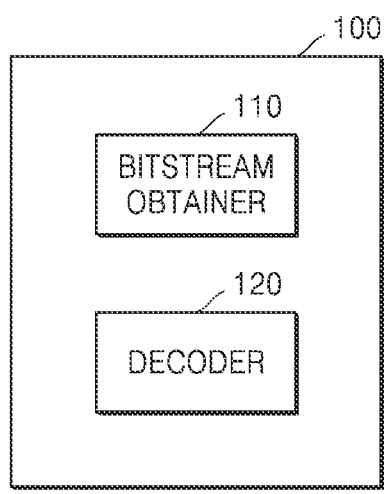
FIG. 1 is a block diagram of an image decoding apparatus according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an "image" or a "picture" may denote a still image of a video or a moving image, i.e., the video itself.

Also, in the present specification, a "sample" or a "signal" denotes data assigned to a sampling position of an image, i.e., data to be processed. For example, pixel values of an image in a spatial domain and transform coefficients on a transform domain may be samples. A unit including at least one such sample may be defined as a block.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

Hereinafter, an image encoding method and apparatus and an image decoding method and apparatus based on a coding unit and a transform unit of a tree structure according to an embodiment are described with reference to FIGS. 1 through 19.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions to be performed by the at least one processor.

The bitstream obtainer 110 may receive a bitstream. The bitstream includes information about image encoding of an image encoding apparatus 200 described later. Also, the bitstream may be transmitted from the image encoding apparatus 200. The image encoding apparatus 200 and the image decoding apparatus 100 may be connected by wire or wirelessly, and the bitstream obtainer 110 may receive the bitstream by wire or wirelessly. The bitstream obtainer 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

To describe the operation of the image decoding apparatus 100 in detail, the bitstream obtainer 110 may receive the bitstream.

The image decoding apparatus 100 may perform an operation of obtaining, from the bitstream, a bin string corresponding to a split shape mode of a coding unit. Also, the image decoding apparatus 100 may perform an operation of determining a split rule of the coding unit. Also, the image decoding apparatus 100 may perform an operation of splitting the coding unit into a plurality of coding units, based on at least one of the bin string corresponding to the split shape mode and the split rule. In order to determine the split rule, the image decoding apparatus 100 may determine a first range of a permissible size of the coding unit according to a ratio between a width and a height of the coding unit. In order to determine the split rule, the image decoding apparatus 100 may determine a second range of the permissible size of the coding unit according to a split shape mode of the coding unit.

Hereinafter, splitting of a coding unit will be described in detail according to an embodiment of the present disclosure.

First, one picture may be split into one or more slices or one or more tiles. One slice or one tile may be a sequence of one or more coding tree units (CTUs). According to an embodiment, one slice may include one or more tiles, and one slice may include one or more CTUs. The slice including one or more tiles may be determined in the picture.

As a concept compared to the CTU, there is a coding tree block (CTB). The CTB denotes N×N blocks including N×N samples (N is an integer). Each color component may be split into one or more CTBs.

When a picture has three sample arrays (sample arrays for Y, Cr, and Cb components), a CTU includes a CTB of a luma sample, two CTBs of chroma samples corresponding to the luma sample, and syntax structures used to encode the luma sample and the chroma samples. When a picture is a monochrome picture, a CTU includes a CTB of a monochrome sample and syntax structures used to encode the monochrome samples. When a picture is a picture encoded in color planes separated according to color components, a CTU includes syntax structures used to encode the picture and samples of the picture.

One CTB may be split into M×N coding blocks including M×N samples (M and N are integers).

When a picture has sample arrays for Y, Cr, and Cb components, a coding unit includes a coding block of a luma sample, two coding blocks of chroma samples corresponding to the luma sample, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a CTB and a CTU are conceptually distinguished from each other, and a coding block and a coding unit are conceptually distinguished from each other. That is, a coding unit (a CTU) refers to a data structure including a coding block (a CTB) including a corresponding sample and a syntax structure corresponding to the coding block (the CTB). However, because it is understood by one of ordinary skill in the art that a coding unit (a CTU) or a coding block (a CTB) refers to a block of a certain size including a certain number of samples, a CTB and a CTU, or a coding block and a coding unit are mentioned in the following specification without being distinguished unless otherwise described.

An image may be split into CTUs. A size of each CTU may be determined based on information obtained from a bitstream. A shape of each CTU may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma CTU and a luma CTB that may be split into two. Accordingly, when the information about the maximum size of the luma coding block that may be split into two and the information about the luma block size difference obtained from the bitstream are combined with each other, a size of the luma CTU may be determined. A size of a chroma CTU may be determined by using the size of the luma CTU. For example, when a Y: Cb: Cr ratio is 4:2:0 according to a color format, a size of a chroma block may be half a size of a luma block, and a size of a chroma CTU may be half a size of a luma CTU.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a CTU may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or the same as the CTU. For example, because a CTU is a coding unit having a maximum size, the CTU is one of coding units. When split shape mode information about a CTU indicates that splitting is not performed, a coding unit determined in the CTU has the same size as that of the CTU. When split shape code information about a CTU indicates that splitting is performed, the CTU may be split into coding units. Also, when split shape mode information about a coding unit indicates that splitting is performed, the coding unit may be split into smaller coding units. However, the splitting of the image is not limited thereto, and the CTU and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the present disclosure may indicate one of the CTU, the coding unit, the prediction block, and the transform block. Also, the current block or a current coding unit is a block that is to be currently decoded or encoded or is to currently split. The neighboring block may be a block reconstructed before the current block. The neighboring block may be adjacent to the current block spatially or temporally. The neighboring block may be located at one of lower left, left, upper left, upper, upper right, right, and lower right sides of the current block.

Figure 3:
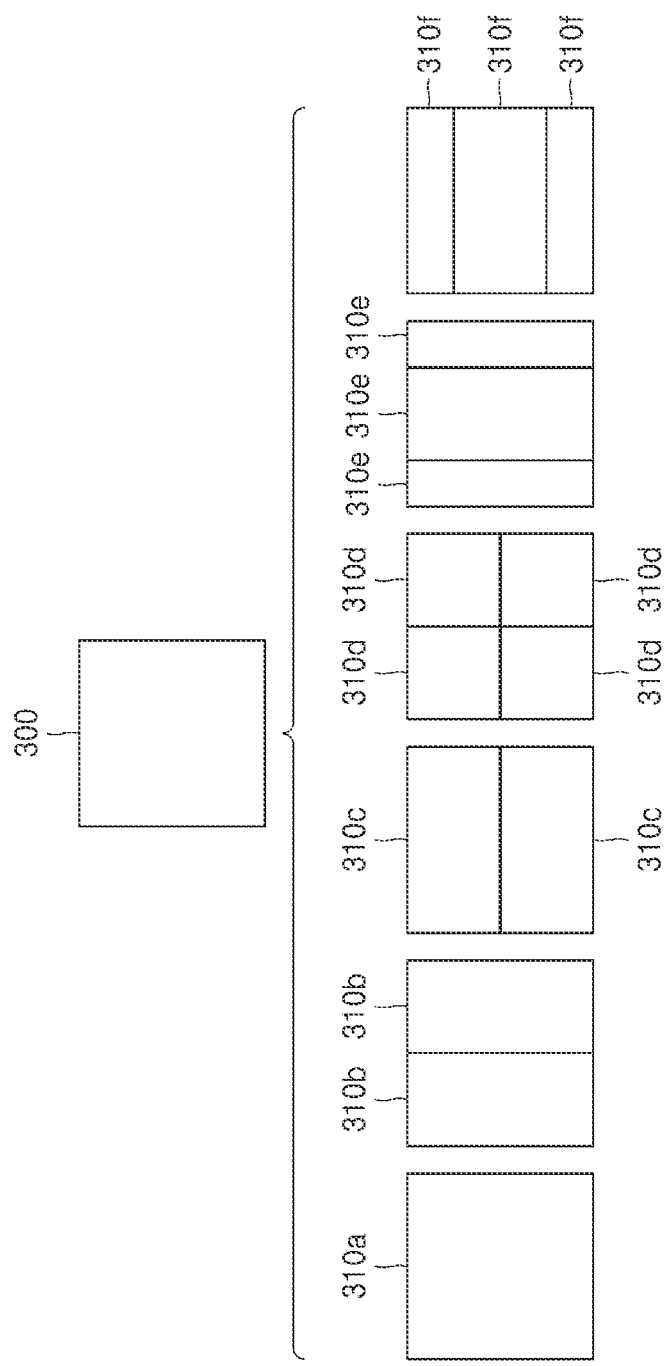
FIG. 3 illustrates a process of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or a size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit to be a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit to be a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a CTU or a smallest coding unit. For example, the image decoding apparatus 100 may determine split shape mode information with respect to the CTU to be a quad split. Also, the image decoding apparatus 100 may determine split shape mode information regarding the smallest coding unit to be "not to perform splitting." In particular, the image decoding apparatus 100 may determine the size of the CTU to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the CTU of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a certain splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting the long side of the current coding unit 400 or 450 in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is greater than the length of the height. When the ratio of the width and height is 1:4, the block shape information may be a vertical direction because the length of the width is less than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all of the determined coding units may have the same size. For example, a predetermined coding unit 430b or 480b from among the determined odd number of coding units 430a, 430b, and 430c, or 480a, 480b, and 480c may have a size different from a size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process with respect to the coding unit 430b or 480b located at the center from among the three coding units 430a, 430b, and 430c or 480a, 480b, and 480c generated by splitting the current coding unit 400 or 450 to be different from a decoding process with respect to the other coding units 430a and 430c, or 480a and 480c. For example, the image decoding apparatus 100 may restrict the coding unit 430b or 480b at the center location not to be further split or to be split only a predetermined number of times, unlike the other coding units 430a and 430c, or 480a and 480c.

Figure 5:
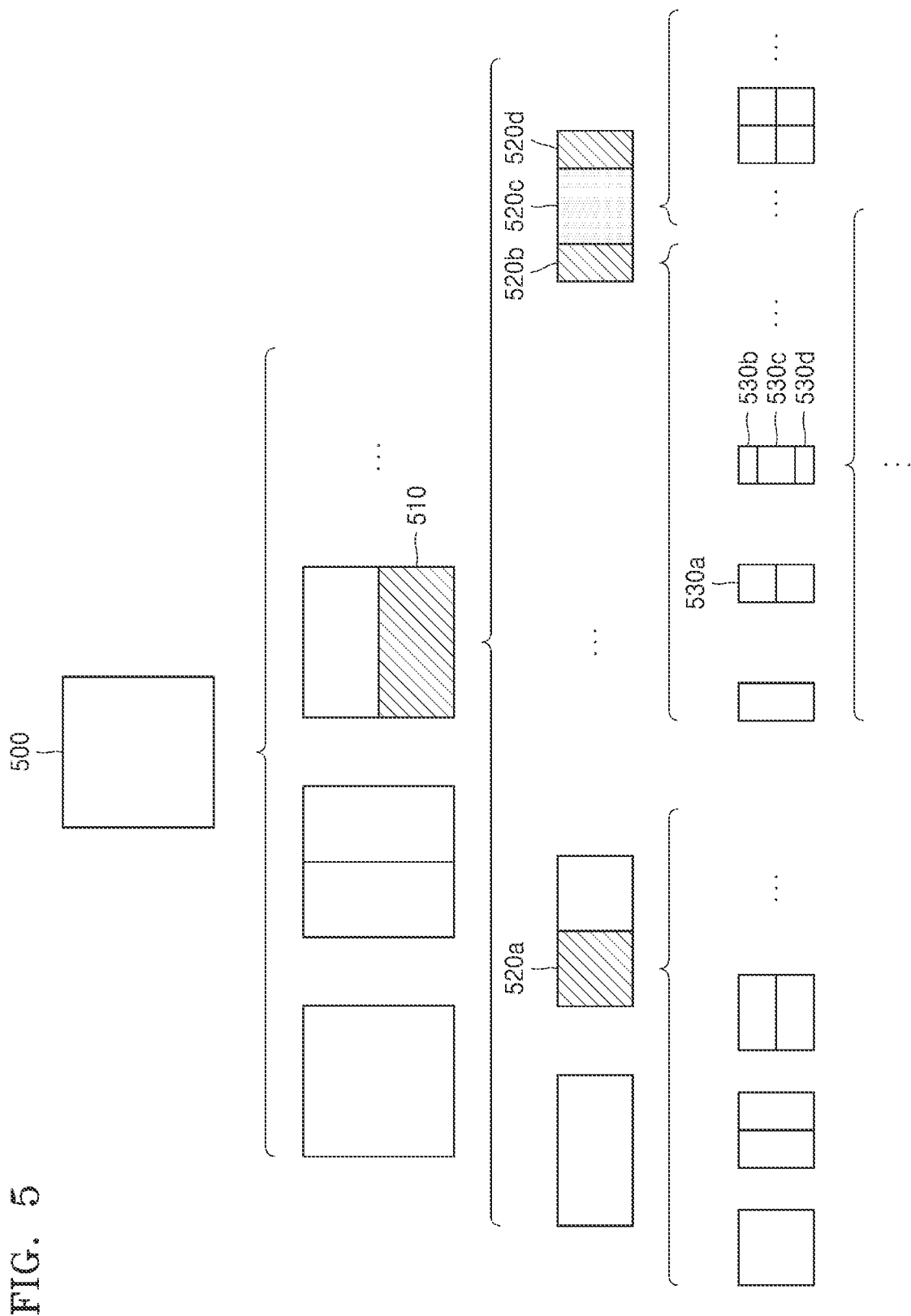
FIG. 5 illustrates a process of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to make understood the relationship before and after the coding units are split. For example, the second coding unit may be determined by splitting the first coding unit, and the third coding unit may be determined by splitting the second coding unit. It will be understood that the relationship of the first coding unit, the second coding unit, and the third coding unit is in compliance with the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520b, 520c, and 520d determined by splitting the non-square second coding unit 510 (e.g., a coding unit at a center location or a square coding unit) may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split again into a plurality of coding units. For example, the non-square fourth coding unit 530b or 530d may be split into an odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a configurable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520c at the center location are merely according to embodiments, and thus, shall not be interpreted to be limited to the above-described embodiments, and shall be interpreted to include various restrictions for decoding the third coding unit 520c at the center location differently from the other third coding units 520b and 520d.

According to an embodiment, the image decoding apparatus 100 may obtain the split shape mode information, which is used to split a current coding unit, from a certain location in the current coding unit.

Figure 6:
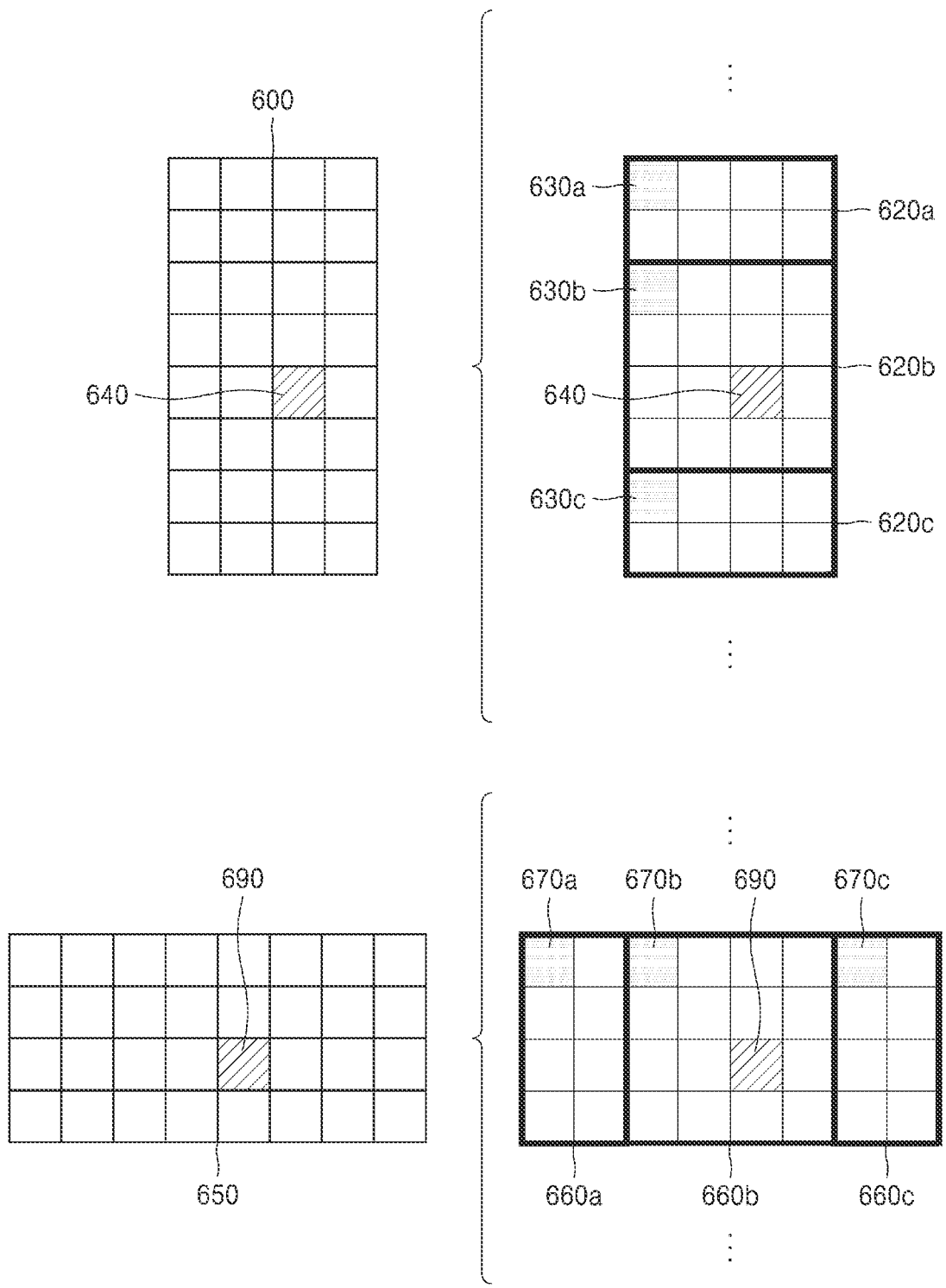
FIG. 6 illustrates a method of determining a predetermined coding unit from among an odd number of coding units, according to an embodiment.

FIG. 6 illustrates a method, performed by the image decoding apparatus 100, of determining a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a predetermined location by using coordinates of a sample included in the coding unit, as information indicating a location of the sample, shall not be interpreted to be limited to the above-described method, and shall be interpreted to include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus, various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that is information indicating the location of an upper left sample 670a of the left coding unit 660a, the coordinates (xe, ye) that is information indicating the location of an upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus, various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about predetermined locations of samples included in the coding units may be used.

According to an embodiment, the image decoding apparatus 100 may select a coding unit at a predetermined location from among an odd number of coding units determined by splitting the current coding unit, based on the shape of the current coding unit. For example, when the current coding unit has a non-square shape, a width of which is greater than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is greater than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, based on a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units).

That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information is obtainable.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus, detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
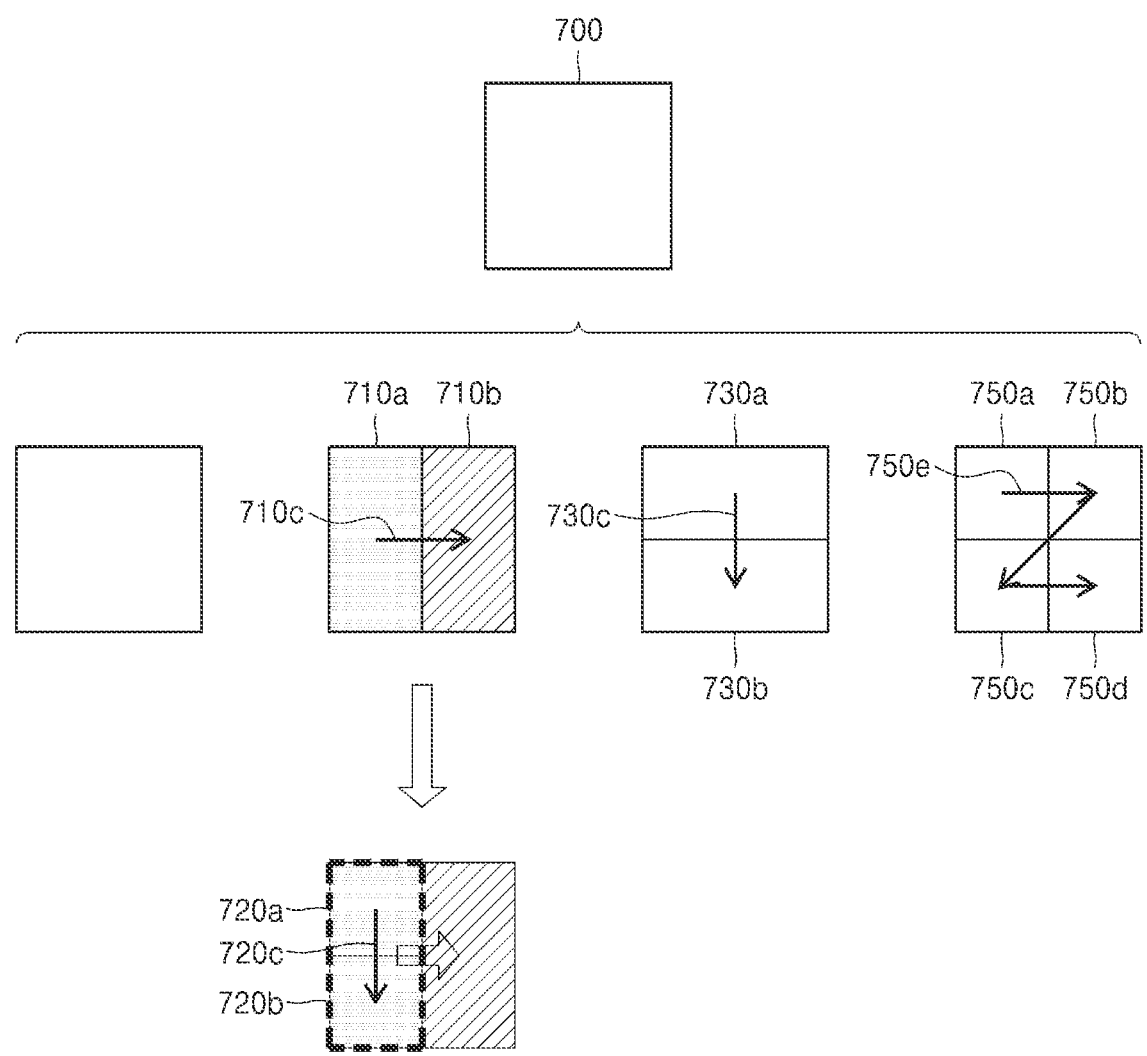
FIG. 7 illustrates an order of processing a plurality of coding units when the plurality of coding units are determined by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a and 710b, 730a and 730b, or 750a to 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
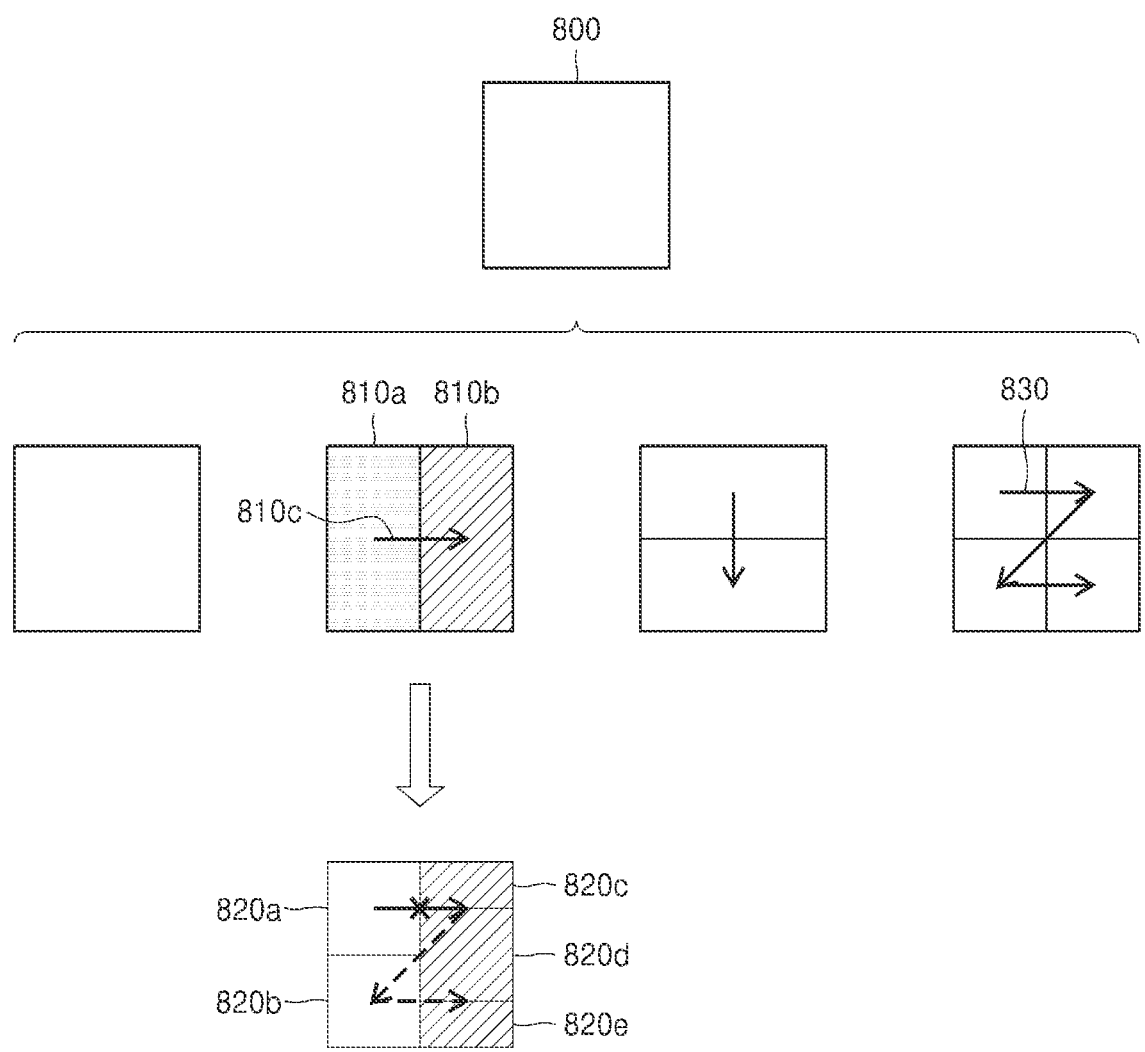
FIG. 8 illustrates a process of determining that a current coding unit is to be split into an odd number of coding units, when the coding units are not processable in a predetermined order, according to an embodiment.

FIG. 8 illustrates a process in which, when coding units are not processable in a predetermined order, an image decoding apparatus determines that a current coding unit is split into an odd number of coding units, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c* to 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c* to 820*e*.

According to an embodiment, the image decoding apparatus 100 may determine whether any coding unit is split into an odd number of coding units, by determining whether the third coding units 820*a* and 820*b*, and 820*c* to 820*e* are processable in a predetermined order. Referring to FIG. 8, the image decoding apparatus 100 may determine the third coding units 820*a* and 820*b*, and 820*c* to 820*e* by recursively splitting the first coding unit 800. The image decoding apparatus 100 may determine whether any of the first coding unit 800, the second coding units 810*a* and 810*b*, and the third coding units 820*a* and 820*b*, and 820*c* to 820*e* are split into an odd number of coding units, based on at least one of the block shape information and the split shape mode information. For example, the right second coding unit 810*b* among the second coding units 810*a* and 810*b* may be split into an odd number of third coding units 820*c*, 820*d*, and 820*e*. A processing order of a plurality of coding units included in the first coding unit 800 may be a predetermined order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the predetermined order.

According to an embodiment, the image decoding apparatus 100 may determine whether the third coding units 820*a* and 820*b*, and 820*c* to 820*e* included in the first coding unit 800 satisfy the condition for processing in the predetermined order, and the condition relates to whether at least one of a width and height of the second coding units 810*a* and 810*b* is split in half along a boundary of the third coding units 820*a* and 820*b*, and 820*c* to 820*e*. For example, the third coding units 820*a* and 820*b* determined when the height of the left second coding unit 810*a* of the non-square shape is split in half may satisfy the condition. It may be determined that the third coding units 820*c* to 820*e* do not satisfy the condition because the boundaries of the third coding units 820*c* to 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
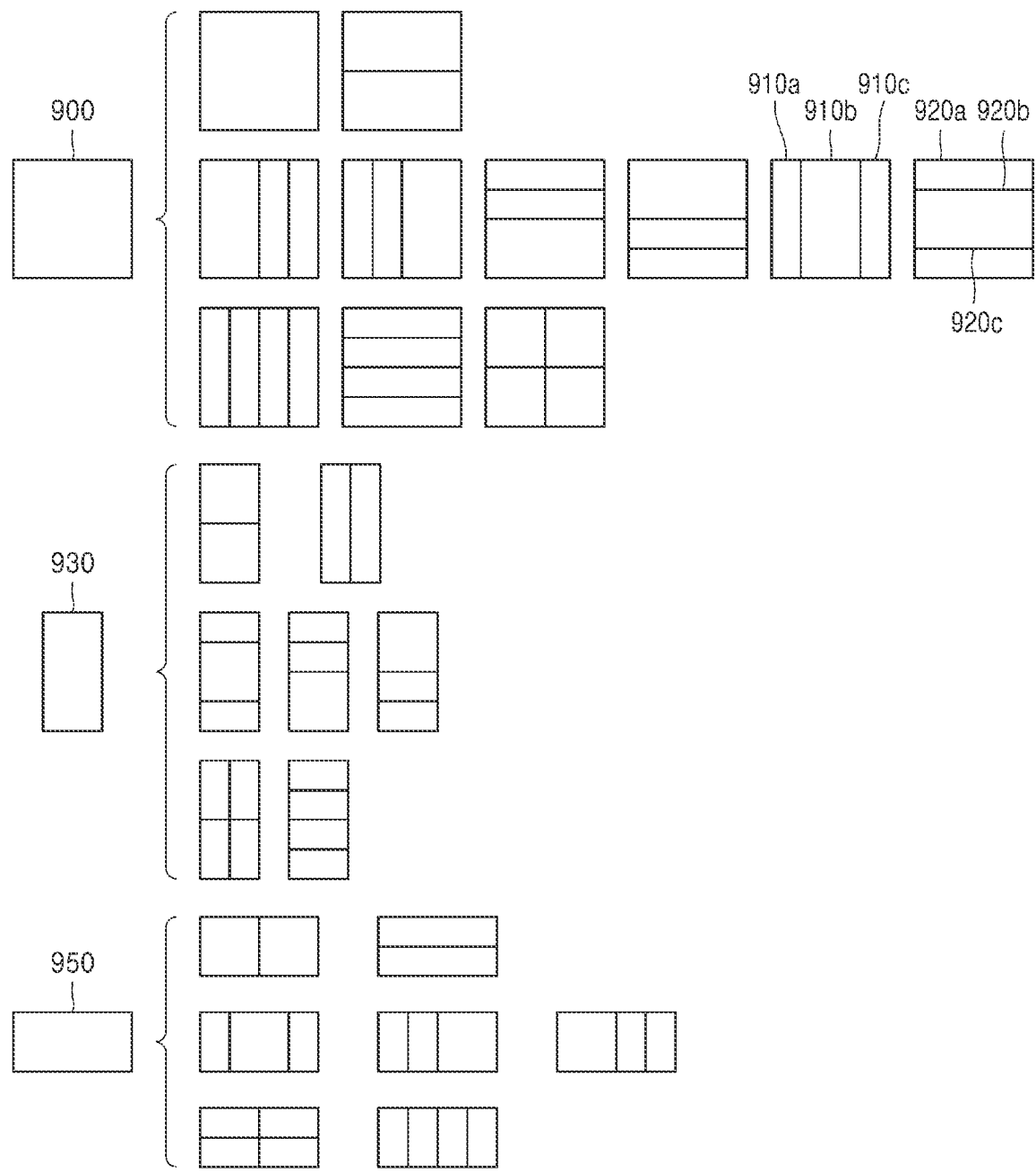
FIG. 9 illustrates a process of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the bitstream obtainer 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a predetermined order, and the condition relates to whether at least one of a width and height of the first coding unit 900 is split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
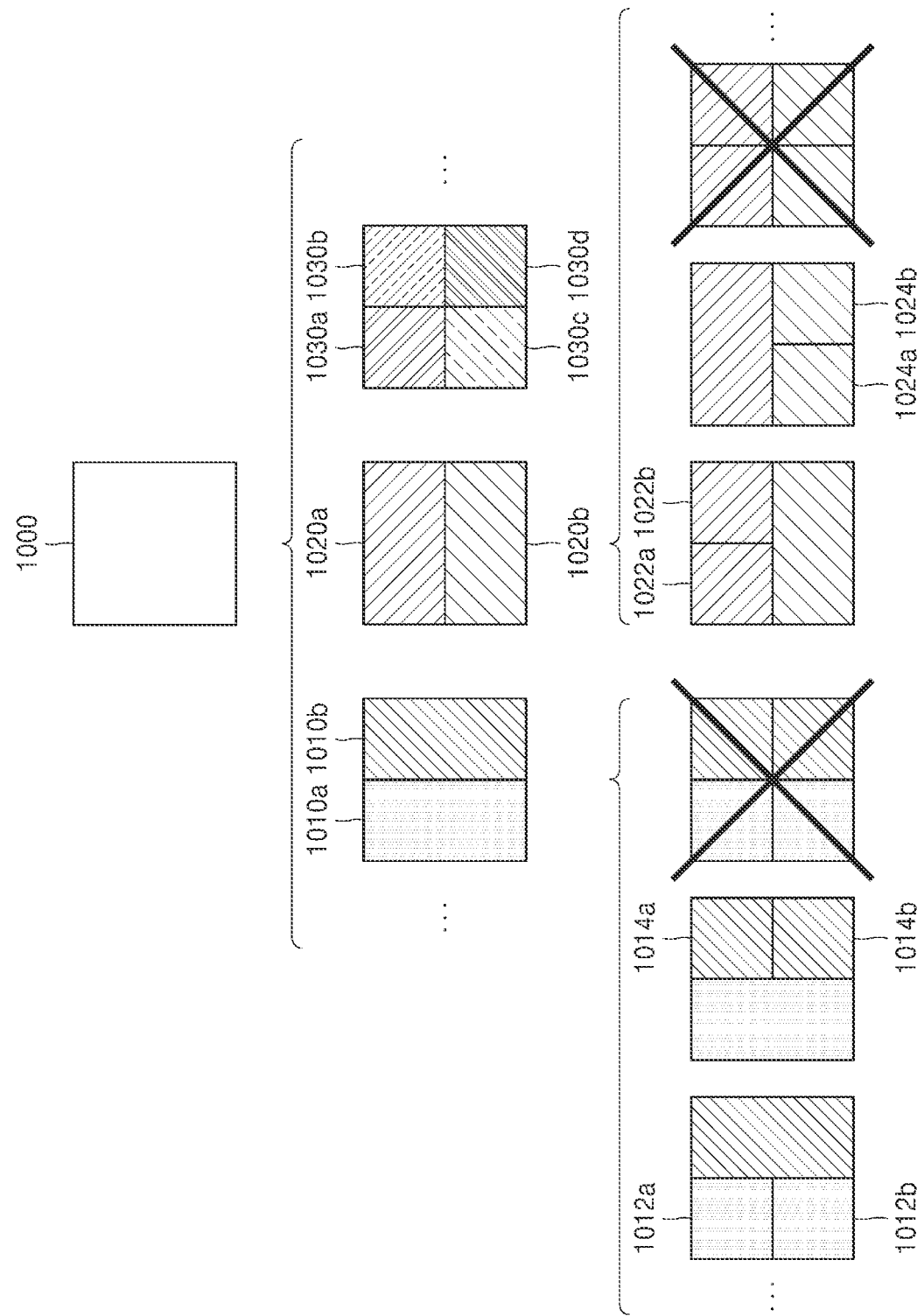
FIG. 10 illustrates that a shape into which a second coding unit is splittable is restricted when the second coding unit having a non-square shape, which is determined by splitting a first coding unit, satisfies a predetermined condition, according to an embodiment.

FIG. 10 illustrates that a shape into which a second coding unit is splittable is restricted when the second coding unit having a non-square shape, which is determined when the image decoding apparatus 100 splits a first coding unit 1000, satisfies a certain condition, according to an embodiment.

According to an embodiment, the image decoding apparatus 100 may determine to split the square first coding unit 1000 into non-square second coding units 1010a and 1010b or 1020a and 1020b, based on split shape mode information, which is obtained by the bitstream obtainer 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
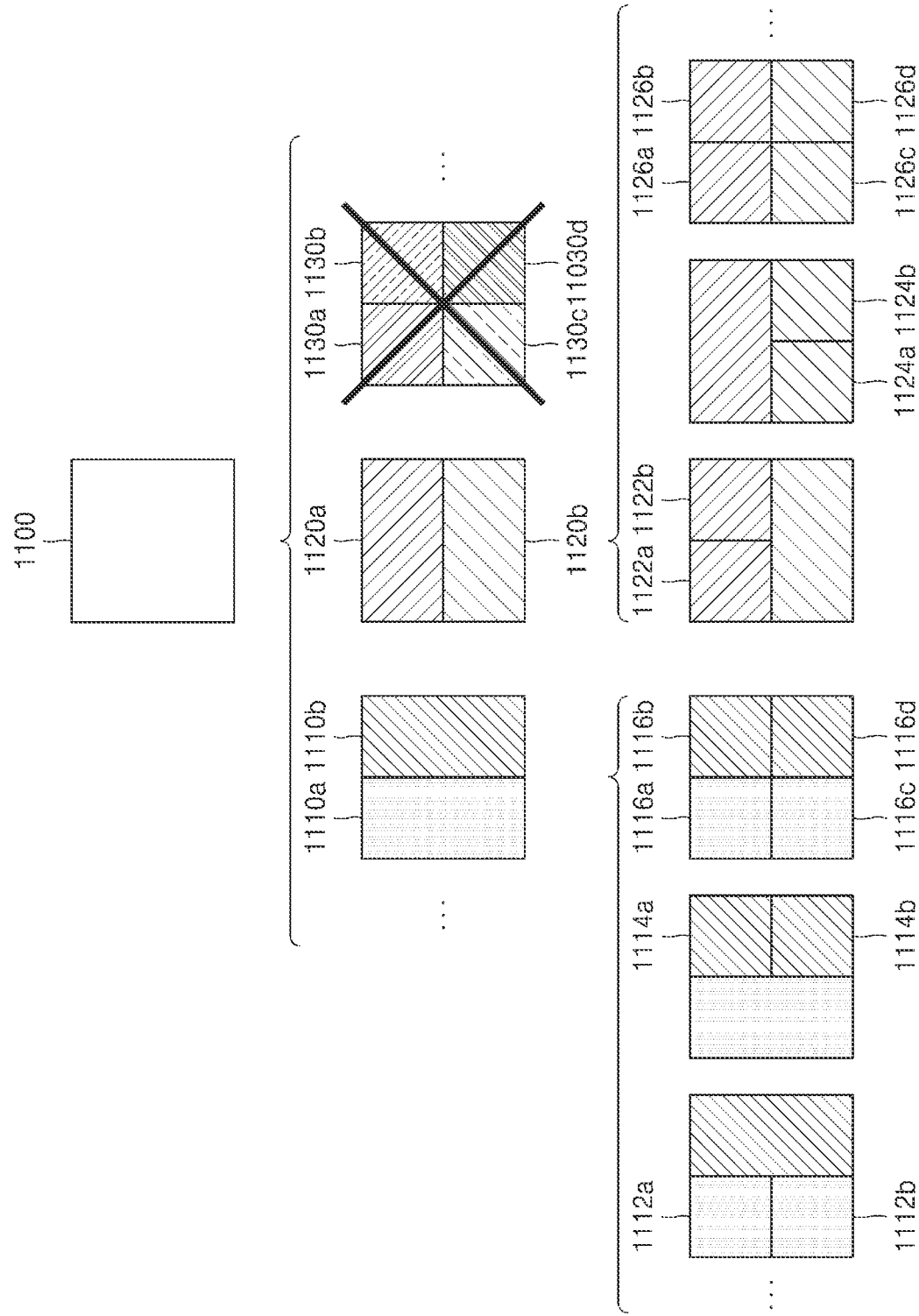
FIG. 11 illustrates a process of splitting a square coding unit when split shape mode information indicates that the square coding unit is not to be split into four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
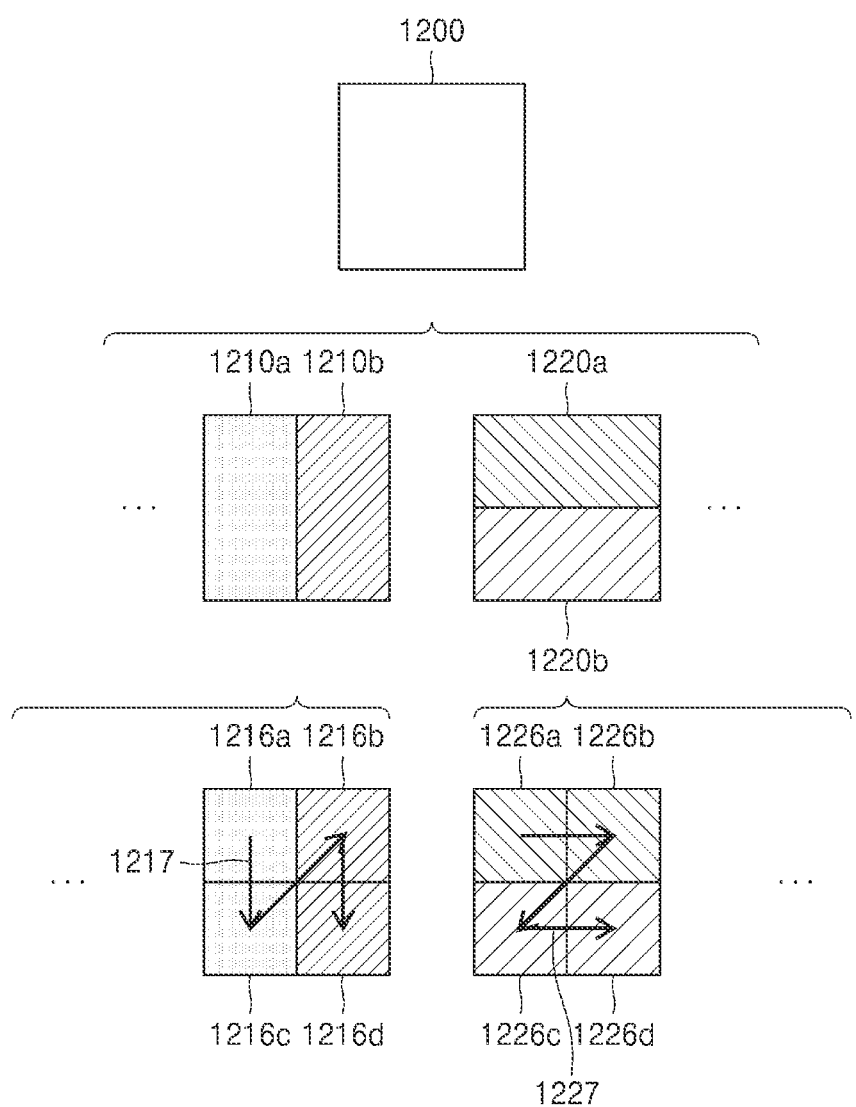
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b has been described above in relation to FIG. 11, and thus, detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
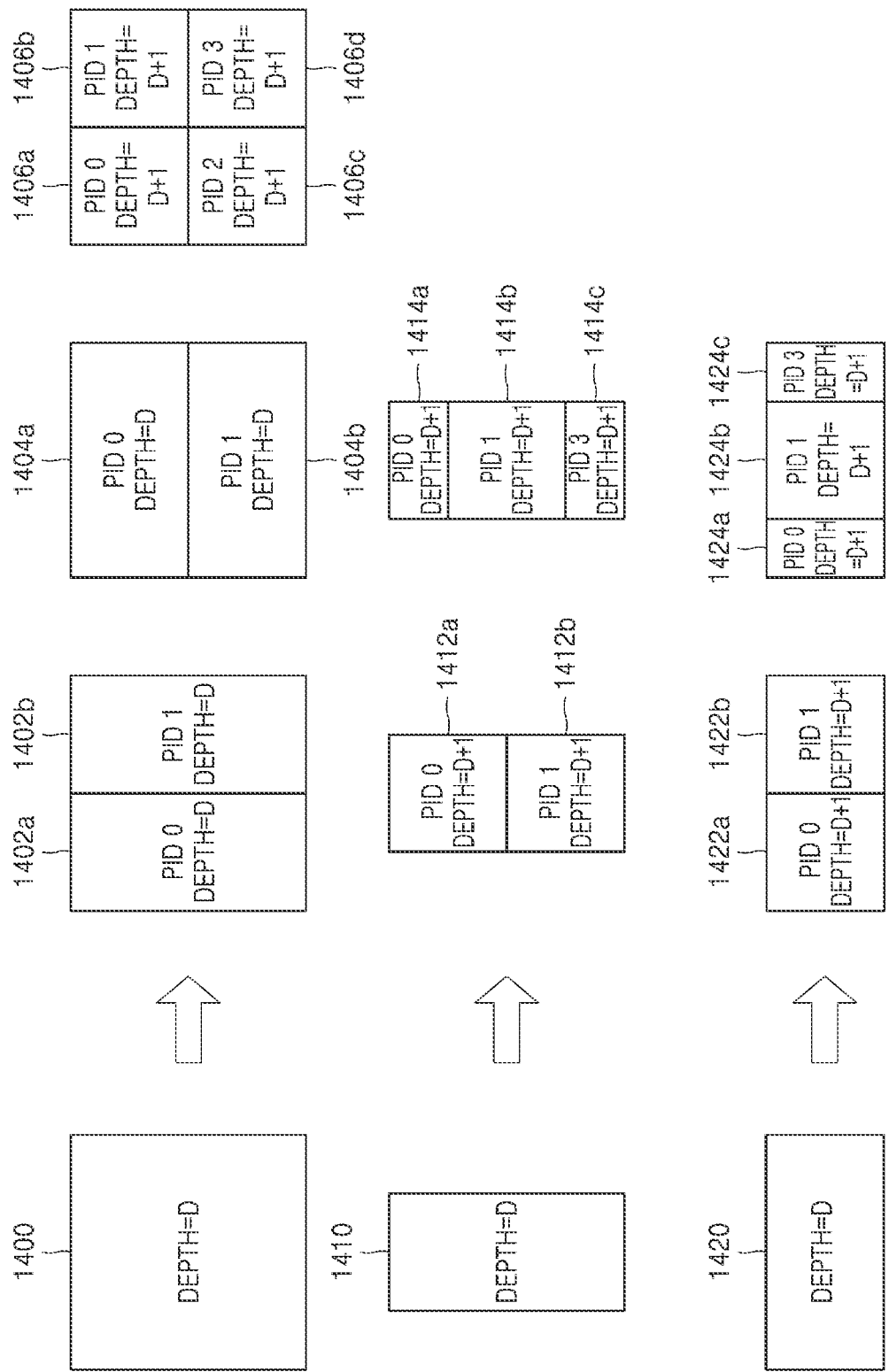
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a predetermined location of each coding unit (e.g., an upper-left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
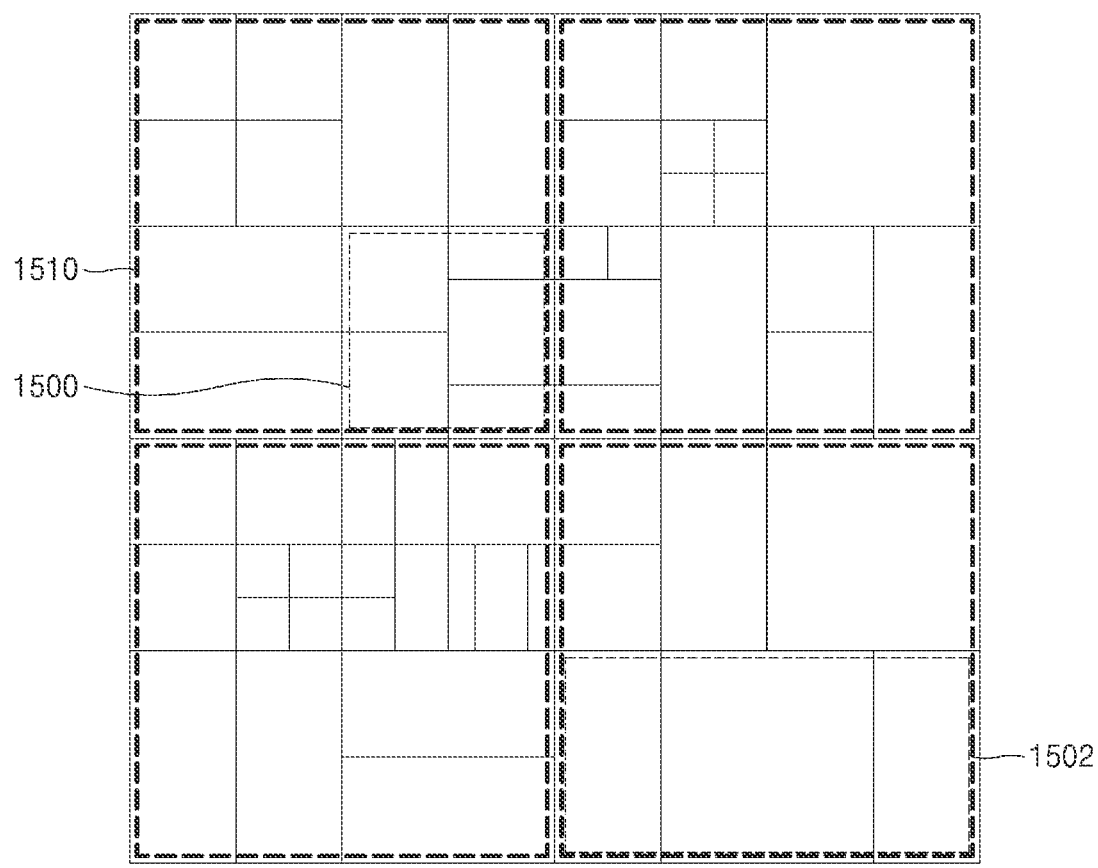
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, CTUs, or the like).

According to an embodiment, for each of various data units described above, the bitstream obtainer 110 of the image decoding apparatus 100 may obtain, from a bitstream, at least one of information about a shape of the reference coding unit and information about a size of the reference coding unit. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the bitstream obtainer 110 may obtain, from the bitstream, only the PID for identifying the size and shape of reference coding units with respect to each slice, slice segment, tile, tile group, or CTU which is a data unit satisfying a certain condition (e.g., a data unit having a size equal to or smaller than a slice) among the various data units (e.g., sequences, pictures, slices, slice segments, tiles, tile groups, CTUs, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a CTU. That is, a CTU split from a picture may include one or more reference coding units, and coding units may be determined by recursively splitting each reference coding unit. According to an embodiment, at least one of a width and height of the CTU may be integer times at least one of the width and height of the reference coding units. According to an embodiment, the size of reference coding units may be obtained by splitting the CTU n times based on a quadtree structure. That is, the image decoding apparatus 100 may determine the reference coding units by splitting the CTU n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information for each CTU and each reference coding unit, and may use the obtained syntax element.

Hereinafter, a method of determining a split rule, according to an embodiment of the disclosure will be described in detail.

The image decoding apparatus 100 may determine a split rule of an image. The split rule may be pre-determined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, CTUs, or coding units.

The image decoding apparatus 100 may determine the split rule based on a block shape of a coding unit. The block shape may include a size, shape, a ratio of width and height, and a direction of the coding unit. The image encoding apparatus 200 and the image decoding apparatus 100 may pre-determine to determine the split rule based on the block shape of the coding unit. However, the embodiment is not limited thereto. The image decoding apparatus 100 may determine the split rule of the image, based on information obtained from a bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Figure 16:
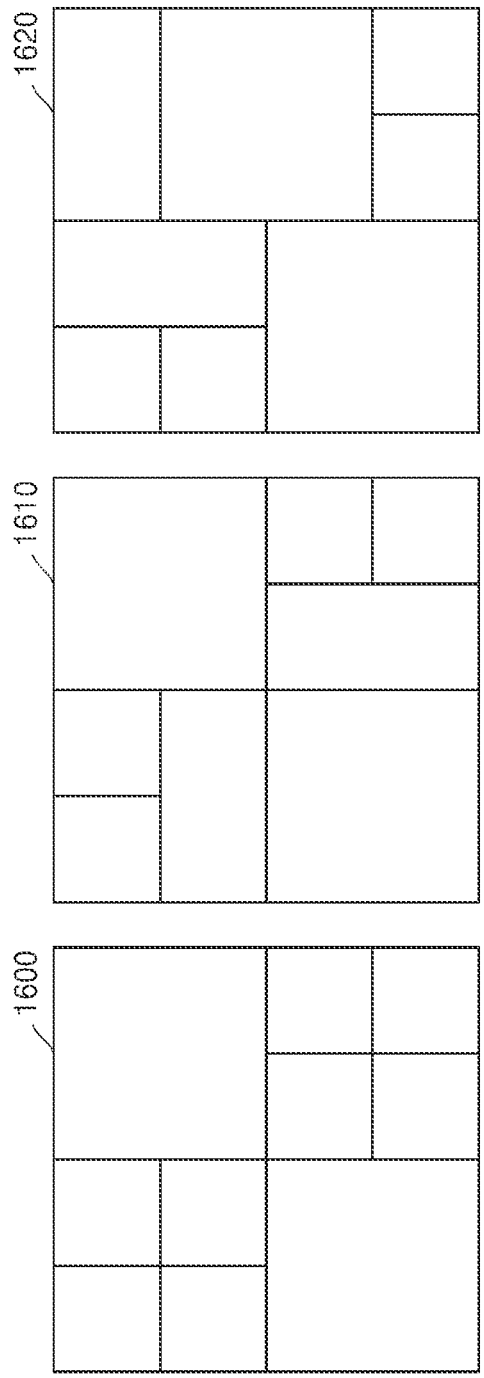
FIG. 16 illustrates coding units which may be determined for each picture, when a combination of shapes into which a coding unit may be split is different for each picture, according to an embodiment.

FIG. 16 illustrates coding units which may be determined for each picture, when a combination of shapes into which a coding unit may be split is different for each picture, according to an embodiment.

Referring to FIG. 16, the image decoding apparatus 100 may, for each picture, differently determine a combination of split shapes into which a coding unit may be split. For example, the image decoding apparatus 100 may decode an image by using a picture 1600 which may be split into four coding units, a picture 1610 which may be split into two or four coding units, and a picture 1620 which may be split into two, three, or four coding units, from among one or more pictures included in the image. In order to split the picture 1600 into a plurality of coding units, the image decoding apparatus 100 may use only split shape information indicating a split into four square coding units. In order to split the picture 1610, the image decoding apparatus 100 may use only split shape information indicating a split into two or four coding units. In order to split the picture 1620, the image decoding apparatus 100 may use only split shape information indicating a split into two, three, or four coding units. The combinations of the split shapes described above are only an embodiment for describing an operation of the image decoding apparatus 100. Thus, the combinations of the split shapes described above should not be interpreted to be limited to the embodiment described above, and should be interpreted such that various types of combinations of the split shapes may be used for a predetermined data unit.

According to an embodiment, the bitstream obtainer 110 of the image decoding apparatus 100 may obtain a bitstream including an index indicating a combination of split shape information for each predetermined data unit (for example, a sequence, a picture, a slice, a slice segment, a tile, or a tile group). For example, the bitstream obtainer 110 may obtain the index indicating the combination of the split shape information from a sequence parameter set, a picture parameter set, a slice header, a tile header, or a tile group header. The bitstream obtainer 110 of the image decoding apparatus 100 may determine, for each predetermined data unit, a combination of split shapes into which a coding unit may be split, by using the obtained index, and thus, for each predetermined data unit, a different combination of the split shapes may be used.

FIG. 17 illustrates various shapes of a coding unit, which may be determined based on split shape mode information which may be represented as a binary code, according to an embodiment.

According to an embodiment, the image decoding apparatus 100 may split the coding unit into various shapes by using block shape information and split shape mode information obtained by the bitstream obtainer 110. Shapes into which the coding unit may be split may correspond to various shapes including the shapes described according to the embodiments described above.

Referring to FIG. 17, the image decoding apparatus 100 may split a square coding unit in at least one of a horizontal direction and a vertical direction and may split a non-square coding unit in the horizontal direction or the vertical direction, based on the split shape mode information.

According to an embodiment, when the image decoding apparatus 100 may split the square coding unit in the horizontal direction and the vertical direction into four square coding units, split shapes which may be indicated by the split shape mode information with respect to the square coding unit may correspond to four types. According to an embodiment, the split shape mode information may be represented as a two-digit binary code, and each split shape may be assigned with a binary code. For example, when a coding unit is not split, the split shape mode information may be represented as (00)b, when a coding unit is split in a horizontal direction and a vertical direction, the split shape mode information may be represented as (01)b, when a coding unit is split in the horizontal direction, the split shape mode information may be represented as (10)b, and when a coding unit is split in the vertical direction, the split shape mode information may be represented as (11)b.

According to an embodiment, when the image decoding apparatus 100 splits a non-square coding unit in a horizontal direction or a vertical direction, split shape types which may be indicated by the split shape mode information may be determined depending on the number of coding units into which the non-square coding unit is split. Referring to FIG. 17, the image decoding apparatus 100 may split up to three coding units from a non-square coding unit, according to an embodiment. The image decoding apparatus 100 may split a coding unit into two coding units, and in this case, the split shape mode information may be represented as (10)b. The image decoding apparatus 100 may split a coding unit into three coding units, and in this case, the split shape mode information may be represented as (11)b. The image decoding apparatus 100 may determine not to split a coding unit, and in this case, the split shape mode information may be represented as (0)b. That is, to use the binary code indicating the split shape mode information, the image decoding apparatus 100 may use variable length coding (VLC) rather than fixed length coding (FLC).

Referring to FIG. 17, according to an embodiment, a binary code of the split shape mode information indicating not to split the coding unit may be represented as (0)b. When the binary code of the split shape mode information indicating not to split the coding unit is configured as (00)b, all of 2-bit binary codes of the split shape mode information may have to be used, even though there is no split shape mode information configured as (01)b. However, when, as illustrated in FIG. 17, three split shape types with respect to the non-square coding unit are used, the image decoding apparatus 100 may determine not to split the coding unit, even by using a 1-bit binary code (0)b as the split shape mode information. Thus, a bitstream may be efficiently used. However, the split shapes of the non-square coding unit indicated by the split shape mode information should not be interpreted as being limited to the three split shape types illustrated in FIG. 17 and should be interpreted to include various shapes including the embodiments described above.

Figure 18:
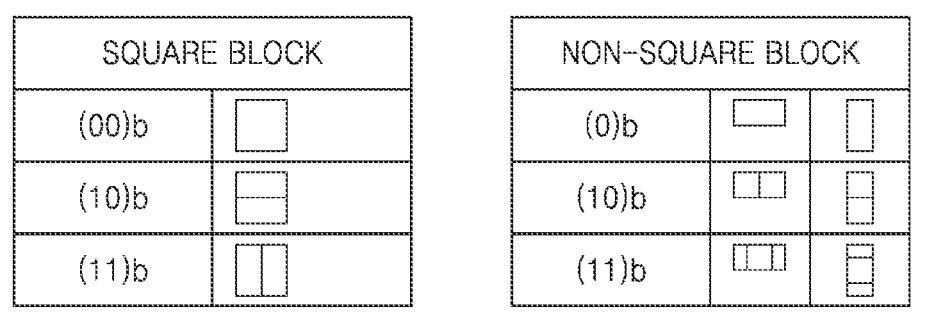

FIG. 18 illustrates another shape of a coding unit, which may be determined based on split shape mode information which may be represented as a binary code, according to an embodiment.

Referring to FIG. 18, the image decoding apparatus 100 may split a square coding unit in a horizontal direction or a vertical direction and may split a non-square coding unit in the horizontal direction or the vertical direction, based on the split shape mode information. That is, the split shape mode information may indicate to split the square coding unit in one direction. In this case, a binary code of the split shape mode information indicating not to split the square coding unit may be represented as (0)b. When the binary code of the split shape mode information indicating not to split the coding unit is configured as (00)b, all of 2-bit binary codes of the split shape mode information may have to be used, even though there is no split shape mode information configured as (01)b. However, when, as illustrated in FIG. 18, three split shape types with respect to the square coding unit are used, the image decoding apparatus 100 may determine not to split the coding unit, even by using a 1-bit binary code (0)b as the split shape mode information. Thus, a bitstream may be efficiently used. However, the split shapes of the square coding unit indicated by the split shape mode information should not be interpreted as being limited to the three split shape types illustrated in FIG. 18 and should be interpreted to include various shapes including the embodiments described above.

According to an embodiment, the block shape information or the split shape mode information may be represented by using a binary code, and this block shape information or this split shape mode information represented by using the binary code may be directly generated as a bitstream. Also, the block shape information or the split shape mode information which may be represented as the binary code may not be directly generated as the bitstream and may be used as a binary code which is input in context adaptive binary arithmetic coding (CABAC).

A process in which the image decoding apparatus 100 obtains the syntax with respect to the block shape information or the split shape mode information through the CABAC is described, according to an embodiment. A bitstream including a binary code with respect to the syntax may be obtained by the bitstream obtainer 110. The image decoding apparatus 100 may detect a syntax element indicating the block shape information or the split shape mode information by inversely binarizing a bin string included in the obtained bistream. According to an embodiment, the image decoding apparatus 100 may obtain a set of binary bin strings corresponding to a syntax element to be decoded and may decode each bin by using probability information. Also, the image decoding apparatus 100 may repeat this process until a bin string composed of these decoded bins becomes the same as one of previously obtained bin strings. The image decoding apparatus 100 may determine the syntax element by performing inverse binarization on the bin string.

According to an embodiment, the image decoding apparatus 100 may determine the syntax with respect to the bin string by performing a decoding process of adaptive binary arithmetic coding, and the image decoding apparatus 100 may update a probability model with respect to the bins obtained by the bitstream obtainer 110. Referring to FIG. 17, the bitstream obtainer 110 of the image decoding apparatus 100 may obtain a bitstream indicating a binary code representing split shape mode information, according to an embodiment. The image decoding apparatus 100 may determine the syntax with respect to the split shape mode information by using the obtained 1-bit or 2-bit-sized binary code. In order to determine the syntax with respect to the split shape mode information, the image decoding apparatus 100 may update a probability with respect to each bit of the 2-bit binary code. That is, according to whether a value of a first bin of the 2-bit binary code is 0 or 1, the image decoding apparatus 100 may update a probability for a next bin of having the value of 0 or 1 when the next bin is decoded.

According to an embodiment, in the process of determining the syntax, the image decoding apparatus 100 may update the probability with respect to the bins, in a process of decoding the bins of the bin string with respect to the syntax, and with respect to a predetermined bit from among the bin string, the image decoding apparatus 100 may not update the probability and may determine that the probability is the same.

Referring to FIG. 17, in a process of determining the syntax by using the bin string representing the split shape mode information with respect to the non-square coding unit, the image decoding apparatus 100 may determine the syntax with respect to the split shape mode information by using one bin having a value of 0, when the non-square coding unit is not split. That is, when the block shape information indicates that a current coding unit has a non-square shape, a first bin of the bin string with respect to the split shape mode information may be 0, when the non-square coding unit is not split, and may be 1, when the non-square coding unit is split into two or three coding units. Accordingly, the probability that the first bin of the bin string of the split shape mode information with respect to the non-square coding unit is 0 may be ⅓, and the probability that the first bin of the bin string of the split shape mode information with respect to the non-square coding unit is 1 may be ⅔. As described above, because the split shape mode information indicating that the non-square coding unit is not split may be represented by using only a 1-bit bin string having the value of 0, the image decoding apparatus 100 may determine the syntax with respect to the split shape mode information by determining whether a second bin is 0 or 1, only when the first bin of the split shape mode information is 1. According to an embodiment, when the first bin with respect to the split shape mode information is 1, the image decoding apparatus 100 may regard that the probability that the second bin is 0 and the probability that the second bin is 1 are the same as each other and may decode the bin.

According to an embodiment, in the process of determining the bins of the bin string with respect to the split shape mode information, the image decoding apparatus 100 may use various probabilities with respect to each bin. According to an embodiment, the image decoding apparatus 100 may differently determine the probabilities of the bins with respect to the split shape mode information, according to a direction of a non-square block. According to an embodiment, the image decoding apparatus 100 may differently determine the probabilities of the bins with respect to the split shape mode information, according to a width or a length of a longer side of a current coding unit. According to an embodiment, the image decoding apparatus 100 may differently determine the probabilities of the bins with respect to the split shape mode information, according to at least one of a shape and a length of a longer side of a current coding unit.

According to an embodiment, the image decoding apparatus 100 may determine that the probabilities of the bins with respect to the split shape mode information are the same for coding units having a size that is equal to or greater than a predetermined size. For example, the image decoding apparatus 100 may determine that the probabilities of the bins with respect to the split shape mode information are the same as each other with respect to the coding units having a size that is equal to or greater than 64 samples based on a length of a longer side of the coding unit.

According to an embodiment, the image decoding apparatus 100 may determine initial probabilities of the bins composed in the bin string of the split shape mode information based on a slice type (for example, an I-slice, a P-slice, or a B-slice).

Figure 19:
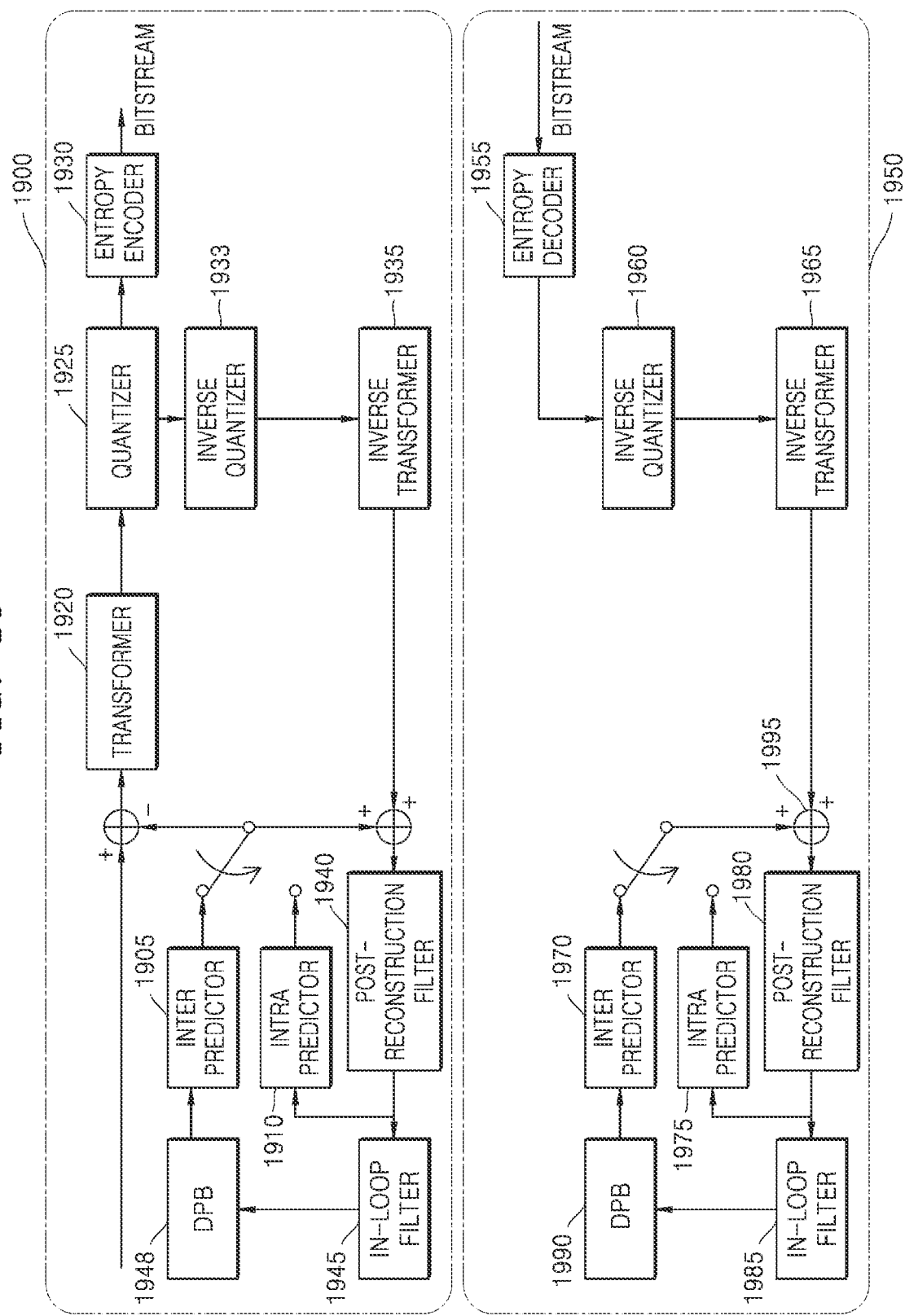
FIG. 19 is a block diagram of an image encoding and decoding system.

FIG. 19 is a block diagram of an image encoding and decoding system.

An encoder 1910 of an image encoding and decoding system 1900 transmits an encoded bitstream of an image and a decoder 1950 outputs a reconstructed image by receiving and decoding the bitstream. Here, the decoder 1950 may have a similar configuration as the image decoding apparatus 100.

In the encoding end 1910, when a prediction mode of a current block is an inter-prediction mode, an inter-prediction encoder 1905 generates motion information of the current block indicating a reference block of a reference picture temporally adjacent to a current picture. The inter-prediction encoder 1905 may determine prediction samples of the current block by using samples of reference blocks. An intra-prediction encoder 1910 may determine intra-prediction information indicating a direction in which neighboring samples similar to the current block are located or a method of determining prediction samples, so that the prediction samples of the current block may be determined by using neighboring samples spatially adjacent to the current block.

The inter-prediction encoder 1905 may determine reference samples to be used for the prediction of the current block from among initially reconstructed samples stored in a decoded picture buffer (DPB) 1948.

A transformer 1920 outputs transform coefficients by performing transformation on residual sample values obtained by subtracting prediction samples generated by the inter-prediction encoder 1905 or the intra-prediction encoder 1910 from an original sample of the current block. A quantizer 1925 quantizes the transform coefficients output from the transformer 1920 to output the quantized transform coefficients. An entropy encoder 1930 may encode the quantized transform coefficients into residual syntax elements including a level value and may output the residual syntax elements in the form of a bitstream.

The quantized transform coefficients output by the quantizer 1925 may be inversely quantized and inversely transformed by an inverse quantizer 1933 and an inverse transformer 1935, and thus, residual sample values may be generated again.

An adder 1915 may add the residual sample values and the prediction sample values to output a reconstructed sample value. A post-reconstruction filter 1940 may perform post-reconstruction filtering on reconstruction samples. Reconstruction sample values updated through the post-reconstruction filtering may be used as reference sample values for intra-prediction to be performed by the intra predictor 1910. The post-reconstruction filter 1940 may perform Hadamard transform domain filtering or bilateral filtering on the reconstruction sample values.

An in-loop filter 1945 may perform at least one of deblocking filtering and adaptive loop filtering on the reconstruction samples updated through the post-reconstruction filtering. The reconstruction sample values updated through the filtering of the in-loop filter 1945 may be stored in a decoded picture buffer (DPB) 1948 and may be used as reference sample values for inter-prediction to be performed by the inter predictor 1905.

An entropy decoder 1955 of the decoder 1950 may perform entropy decoding on a received bitstream and may parse residual syntax elements including a level value. Quantized transform coefficients may be reconstructed from the residual syntax elements. An inverse quantizer 1960 may output transform coefficients by performing inverse quantization on the quantized transform coefficients, and an inverse transformer 1965 may output residual sample values by performing inverse transformation on the transform coefficients.

An inter-predictior 1970 of the decoder 1950 may determine a reference picture temporally adjacent to a current picture by using motion information of a current block that is parsed by the entropy decoder 1955 and may determine a reference block in the reference picture. The inter-prediction encoder 1970 may determine prediction samples of the current block by using samples of reference blocks. The intra-predictor 1975 of the decoder 1950 may determine reference samples spatially adjacent to the current block by using intra prediction information by using the motion information of the current block that is parsed by the entropy-decoder 1955 and may determine prediction samples of the current block by using determined neighboring samples.

The inter-predictor1970 may determine reference samples to be used for prediction of the current block from among initially reconstructed samples stored in a DPB 1990.

An adder 1995 of the decoder 1950 may output a reconstruction sample value of the current block by adding residual sample values with prediction sample values. A post-reconstruction filter 1980 of the decoder 1950 may perform Hadamard transform domain filtering or bilateral filtering on reconstruction sample values. The reconstruction sample values updated through the filtering of the post-reconstruction filter 1980 may be used as reference sample values for intra-prediction to be performed by the intra predictor 1975.

An in-loop filter 1985 of the decoder 1950 may perform at least one of deblocking filtering and adaptive loop filtering on reconstruction samples updated through the post-reconstruction filtering. The reconstruction sample values updated through the filtering of the in-loop filter 1985 may be stored in the DPB 1990 and may be used as reference sample values for inter-prediction to be performed by the inter predictor 1970.

Various embodiments described above describe the operations related to an image decoding method performed by the image decoding apparatus 100. Hereinafter, operations of the image encoding apparatus 200 performing an image encoding method, which corresponds to an inverse process of the image decoding method, are described according to various embodiments.

Figure 2:
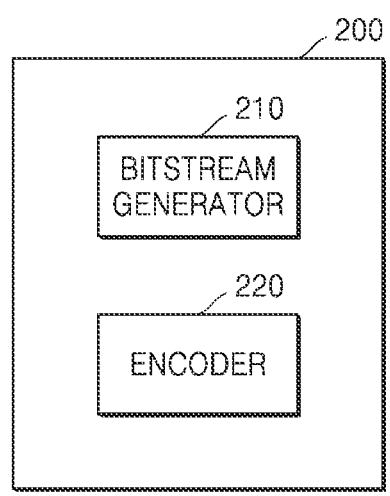
FIG. 2 is a block diagram of an image encoding apparatus according to an embodiment.

FIG. 2 is a block diagram of the image encoding apparatus 200 which may encode an image based on at least one of block shape information and split shape mode information, according to an embodiment.

The image encoding apparatus 200 may include an encoder 220 and a bitstream generator 210. The encoder 220 may receive an input image and encode the input image. The encoder 220 may obtain at least one syntax element by encoding the input image. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on the block shape information including at least one of a shape, a direction, a ratio between a width and a height, or a size of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of the coding unit. For example, the coding unit may have a square shape or a non-square shape, and information indicating the shape may be included in the block shape information.

According to an embodiment, the encoder 220 may determine into which shape the coding unit is to be split. The encoder 220 may determine a shape of at least one coding unit included in the coding unit, and the bitstream generator 210 may generate the bitstream including the split shape mode information including information about the shape of the coding unit.

According to an embodiment, the encoder 220 may determine whether or not to split the coding unit. When the encoder 220 determines to include only one coding unit in the coding unit or not to split the coding unit, the bitstream generator 210 may generate the bitstream including the split shape mode information indicating that the coding unit is not to be split. Also, the encoder 220 may split the coding unit into a plurality of coding units, and the bitstream generator 210 may generate the bitstream including the split shape mode information indicating that the coding unit is to be split into the plurality of coding units.

According to an embodiment, information indicating into which number of coding units the coding unit is to be split or in which direction the coding unit is to be split may be included in the split shape mode information. For example, the split shape mode information may indicate to split the coding unit in at least one direction of a vertical direction and a horizontal direction or may indicate not to split the coding unit.

The image encoding apparatus 200 may determine information with respect to a split shape mode based on the split shape mode of the coding unit. The image encoding apparatus 200 may determine a context model based on at least one of a shape, a direction, a ratio between a width and a height, or a size of the coding unit. Also, the image encoding apparatus 200 may generate the information with respect to the split shape mode for splitting the coding unit as a bitstream based on the context model.

In order to determine the context model, the image encoding apparatus 200 may obtain an arrangement for making a correspondence between at least one of the shape, the direction, the ratio between the width and the height, or the size of the coding unit, and an index with respect to the context model. The image encoding apparatus 200 may obtain, in the arrangement, the index with respect to the context model based on at least one of the shape, the direction, the ratio between the width and the height, or the size of the coding unit. The image encoding apparatus 200 may determine the context model based on the index with respect to the context model.

In order to determine the context model, the image encoding apparatus 200 may further determine the context model based on block shape information including at least one of a shape, a direction, a ratio between a width and a height, or a size of a neighboring coding unit adjacent to the coding unit. Also, the neighboring coding unit may include at least one of coding units located at a lower left side, a left side, an upper left side, an upper side, an upper right side, a right side, and a lower right side of the coding unit.

Also, the image encoding apparatus 200 may compare a length of a width of the upper neighboring coding unit with a length of a width of the coding unit, in order to determine the context model. Also, the image encoding apparatus 200 may compare lengths of heights of the left and right neighboring coding units with a length of a height of the coding unit. Also, the image encoding apparatus 200 may determine the context model based on results of the comparisons.

The operation of the image encoding apparatus 200 includes similar configurations as the operation of the image decoding apparatus 100 described with reference to FIGS. 3 through 19, and thus, its detailed description is omitted.

In the present disclosure, a "(coding) tool" denotes an element technique or an algorithm used for encoding and decoding an image. An image encoding apparatus may encode an image based on a (coding) tool selected from among various (coding) tools, and an image decoding apparatus may identify the (coding) tool selected by the image encoding apparatus and decode an image based on identified (coding) tool. Hereinafter, the term "tool" or "coding tool" is interchangeably used, but it will be understood by one of ordinary skill in the art that the interchangeably used term has the same meaning.

In detail, the (coding) tool may include a tool related to a split method (partitioning) of an image, a tool used for (intra-/inter-) prediction encoding/prediction decoding, a tool used for (inverse) quantization, a tool used for (inverse) transformation, a tool used for context coding, a tool used for filtering, a tool used for picture management, a tool related to visual quality, etc.

For example, the tool used for prediction encoding/prediction decoding may include an inter-prediction tool, an intra-prediction tool, a skip tool, a direct tool, an advanced motion vector prediction (AMVP) tool, an affine tool, a bi-optical or bi-directional optical (BIO) flow tool, a decoder-side motion vector refinement (DMVR) tool, an illumination compensation (IC) tool, an overlapped block motion compensation (OBMC) tool, an adaptive motion vector resolution (AMVR) tool, a history-based motion vector prediction (HMVP) tool, a merge with motion vector difference (MMVD) tool, an intra block copy (IBC) tool, an inter-prediction refinement (IPR) tool, etc.

Also, the tool used for transformation/inverse transformation may include a multiple transform selection (MTS) tool, a non-separable secondary transform (NSST) tool, a rotational transform (ROT) tool, a discrete sine transform (DST) tool, a transform skip tool, a sub-block transform (SBT) tool, a discrete cosine transform (DCT) tool, etc.

Also, the filtering tool may include a deblocking tool, a sample adaptive offset (SAO) tool, a bilateral filter (BLF) tool, a Hadamard transform domain filtering (HTDF) tool, an adaptive loop filter (ALF) tool, etc.

The visual quality-related tool may include a tool for supporting a high dynamic range (HDR) image, etc. The HDR-related tool may include a dynamic range adaption (DRA) tool, a luma mapping and chroma scaling (LMCS) tool, etc.

Generally, a great number of tools are defined in the codec standards, and there are cases in which it is appropriate to use only some of these tools, depending on the field in which the codecs are applied. To this end, a set of tools used for specific applications is defined as a profile, when the standards are established.

Information about the profile with which a bitstream conforms may be signaled to a decoder through a sequence parameter set, etc., and the decoder may identify whether or not the corresponding bitstream is to be decoded by its capability according to the profile information extracted from the sequence parameter set, etc.

Here, in the case of a main profile (however, it is not limited thereto, and the profile may be one of various profiles except for a baseline profile), various tools may be used. However, not all of the tools may have to be necessarily enabled, and thus, the tools may be enabled or non-enabled through various tool enable flags. Here, the image encoding apparatus may have to take into account a large number of cases of activation or non-activation of various tools, and thus, hardware complexity may be increased. Likewise, the image decoding apparatus may identify the activation or non-activation of various tools, and thus, hardware complexity based on this operation may be increased.

According to an embodiment of the present disclosure, when an operation in a case in which a tool enable flag indicates activation and an operation in a case in which the tool enable flag indicates non-activation are not compatible with each other, the image encoding apparatus may always set the corresponding tool enable flag to indicate activation, in the main profile, to decrease the number of cases with respect to activation or non-activation of some of the tools. Thus, hardware complexity may be significantly reduced. Also, the number of cases with respect to activation or non-activation of some of the tools are likewise decreased for the image decoding apparatus. Thus, the hardware complexity for identifying the activation or non-activation of the tools and operating based on the identification may be reduced.

When a flag indicating non-activation of a corresponding tool is received through a bitstream, and when the image decoding apparatus conforms with a main profile, the image decoding apparatus may identify that the conformance requirement of the main profile is not conformed, when a value of the flag received from the bitstream indicates non-activation, and thus, may identify that the corresponding bitstream is not be decoded by the image decoding apparatus. Thus, the image decoding apparatus may not perform decoding on an image sequence.

Also, according to an embodiment of the disclosure, an enable flag of a representative tool may be obtained from a bitstream by taking into account a relationship among the tools, and a tool enable flag of a tool having a dependent relationship with the representative tool may be obtained based on a value of the tool enable flag of the representative tool, and thus, bits with respect to the tool enable flag may be reduced according to cases. That is, when all tool enable flags of various tools are obtained from the bitstream, flags corresponding to the number of tools may have to be included in the bitstream. However, according to an embodiment of the disclosure, when the value of the tool enable flag of the representative tool indicates non-activation, the tool enable flag of the tool having the dependent relationship with the representative tool may not be obtained from the bitstream, and the corresponding tool may be identified to be non-enabled, and thus, bit reduction may be achieved. That is, tools may be grouped (categorized) by taking into account a dependent relationship, and a tool enable flag of a tool representative with respect to the group (the category) of the corresponding tools may be first included in a bitstream, and with respect to the remaining tools, tool enable flags may be obtained from the bitstream based on a value of the tool enable flag of the representative tool, or values of the tool enable flags may be derived without being obtained.

Hereinafter, a method of encoding an image and a method of decoding an image based on the tool enable flag are described.

Figure 20:
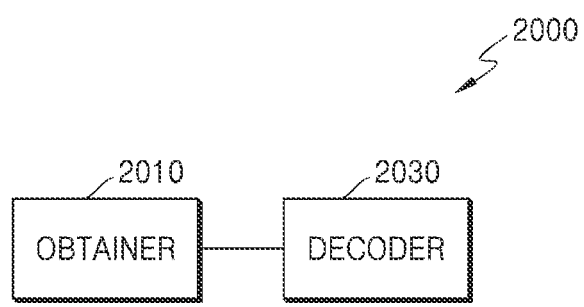
FIG. 20 is a block diagram illustrating components of an image decoding apparatus according to an embodiment.

FIG. 20 is a block diagram of components of an image decoding apparatus 2000 according to an embodiment.

Referring to FIG. 20, the image decoding apparatus 2000 may include an obtainer 2010 and a decoder 2030.

The obtainer 2010 illustrated in FIG. 20 may correspond to the bitstream obtainer 110 illustrated in FIG. 1, and the decoder 2030 may correspond to the decoder 120 illustrated in FIG. 1. Also, the obtainer 2010 may correspond to the entropy decoder 1955 illustrated in FIG. 19, and the decoder 2030 may correspond to the inverse quantizer 1960, the inverse transformer 1065, the inter predictor 1970, the intra predictor 1975, the post-reconstruction filter 1980, and the in-loop filter 1985.

The obtainer 2010 and the decoder 2030 according to an embodiment may be implemented with at least one processor. The image decoding apparatus 2000 may include one or more memories storing input and output data of the obtainer 2010 and the decoder 2030. Also, the image decoding apparatus 2000 may include a memory controller controlling data inputting and outputting of the memories.

The obtainer 2010 may obtain a bitstream generated as a result of encoding an image. The obtainer 2010 may obtain, from the bitstream, syntax elements for reconstructing the image. Binary values corresponding to the syntax elements may be included in the bitstream according to a hierarchical structure of the image. The obtainer 2010 may obtain the syntax elements by entropy decoding the binary values included in the bitstream.

Figure 21:
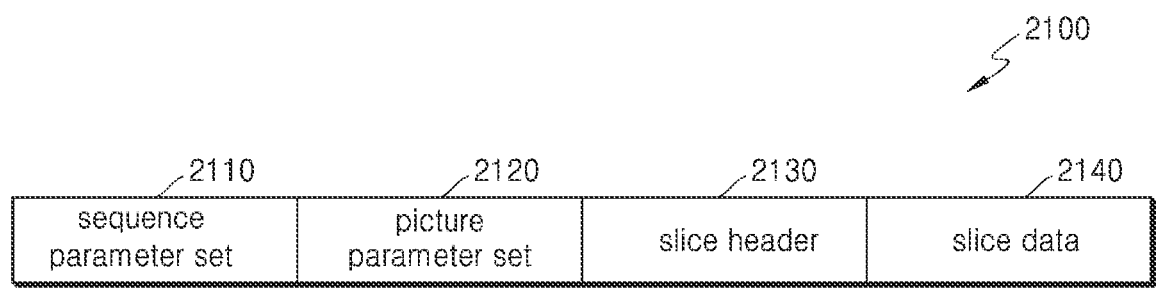
FIG. 21 is an example diagram illustrating a structure of a bitstream generated according to a hierarchical structure of an image.

FIG. 21 is an example diagram of a structure of a bitstream 2100 generated according to a hierarchical structure of an image.

Referring to FIG. 21, the bitstream 2100 may include a sequence parameter set 2110, a picture parameter set 2120, a slice header 2130, and slide data 2140.

Each of the sequence parameter set 2110, the picture parameter set 2120, the slice header 2130, and the slide data 2140 includes syntax elements used in each layer according to the hierarchical structure of the image.

In detail, the sequence parameter set 2110 includes the syntax elements used for an image sequence including one or more images.

The picture parameter set 2120 includes the syntax elements used in one image and may refer to the sequence parameter set 2110.

The slice header 2130 includes the syntax elements used in a slice determined in the image and may refer to the picture parameter set 2120 and the sequence parameter set 2110.

Also, the slice data 2140 includes the syntax elements used in a block determined in the slice and may refer to the slice header 2130, the picture parameter set 2120, and the sequence parameter set 2110.

According to an embodiment, the slice data 2140 may include a syntax element related to a CTU determined in the slice, a syntax element related to a coding unit (CU), a syntax element related to a transform unit (TU), a syntax element related to a prediction block and a residual block, etc.

The structure of the bitstream 2100 illustrated in FIG. 21 is only an example. That is, one or more of the sequence parameter set 2110, the picture parameter set 2120, the slice header 2130, and the slice data 2140 may not be included in the bitstream 2100, and a parameter set which is not illustrated, for example, a video parameter set, a decoder parameter set (DPS), or an adaptation parameter set (APS), may be included in the bitstream 2100.

The decoder 2030 may reconstruct (decode) an image by using the syntax elements extracted from the bitstream. The decoder 2030 may identify a tool used (or enabled) to encode an image sequence from the sequence parameter set and may reconstruct slices determined in the image sequence by using the syntax elements extracted from the slice data based on the identified tool. That a predetermined tool is used (or enabled) to encode an image sequence denotes that the predetermined tool is applied to splitting of a coding unit determined in an image included in the image sequence, prediction encoding of the coding unit, transformation of a residual block, quantization of the residual block, filtering of a reconstruction block, picture management, etc. When the predetermined tool is used with respect to a first coding unit and is not used with respect to a second coding unit, it may be determined that the predetermined tool is used for encoding of an image sequence including the first coding unit and the second coding unit.

The obtainer 2010 may obtain, from the bitstream, a first coding tool enable flag of a first coding tool, indicating whether or not the first coding tool is applicable to the image sequence. Here, the first coding tool enable flag may be obtained from the sequence parameter set. When a tool enable flag with respect to the image sequence indicates activation, a lower tool enable flag may be additionally obtained from a lower data unit (for example, the coding unit) of the image sequence. According to a value of the lower tool enable flag, whether or not an actual coding tool is used for the lower data unit may be identified. For example, when a tool enable flag indicating whether or not an affine tool or an MMVD tool is applicable to the image sequence indicates activation, the lower tool enable flag may be additionally obtained in the level of the coding unit.

However, it is not limited thereto, and the tool enable flag with respect to the image sequence may indicate that a predetermined coding tool is actually used for the image sequence. That is, the tool enable flag is not limited to simply indicate whether or not the predetermined coding tool is applicable to the image sequence, and may indicate whether or not the predetermined coding tool is actually used for the image sequence. Based on a value of sps_admvp_flag to be described below, an interpolation filter used for performing motion compensation may be identified, and in this case, a related coding tool may be actually used in the image sequence. The obtainer 2010 may obtain, from the bitstream, second coding tool enable flag information of at least one second coding tool related to the first coding tool, based on obtained first coding tool enable flag information. Here, the second coding tool enable flag may be obtained from the sequence parameter set, like the first coding tool enable flag. The second coding tool may be a coding tool in a dependent relationship with the first coding tool and may be included in a coding tool group related to the first coding tool.

Here, a plurality of pieces of coding tool enable flag information may be pre-classified (or categorized) into a plurality of coding tool groups based on coding operations corresponding to coding tools. Thereafter, a representative enable flag (or referred to as a platform level flag) from each classified tool group (category) may be pre-identified. The first coding tool enable flag may be one of representative enable flags of the tool groups, and the second coding tool enable flag may be one of the remaining enable flags of the tool groups, except for the representative enable flags. The second coding tool enable flag may be sequentially obtained from the bitstream in an alphabetical order of a title of each flag.

For example, the plurality of categories may include categories of a partitioning tool, an inter-tool, an intra-tool, a context modeling and context coding tool, a transformation tool, a quantization tool, a filtering tool, and a picture buffer management/visual quality tool.

With respect to a predetermined category, when the platform level flag is off, all enable flags with respect to a separate tool in the corresponding category may be identified as off. An embodiment with respect thereto will be described below with reference to Tables 1 and 2, and FIG. 22.

According to an embodiment, enable flags with respect to all of the tools may be first signaled, and after the enable flags with respect to all of the tools are signaled, additional information related to the tools may be signaled. However, it is not limited thereto, and when a predetermined tool is based on the previously signaled tool-related additional information, the tool enable flag of the corresponding tool may be signaled after the previously signaled tool-related additional information is signaled.

According to an embodiment, when a current tool enable flag or tool information is dependent on a previously encoded tool or category, a current tool or a category of the tool may be signaled after the previously encoded tool/category is signaled.

According to an embodiment, a signaling order of the categories may be re-arranged in a predetermined order. For example, the categories may be re-arranged according to an order in which the categories are used by a decoder.

According to an embodiment, in each category, each tool enable flag may be signaled according to other orders than an alphabetical order that is used for signaling the tool enable flag. For example, tools in each category may be generally signaled according to an order with respect to a frequency in which the tools are used.

The first coding tool enable flag information may be enable flag information with respect to a coding tool related to at least one of an advanced motion signaling and interpolation (AMIS) method and an advanced motion vector prediction (ADMVP) method.

Here, the enable flag information with respect to the AMISmethod may be sps_amis_flag, and the enable flag information with respect to the ADMVP method may be sps_admvp_flag. However, when the enable flag information with respect to one of the two coding tools is identified, the enable flag information of the other coding tool may be the second coding tool enable flag information. This aspect will be described below with reference to Tables 1 and 2.

It is not limited thereto, and the first coding tool enable flag information may be flag information including both of the two methods. That is, the first coding tool enable flag information may be a flag in which sps_amis_flag and sps_admvp_flag described above are combined (here, the title of the flag may be one of the flags described above or may correspond to a combined function). For example, the title of the enable flag in which sps_amis_flag and sps_admvp_flag are combined may be sps_admvp_flag, but the corresponding enable flag may indicate activation of each flag before combination. That is, when a value of the combined enable flag indicates activation, it may indicate that all the tools indicated by the flags are enabled, and when the value of the combined enable flag indicates non-activation, it may indicate that all the tools indicated by the flags are non-enabled. Through the combination of the flags, bits may be reduced and the complexity of hardware of an encoder and a decoder may be decreased. This aspect will be described below with reference to FIG. 23.

When the AMIS method is enabled, advanced signaling and interpolation of motion information may be performed in inter-prediction, and when the AMIS method is not enabled, simple signaling and interpolation of motion information may be performed.

For example, when the AMIS method is non-enabled, with respect to a skip mode, a simple skip mode may be used as the skip mode of a baseline profile. A skip candidate index may be signaled for each reference picture list in the simple skip mode. Here, a predetermined location of a spatial and temporal neighboring block may be indicated according to a value of each skip candidate index. For example, when the value of the skip candidate index is 0, it indicates a left block, and when the value of the skip candidate index is 1, in indicates an upper block. When the value of the skip candidate index is 2, it indicates an upper right block, and when the value of the skip candidate index is 3, it indicates a temporal co-located block. However, it is not limited thereto. When there is no motion vector corresponding to the corresponding index value, a value of the motion vector may be set as (1, 1), but it is not limited thereto. In the simple skip mode, residuals may not be transmitted.

A simple interpolation method may be used. An interpolation filter used in this case may have a coefficient defined at every ⅛ pel or ¼ pel location with respect to a luma component or a chroma component. For example, with respect to the luma component, coefficients of a 6-tap interpolation filter may be defined in a ¼ pel unit, and with respect to the chroma component, coefficients of a 4-tap interpolation filter may be defined in a ⅛ pel unit, but it is not limited thereto.

When the AMIS method is enabled, with respect to a skip mode, an advanced skip mode may be used as the skip mode of a main profile. Only one skip candidate index may be signaled in the skip mode of the main profile. Here, compared with a merge mode (to be described below) of the main profile, residual information may not be signaled, in the skip mode of the main profile. An advanced interpolation method may be used. An interpolation filter used in this case may have a coefficient defined at every ⅛ pel or ¼ pel location with respect to a luma component or a chroma component.

The AMVP method may be a motion vector prediction method using an advanced merge mode, etc.

When the AMVP method is enabled, an advanced motion vector prediction method (the advanced merge mode, etc.) may be performed in inter-prediction, and when the AMVP method is not enabled, a simple motion vector prediction method may be performed.

For example, when the AMVP method is non-enabled, a direct mode may be used. As the direct mode, a temporal direct or spatial direct mode used in the H.264 codec or the H.263 codec may be used. The temporal direct mode may be a mode of predicting a motion vector of a current block by taking a motion vector of a co-located block of the current block, and the spatial direct mode may be a mode of predicting a motion vector of a current block according to a predetermined rule by using a motion vector of a neighboring block of the current block, the neighboring block being in a predetermined location. A simple AMVP mode may be used. The simple AMVP mode may be a mode of signaling a prediction direction (including bi-directional prediction and uni-directional prediction), a reference picture index of each reference picture list, and a motion vector difference. The bi-directional prediction may denote a method of prediction based on both of a reference picture list 0 and a reference picture list 1, and the uni-directional prediction may denote a method of prediction based on one of the reference picture list 0 and the reference picture list 1.

That is, in the case of the simple AMVP, after a prediction direction is determined, motion vector prediction which is the same as the prediction used in the simple skip mode (that is, for each reference picture list, signaling a motion vector predictor (MVP) index similar to a skip candidate index) may be performed. Also, in the case of the advanced AMVP, additional index signaling for an MVP may not be performed, and the MVP may be obtained based on a motion vector in a location of a neighboring block corresponding to a motion vector resolution. In the case of the bi-directional prediction, a motion vector difference of a uni-directional reference picture list may not be signaled.

The simple AMVP and the advanced AMVP may be similar to each other in terms of the configuration that the motion vector difference and the reference picture index may be additionally signaled for each reference picture list, and the MVP may be obtained for each list.

When the advanced motion prediction method is enabled, the merge mode (the advanced merge mode) of the main profile may be used. The advanced merge mode may be a merge mode similar to the HEVC (H.265) codec and may be a mode, in which, based on motion information of neighboring candidate blocks (temporally or spatially neighboring blocks), a plurality of merge candidates are identified, one of the plurality of merge candidates is identified by using a signaled merge index, and motion information (a motion vector, a reference picture list, a reference picture index, etc.) is identified. Here, unlike the skip mode, residuals may be additionally signaled. A normal (or advanced) AMVP mode may be used. Unlike the simple AMVP, the normal AMVP mode may exclude a bi-directional prediction direction of the prediction directions. That is, in order to save the external memory bandwidth requirement, the bi-directional prediction direction may not be permitted in 8×4 blocks or 4×8 blocks.

The obtainer 2010 may obtain, from the bitstream, motion information included in at least one coding unit in a frame of the image sequence, according to a condition based on a value of the first coding tool enable flag (sps_amis_flag or sps_admvp_flag, and the flag in which the two flags are combined). Here, the motion information may include information about the motion vector, the reference picture list, and the reference picture index, and the form of the motion information may be an index indicating one of motion information candidates identified in a predetermined mode.

The decoder 2300 may identify an interpolation filter according to the value of the first coding tool flag. The decoder 2030 may perform inter-prediction including motion vector prediction and interpolation on at least one coding unit according to the motion information and the interpolation filter.

According to an embodiment, the first coding tool enable flag information may be enable flag information with respect to a coding tool with respect to an extended intra prediction mode method, and the second coding tool enable flag information may be enable flag information with respect to a coding tool with respect to an intra block copy method. Here, the extended intra prediction mode may support 33 intra-prediction modes, and when the coding tool with respect to the extended intra prediction mode method is not enabled, a simple intra-prediction mode method may be used. The simple intra-prediction mode method may support 5 intra-prediction modes. In particular, the extended intra-prediction mode method may use an intra-prediction mode, such as a bi-linear mode or a plane mode. The simple intra-prediction mode method may use reference pixel value information in an integer pixel unit of a neighboring block. However, the extended intra-prediction mode method may use reference pixel value information in an integer pixel unit or a fractional pixel unit of a neighboring block. The intra block copy method is a mode of intactly copying a previously reconstructed block in a current picture, is a mode in which a block apart from a current block may also be used, and is a mode used for intra-prediction of screen content.

According to an embodiment, the first coding tool enable flag information may be enable flag information with respect to a coding tool with respect to context modeling and an initialization process method, and the second coding tool enable flag information may be enable flag information with respect to a coding tool with respect to an advanced residual coding method. When the enable flag information with respect to the coding tool with respect to the context modeling and the initialization process method indicates non-activation, the context modeling method may not be used, and initial values of all contexts may be set as ½. When the enable flag information with respect to the coding tool with respect to the context modeling and the initialization process method indicates activation, the context modeling method may be used, and the initial values the contexts may be determined according to a slice type and a quantization parameter. When the enable flag information with respect to the coding tool with respect to the advanced residual coding method indicates non-activation, run-length-based coefficient coding (residual coding) may be performed, and when the enable flag information with respect to the coding tool with respect to the advanced residual coding method indicates activation, an advanced coefficient coding method may be used. The advanced coefficient coding method may be a coding method performed by dividing each significant coefficient into various levels for each sub-block.

The first coding tool enable flag information may be enable flag information with respect to a coding tool with respect to advanced quantization and transformation method, and the second coding tool enable flag information may be enable flag information with respect to a coding tool with respect to at least one of an adaptive transform selection method and an advanced delta quantization parameter signaling method. Here, the advanced quantization and transformation method may be a quantization and transformation method used in the main profile. When the coding tool with respect to the advanced quantization and transformation method is not enabled, a simple quantization and transformation method may be used. The simple quantization and transformation method may be a quantization and transformation method used in the baseline profile. The adaptive transform selection method may be a method of selecting a transform kernel of a horizontal direction or a vertical direction from among a plurality of transform kernels.

A difference between the simple quantization and transformation method and the advanced quantization and transformation method may be 1) an intermediate bit-depth when (inverse) transformation is performed and 2) a quantization parameter (QP). In the case of the advanced method, the intermediate bit-depth may be 16 bits at most. However, in the case of the simple method, the same may be 16 bits or more. Here, the intermediate bit-depth may denote a bit-depth of coefficients generated in an intermediate process and stored in a storage when (inverse) transformation is performed.

Compared with the simple quantization and transformation method, the advanced quantization and transformation method may have an advanced efficiency in terms of the storage during the (inverse) transformation. Also, a final chroma QP corresponding to (mapped with) an initial chroma QP having a value greater than a predetermined value (for example, the predetermined value may be 30, but is not limited thereto) may be changed. That is, in the case of the advanced quantization and transformation method, as a value of the initial chroma QP increases by a predetermined value, an increase of a value of the final chroma QP may increase, and in the case of the simple quantization and transformation method, as the value of the initial chroma QP increases by a predetermined value, the increase of the value of the final chroma QP may decrease.

An advanced delta QP signaling method is a method of signaling a delta QP based on an area, and when a coding tool with respect to the advanced delta QP signaling method is not enabled, a simple delta QP signaling method may be used. The simple delta QP signaling method may be a method of signaling a delta QP for each coding unit regardless of a size of the coding unit.

When the first coding tool enable flag indicates that a first coding tool is not applicable to the image sequence, the obtainer 2010 may not obtain, from the bitstream, the second coding tool enable flag information. In this case, the decoder 2030 may identify that a second coding tool is not applicable to the image sequence, without the second coding tool enable flag. Here, the second coding tool enable flag is not signaled through the bitstream, and thus, the reduction of bits may be achieved.

When the first coding tool enable flag indicates that the first coding tool is applicable to the image sequence, the obtainer 2010 may obtain, from the bitstream, the second coding tool enable flag information.

However, it is not limited thereto, and it may be understood by one of ordinary skill in the art that regardless of whether a first coding tool enable flag indicates activation or non-activation, a second coding tool enable flag may be obtained from the bitstream, in order to reduce the number of condition checks during parsing. For example, even when the first coding tool enable flag information indicates that the first coding tool is not applicable to the image sequence, the obtainer 2010 may obtain, from the bitstream, the second coding tool enable flag information. In this case, the second coding tool enable flag information may indicate that the second coding tool may not be applicable to the image sequence. A sequence parameter set of the bitstream appropriate for the main profile may identify a constraint of the main profile to include a coding tool enable flag always having a value of 1, when a coding tool, which is identified when at least one coding tool enable flag, for example, the first coding tool enable flag, of the first coding tool enable flag and the second coding tool enable flag, has a value of 0, is not to be compatible for a predetermined coding operation with a coding tool, which is identified when the at least one coding tool enable flag has a value of 1. When a bitstream is identified to conform with the main profile, the image decoding apparatus 2000 may identify that the bitstream is appropriate for decoding and perform decoding on an image sequence, only when a value of a coding tool enable flag, with respect to a coding tool that is not to be compatible according to a value of a tool enable flag, is 1. When the value is 0, the image decoding apparatus 2000 may identify that the bitstream is not appropriate for decoding and may not perform decoding on the image sequence.

A sequence parameter set of a bitstream conforming with the baseline profile may identify a constraint of the baseline profile to include the first coding tool enable flag always having the value of 0. Here, whether or not the bitstream conforms with a predetermined profile may be identified based on a constraint of the predetermined profile.

Here, in the case of the baseline profile, regardless of a dependent relationship between coding tools, the constraint of the baseline profile may be identified to include the coding tool enable flag always having the value of 0.

However, it is not limited thereto, and the second coding tool enable flag dependent on the first coding tool enable flag may not be obtained from the sequence parameter set, and the value of the second coding tool enable flag may be identified as 0.

When the bitstream is identified to conform with the baseline profile, the image decoding apparatus 2000 may not identify the value of the second coding tool enable flag, may identify that the corresponding bitstream is appropriate for decoding, and may perform decoding on the image sequence, when the value of the first coding tool enable flag is 0.

When the bitstream is identified to conform with the baseline profile, the image decoding apparatus 2000 may identify that the corresponding bitstream is not appropriate for decoding and may not perform decoding on the image sequence, when the value of the first coding tool enable flag is 1.

That is, when the bitstream is identified to conform with the baseline profile, the image decoding apparatus 2000 may identify that the corresponding bitstream is not appropriate for decoding and may not perform decoding on the image sequence, based on the value of the first coding tool enable flag, regardless of the value of the second coding tool enable flag.

The decoder 2030 may identify at least one coding tool of the first coding tool and the second coding tool that may be applied to the image sequence included in the bitstream, based on at least one of the first coding tool enable flag information and the second coding tool enable flag information.

Hereinafter, a method of decoding an image sequence by additionally taking into account a tool set index extracted from a sequence parameter set will be described.

The decoder 2030 may identify a tool required to decode slice data of a bitstream by using a first tool set index extracted from the sequence parameter set.

The first tool set index indicates a tool required to decode the bitstream (the image sequence), in detail, a slide header and/or the slide data of the bitstream, from among a plurality of predetermined tools. A tool required to decode the bitstream and a tool not required to decode the bitstream may be identified from among the plurality of tools based on the first tool set index. Here, to decode the bitstream may denote to extract syntax elements from the bitstream and reconstruct an image from the extracted syntax elements according to a predetermined tool.

The first tool set index may be represented as a first bit string of a predetermined length. For example, the first bit string may include 32 bits. Each of the plurality of bits included in the first bit string may indicate whether or not the plurality of tools are required to decode the bitstream.

Table 1 shows syntax elements of a sequence parameter set, according to an embodiment. Table 2 shows the semantics of the syntax elements of the sequence parameter set, according to an embodiment.

TABLE 1

| SPS RBSP syntax |
|---|
| profile_idc |
| level_idc |
| tool_set_idc |
| . . . |
| sps_amis_flag~2200 |
| if( sps_amis_flag ) { |
|    sps_admvp_flag |
|    sps_affine_flag |
|    sps_amvr_flag                        2210 |
|    sps_dmvr_flag |
|    sps_mmvd_flag |
|    sps_hmvp_flag |
| } |
| sps_eipd_flag~2220 |
| if( sps_eipd_flag ) { |
|    sps_ibc_enabled_flag~2230 |
|    if( sps_ibc_enabled_flag ) |
|       max_ibc_cand_size_minus2 |
| } |
| sps_cm_init_flag~2240 |
| if(sps_cm_init_flag) |
|    sps_adcc_flag~2250 |
| } |
| sps_iqt_flag~2260 |
| if( sps_iqt_flag ) { |
|    sps_ats_flag                           2270 |
|    sps_dquant_flag |
| } |
| . . . |

TABLE 2

| SPS Semantics |
|---|
| sps_amis flag equal to 1 specifies the advanced motion signaling and interpolation are used. sps_amis_flag equal to 0 specifies the advanced motion signaling and interpolation are not used, and the advanced motion vector prediction (sps_admvp_flag), the affine model based motion compensation (sps_affine_flag), the adaptive motion vector resolution (sps_amvr_flag), the decoder-side motion vector refinement (sps_dmvr_flag) and the merge with motion vector difference (sps_mmvd_flag) are not used. |
| sps_admvp_flag equal to 0 specifies that the advanced motion vector prediction is disabled. sps_admvp_flag equal to 1 specifies that the advanced motion vector prediction is enabled. When sps_admvp_flag is not presented, it is inferred to be equal to 0. |
| sps_affine_flag specifies whether the affine model based motion compensation can be used for inter prediction. If sps_affine_flag is equal to 0, the syntax shall be constrained such that no affine model based motion compensation is used in the CVS, and inter_affine_flag and cu_affine_type_flag are not present in the coding unit syntax of the CVS. Otherwise (sps_affine_flag is equal to 1), affine model based motion compensation can be used in the CVS. When sps_affine_flag is not presented, it is inferred to be equal to 0. |
| sps_amvr_flag equal to 1 specifies adaptive motion vector resolution is used. sps_amvr_flag equal to 0 specifies that adaptive motion vector resolution is not used. When sps_amvr_flag is not present, it is inferred to be equal to 0. |

TABLE 2-continued

SPS Semantics sps_dmvr_flag specifies whether decoder-side motion vector refinement can be used for inter
motion vectors refinement. When sps_dmvr_flag is not presented, it is inferred to be equal to 0.
sps_mmvd_flag equal to 1 specifies MMVD is used. sps_mmvd_flag equal to 0 specifies that
MMVD is not used. When sps_mmvd_flag is not present, it is inferred to be equal to 0.
sps_eipd_flag equal to 1 specifies the extended intra prediction modes are used. sps_eipd_flag
equal to 0 specifies the extended intra prediction modes are not used, and the intra block copy
(sps_ibc_enabled_flag) is not used.
sps_ibc_enabled_flag equal to 1 specifies the intra block copy is enabled. sps_ibc_enabled_flag
equal to 0 specifies the intra block copy is disabled. When sps_ibc_enabled_flag is not
presented, it is inferred to be equal to 0.
max_ibc_cand_size_minus2 specifies the maximum block size of the intra block copy mode as follows:
log2MaxIbcCandSize = 2 + log2_max_ibc_cand_size_minus2      (7-32)
log2_max_ibc_cand_size_minus2 shall be in the range of 0 to 4, inclusive.
sps_cm_init_flag equal to 1 specifies the context modeling and initialization processes are used.
sps_cm_init_flag equal to 0 specifies the context modeling and initialization
processes are not used, and the enhanced residual coding (sps_adcc_flag) is not used.
sps_adcc_flag equal to 1 specifies the enhanced residual coding is used. sps_adcc_flag equal to 0
specifies it is not used. When sps_adcc_flag is not presented, it's inferred to be equal to 0.
The array ScanOrder[sPos] specifies the mapping of the zig-zag scan position sPos, ranging from 0
to (1 << log2TbHeight) + (1 << log2TbWidth) − 1, inclusive to a raster scan pozition rPos.
The array invScanOrder[rPos] specifies the mapping of the raster scan position rPos, ranging from 0
to (1 << log2TbHeight) * ( 1 << log2TbWidth) − 1, inclusive to a the zig-zag scan position sPos.
The array Scan Order is derived by invoking clause 6.5.3 with input parameters blkWidth =
( 1 << log2TbWidth ) and blkHeight = (1 << log2TbHeight ) and the array invScanOrder
is derived by invoking clause 6.5.4 with input parameters blkWidth = ( 1 << log2TbWidth )
and blkHeight = ( 1 << log2TbHeight).
sps_iqt_flag equal to 1 specifies the improved quantization and transform are used. sps_iqt_flag
equal to 0 specifies the improved quantization and transform are not used, the advanced
transform selection(sps_ats_flag) and the delta qp signaling process (sps_dquant_flag) are not used.
sps_ats_flag equal to 1 specifies that ats_cu_intra_flag and ats_cu_inter_flag may be present in
the residual coding syntax of the CVS. sps_ats_flag equal to 0 specifies that
ats_cu_intra_flag and ats_cu_inter_flag are not present in the residual coding syntax of the CVS.
When not present, the value of sps_ats_flag is infared to be equal to 0.
sps_dquant_flag equal to 1 specifies the improved delta qp signaling processes is used.
sps_dquant_flag equal to 0 specifies the improved delta qp signaling process is not
used. When not present, the value of sps_dquant_flag is inferred to be equal to 0.

First, profile_idc is extracted from a bitstream. Prfile_idc indicates a profile with which the bitstream conforms. According to an embodiment, profile_idc having a value of 0 may indicate that the bitstream is generated according to a profile (hereinafter, a baseline profile) not requiring tools illustrated in FIG. 23A or using a replacement tool of the corresponding tools (for example, when a binary and ternary splits (BTT) tool is off, using a QT tool, as illustrated in FIG. 22). As described above, the image encoding apparatus 200 and the image decoding apparatus 2000 may use various tools for image encoding/decoding, and the baseline profile is a profile, in which predetermined default tools are defined to be used for encoding/decoding an image.

Profile_idc having a value of 1 may indicate that a bitstream is generated according to a profile (hereinafter, a main profile) in which tools illustrated in FIG. 23A may be used. The main profile is a profile in which it is defined that at least one of predetermined default tools and predetermined advanced tools (for example, the tools illustrated in FIG. 23A) may be used for image encoding/decoding.

level_idc is extracted. level_idc indicates a resolution, etc. of an image, which is an object of encoding/decoding.

Thereafter, a tool set index tool_set_idc is extracted. Here, tool_set_idc may include toolset_idc_h corresponding to a first tool set index and toolset_idc_I corresponding to a second tool set index.

First, toolset_idc_h corresponding to the first tool set index is extracted. FIG. 23B illustrates that toolset_idc_h includes 32 bits. However, a first bit string corresponding to toolset_idc_h may include various numbers of bits.

According to an embodiment, when profile_idc indicates the baseline profile, a value of toolset_idc_h is restricted to 0. That is, values of all bits included in the first bit string are restricted to 0. On the contrary, when profile_idc indicates the main profile, toolset_idc_h may have a value that is greater than or equal to 0. That is, the bits included in the first bit string may have a value of 0 or 1, and thus, a tool required for decoding the bitstream and a tool not required for decoding the bitstream from among advanced tools may be identified.

toolset_idc_I corresponding to the second tool set index may be extracted. toolset_idc_I may be represented as a second bit string of a predetermined length, and the length of toolset_idc_I and the length of toolset_idc_h may be the same as each other.

toolset_idc_I indicates a tool used for encoding an image sequence from among a plurality of tools (the advanced tools described above). While toolset_idc_h indicates the tool required and the tool not required for decoding the bitstream, toolset_idc_I indicates a tool necessarily required for decoding the bitstream. Even when a predetermined tool is identified to be required for decoding the bitstream through toolset_idc_h, the corresponding tool may or may not be used for encoding the image sequence.

However, when a value of a bit corresponding to a predetermined tool in the second bit string corresponding to toolset_idc_I is 1, the corresponding tool is identified to be required for decoding the bitstream and to be used for encoding the image sequence.

Bits included in the second bit string corresponding to toolset_idc_I may correspond to the plurality of tools, respectively, and a corresponding relationship between the second bit string and the plurality of tools may be the same as a corresponding relationship between the first bit string and the plurality of tools illustrated in FIG. 23B.

A value of each bit included in the second bit string may be restricted according to a value of each bit included in the first bit string. When a value of a bit in a predetermined location within the first bit string is 0, a tool corresponding to the corresponding bit is identified not to be required for decoding the bitstream. However, when a value of a bit in a predetermined location within the second bit string is 1, a tool corresponding to the bit is identified to be used for encoding the image sequence. Thus, there is a contradiction between the first bit string and the second bit string. Thus, when the value of the bit in the predetermined location within the first bit string is 0, the value of the bit in the same location within the second bit string is restricted to 0.

Thereafter, tool flags (or coding tool enable flags) indicating whether or not a plurality of tools are used for encoding the image sequence are obtained. As described above, the tool flag having the value of 0 indicates that a tool is not used (or a tool is not enabled) for encoding an image sequence, and the tool flag having the value of 1 indicates that a tool is used (or a tool is enabled) for encoding the image sequence.

Values of the tool flags are restricted according to a value of each bit of the first tool set index (that is, toolset_idc_h) and the second tool set index (that is, toolset_idc_l). As described above, when a value of a bit in a predetermined location within the first bit string is 0, a tool flag of a tool corresponding to the bit in the predetermined location may have to have a value of 0, and when a value of a bit in a predetermined location is 1, a tool flag of a tool corresponding to the bit in the predetermined location may have a value of 0 or 1.

According to an embodiment, when a value of a bit in a predetermined location within the second bit string is 1, a tool flag of a tool corresponding to the bit in the predetermined location may have to have a value of 1, and when a value of a bit in a predetermined location is 0, a tool flag of a tool corresponding to the bit in the predetermined location may have a value of 0 or 1.

Referring to Tables 1 and 2, the image decoding apparatus 2000 may obtain sps_aims_flag 2200 from the bitstream. Referring to FIG. Table 2, sps_amis_flag 2200 may be a flag indicating whether or not advanced motion signaling and interpolation are used.

When a value of sps_amis_flag 2200 is 1, the image decoding apparatus 2000 may obtain sps_admvp_flag, sps_affine_flag, sps_amvr_flag, sps_dmvr_flag, sps_mmvd_flag, and sps_hmvp_flag 2210 from the bitstream. When a value of sps_amis_flag 2200 is 0, the image decoding apparatus 2000 may not obtain sps_admvp_flag, sps_affine_flag, sps_amvr_flag, sps_dmvr_flag, sps_mmvd_flag, and sps_hmvp_flag 2210 from the bitstream. Here, a value of sps_admvp_flag, sps_affine_flag, sps_amvr_flag, sps_dmvr_flag, sps_mmvd_flag, and sps_hmvp_flag 2210 may be identified as 0, based on the value (0) of sps_amis_flag 2200.

Here, referring to Table 2, sps_admvp_flag may be a flag indicating whether or not a coding tool with respect to an AMVP method is enabled. sps_affine_flag may be a flag indicating whether or not affine model-based motion compensation method may be used for inter-prediction. sps_amvr_flag may be a flag indicating whether or not an adaptive motion vector resolution method may be used. sps_dmvr_flag may be a flag indicating whether or not a decoding-side motion vector refinement method may be used for inter motion vector refinement. sps_mmvd_flag may be a flag indicating whether or not a merge with motion vector difference may be used. sps_hmvp_flag may be a flag indicating whether or not an HMVP method may be used.

That is, the image decoding apparatus 2000 may identify sps_amis_flag 2200, which is a platform level flag (or a representative tool enable flag), with respect to a predetermined category (or a predetermined tool group), and when the value of sps_amis_flag 2200 is off, the image decoding apparatus 200 may identify sps_admvp_flag, sps_affine_flag, sps_amvr_flag, sps_dmvr_flag, sps_mmvd_flag, and sps_hmvp_flag 2210 included in the corresponding category as off, without obtaining sps_admvp_flag, sps_affine_flag, sps_amvr_flag, sps_dmvr_flag, sps_mmvd_flag, and sps_hmvp_flag 2210 from the bitstream.

That is, only when sps_amis_flag is 1, the image decoding apparatus 2000 may identify flags (sps_admvp_flag, sps_affine_flag, sps_amvr_flag, sps_dmvr_flag, sps_mmvd_flag, and sps_hmvp_flag) of various tools operating based on a merge mode, which is a significant coding method, to be included in the same category. However, it is not limited thereto, and sps_amis_flag may be a variable for identifying a profile, and profiling may be allowed according to a value of the corresponding variable. That is, according to the value of sps_amis_flag, whether or not to activate subordinate tools may be identified. The subordinate tools may be dependent on sps_amis_flag, and profiling may be performed by grouping the subordinate tools in one category based on sps_amis_flag.

The image decoding apparatus 2000 may obtain sps_eipd_flag 2220 from the bitstream. Referring to Table 2, sps_eipd_flag 2220 may be a flag indicating whether or not extended intra-prediction modes are used.

When a value of sps_eipd_flag 2220 is 1, the image decoding apparatus 2000 may obtain sps_ibc_enabled_flag 2230 from the bitstream. When the value of sps_eipd_flag 2220 is 0, the image decoding apparatus 2000 may not obtain sps_ibc_enabled_flag 2230 from the bitstream. Here, a value of sps_ibc_enabled_flag 2230 may be identified as 0, based on the value (0) of sps_eipd_flag 2220. Here, referring to Table 2, sps_ibc_enabled_flag 2230 may be a flag indicating whether or not an intra-block copy method is used.

That is, the image decoding apparatus 2000 may identify sps_eipd_flag 2220, which is a platform level flag, with respect to a predetermined category, and when a value of sps_eipd_flag 2220 is off, the image decoding apparatus 2000 may identify sps_ibc_enabled_flag 2230 included in the corresponding category as off without obtaining sps_ibc_enabled_flag 2230 from the bitstream.

That is, when sps_eipd_flag is 0, information about a reference pixel is extracted in an integer pixel unit of a neighboring block, and thus, the complexity is low, and when sps_eipd_flag flag is 1, the information about the reference pixel is extracted in the integer pixel unit and a fractional pixel unit of the neighboring block, and other prediction methods (for example, a bi-linear or plane prediction method) than angular prediction (prediction having a directionality) are used, and thus, the complexity is relatively high. Also, sps_ibc_enabled flag is a flag indicating whether or not a prediction method based on copying in a block unit in an area of a current picture, the area being previously decoded, is used in an intra mode, and has significantly high complexity. Thus, when a simple intra-prediction mode having low complexity is used, the intra-block copy method having high complexity may not be used, and only when an extended intra-prediction mode having high complexity is used, the flag indicating whether or not the intra-block copy method having high complexity is used may be obtained. However, it is not limited thereto. sps_eipd_flag may be a variable for identifying a profile, and profiling may be allowed according to a value of the corresponding variable.

The image decoding apparatus 2000 may obtain sps_cm_init_flag 2240 from the bitstream. Referring to Table 2, sps_cm_init_flag 2240 may be a flag indicating whether or not context modeling and an initial process are used.

When a value of sps_cm_init_flag 2240 is 0, the image decoding apparatus 2000 may not obtain sps_adcc_flag 2250 from the bitstream. Here, a value of sps_adcc_flag 2250 may be identified as 0, based on the value (0) of sps_cm_init_flag 2240. Here, referring to Table 2, sps_adcc_flag 2250 may be a flag indicating whether or not an enforced residual coding (coefficient coding) method is used.

That is, the image decoding apparatus 2000 may identify sps_cm_init_flag 2240, which is the platform level flag, with respect to a predetermined category, and when a value of sps_cm_init_flag 2240 is off, the image decoding apparatus 2000 may identify sps_adcc_flag 2250 included in the corresponding category as off without obtaining sps_adcc_flag 2250 from the bitstream.

When the value of sps_cm_init_flag is 0, the image decoding apparatus 2000 may not use a context adaptive binary arithmetic coding (CABAC) context modeling method and may set an initial value of all contexts as ½, and when the value of sps_cm_init_flag is 1, the image decoding apparatus 2000 may allow the context modeling and may set the initial value of all contexts according to a slice type and a QP. When the value of sps_adcc_flag is 0, residual coding (that is, run-length-based coefficient coding) may be performed based on run-level last information, and when the value of sps_adcc_flag is 1, residual coding may be performed by dividing each coefficient into various levels in a sub-block unit. When the value of sps_adcc_flag is 1, context modeling is important, but when the value of sps_cm_init_flag is 0, context modeling is not used. Thus, in this situation, performance is not much different from the performance of the case in which the value of sps_adcc_flag is 0. Thus, it may be configured to signal sps_adcc_flag only when the value of sps_cm_init_flag is 1. However, it is not limited thereto, and sps_cm_init_flag may be a variable for identifying a profile, and profiling may be allowed according to a value of the corresponding variable.

The image decoding apparatus 2000 may obtain sps_iqt_flag 2260 from the bitstream. Referring to Table 2, sps_iqt_flag 2260 may be a flag indicating whether or not an advanced quantization and transformation method is used.

When a value of sps_iqt_flag 2260 is 0, the image decoding apparatus 2000 may not obtain sps_ats_flag and sps_dquant_flag 2270 from the bitstream. Here, a value of sps_ats_flag and sps_dquant_flag 2270 may be identified as 0, based on the value (0) of sps_iqt_flag 2260. Here, referring to Table 2, sps_ats_flag may be a flag indicating whether or not an adaptive transform selection method according to inter-prediction or intra-prediction is used, and sps_dquant_flag may be a flag indicating whether or not an advanced delta QP signaling process is used.

When a value of sps_iqt_flag 2260 is 1, the image decoding apparatus 2000 may obtain sps_ats_flag and sps_dquant_flag 2270 from the bitstream.

That is, the image decoding apparatus 2000 may identify sps_iqt_flag 2260, which is a platform level flag, with respect to a predetermined category, and when a value of sps_iqt_flag 2260 is off, the image decoding apparatus 2000 may identify sps_ats_flag and sps_dquant_flag 2270 included in the corresponding category as off without obtaining sps_ats_flag and sps_dquant_flag 2270 from the bitstream.

sps_iqt_flag may be a variable for identifying a profile, and profiling may be allowed according to a value of the corresponding variable. Here, in order to allow a profile of a simple form, when a value of sps_iqt_flag is 0, sps_ats_flag to select a multiple transform kernel may not be allowed and sps_dquant_flag related to a method of signaling a domain-based delta QP in a block level may not be allowed. Also, for a profile having a more complex form, when the value of sps_iqt_flag is 1, corresponding tools may be allowed.

Table 3 the syntax and the semantics of a sequence parameter set, according to an embodiment.

TABLE 3

| SPS RBSP syntax | |   |
|---|---|---|
| ... | | |
| sps_admvp_flag | u(1)~2310 | |
| if( sps_admvp_flag ) { | | |
|   sps_affine_flag | u(1) | |
|   sps_amvr_flag | u(1) | |
|   sps_dmvr_flag | u(1) | 2320 |
|   sps_mmvd_flag | u(1) | |
|   sps_hmvp_flag | u(1) | |
| } | | |
| ... | | |

| SPS RBSP semantics |
|---|
| sps_admvp_flag equal to 0 specifies that the advanced motion vector prediction, signaling, and interpolation are disabled. sps_admvp_flag equal to 1 specifies that the advanced motion vector prediction, signaling, and interpolation are enabled. When sps_admvp_flag is not presented, it is inferred to be equal to 0. |

Referring to Table 3, unlike Table 1, the image decoding apparatus 2000 may obtain, from a bitstream, sps_admvp_flag 2310 combining sps_amis_flag 2200 and sps_admvp_flag 2210. Unlike sps_admvp_flag 2210, sps_admvp_flag 2310 may additionally indicate whether or not signaling and interpolation are enabled.

When a value of sps_admvp_flag 2310 is 0, the image decoding apparatus 2000 may obtain sps_affine_flag, sps_amvr_flag, sps_dmvr_flag, sps_mmvd_flag, and sps_hmvp_flag 2320 from the bitstream. Here, sps_affine_flag, sps_amvr_flag, sps_dmvr_flag, sps_mmvd_flag, and sps_hmvp_flag 2320 may be substantially the same as sps_affine_flag, sps_amvr_flag, sps_dmvr_flag, sps_mmvd_flag, and sps_hmvp_flag 2210 of Table 1.

FIG. 22 is a diagram illustrating a tool flag and the functionality according to a value of each tool flag. Table 4 below shows a main profile.

Referring to FIG. 22, an enabled coding operation (or function) may be identified according to a value (on/off) of each tool flag.

For example, sps_btt_flag may be related to a partitioning method (a picture split structure), sps_admvp_flag may be related to whether or not a merge mode is used in inter-prediction, sps_eipd_flag may be related to an intra-prediction method, sps_adcc_flag may be related to coefficient coding, sps_amis_flag may be related to an interpolation filter and inter-prediction, sps_iqt_flag may be related to transformation and quantization, sps_addb_flag may be related to a deblocking filter, sps_cm_init_flag may be related to context modeling, sps_rpl_flag may be related to buffer management, sps_pocs_flag may be related to POD derivation, and sps_dqaunt_flag may be related to a delta QP signaling process.

Here, the flags may not simply indicate whether or not each tool is enabled. When a tool is not enabled (off), another coding tool which is not compatible with a coding tool when the tool is enabled (on) may be used. When, with respect to a coding tool, a value of a coding tool flag is generated/identified during encoding/decoding, available tool combinations may be greatly increased based on the tool flag, in the encoding, and thus, hardware complexity may be increased. Also, in the decoding, based on tool identification based on the value of the tool flag and a coding operation based on the tool identification, hardware complexity may be increased.

TABLE 4

Main profile

Conformance of a bitstream to the Main profile is indicated by profile_idc equal to 1.
Bitstreams conforming to the Main profile shall obey the following constraints:
Syntax ellement toolset_idc shall be in the range from 1 to x1 FFFFF, inclusive.
Tools flag values in active SPSs shall conform the constrains specified in Table A.6.
Active SPSs shall have chroma_format_idc equal to 0 or 1 only.
Active SPSs shall have bit_depth_iuma_minus8 equal to 2 only.
Active SPSs shall have bit_depth_chroma_minus8 equal to 2 only.
Active SPSs shall have sps_btt_flag equal to 1 only.
Active SPSs shall have sps_admvp_flag equal to 1 only
Active SPSs shall have sps_eipd_flag equal to 1 only.
Active SPSs shall have sps_adcc_flag equal to 1 only.
Active SPSs shall have sps_iqt_flag equal to 1 only.
Active SPSs shall have sps_addb_flag equal to 1 only.
Active SPSs shall have sps_cm_init flag equal to 1 only.
Active SPSs shall have sps_rpl_flag equal to 1 only.
Active SPSs shall have sps_pocs_flag equal to 1 only.
Active SPSs shall have sps_dquant_flag equal to 1 only.
The level constraints specified for the Main profile in clause A.4 shall be fulfilled.
Decoders conforming to the Main profile with toolset_idc equal to Tldc_dec (in range from 1 to x1FFFFF inclusive) at a specific level (identified by a specific value of level_idc) shall be capable of decoding all bitstreams for which all of the following conditions apply:
The bitstream is indicated to conform to the Main profile with toolset_idc equal to Tldc_Bit, and Tldc_Dec | Tldc_Bit is equal to Tldc_Dec.
The bitstream is indicated to conform to a level that is lower than or equal to the specified level.

In order to solve this problem, referring to Table 4, when there are coding tools that are not compatible with each other according to the value of the tool flag, a value of the corresponding tool flag may also be set as 0, in the main profile. An encoder may reduce the available tool combinations through this constraint to reduce the hardware complexity. Also, the hardware complexity due to tool identification based on the value of the tool flag may be reduced, and a decoder may not have to implement all functions by taking into account the main profile, and thus, the hardware complexity may be decreased. When a value of the corresponding tool flag is 0, the decoder may identify that the bitstream is not appropriate to be decoded and may not decode the corresponding bitstream.

For example, referring to FIG. 22, sps_btt_flag is a flag indicating whether or not a BTT method is allowed, and when a value of sps_btt_flag is on, the BTT method may be used, and when the value of sps_btt_flag is off, a quad split may be used. The two split methods may perform the same partitioning, but may not performed together. Thus, referring to Table 4, as a constraint of the main profile, there may be a condition that sps_btt_flag has to have only a value of 1. Thus, it may not be required to implement hardware by taking into account a case where the value of sps_btt_flag is 0, and thus, the complexity of the encoder/decoder may be decreased.

Likewise, when there are processes that are incompatible with each other according to the value of the tool flag, the value of the corresponding tool flag may be set as 1 in the main profile. Thus, it may not be required to implement hardware by taking into account a case where the value of the corresponding tool flag is 0, and thus, the complexity of the encoder/decoder may be decreased.

FIG. 23A is a table illustrating a tool corresponding to each bit of a first bit string. FIG. 22 illustrates the total of 21 tools from a BTT tool corresponding to a bit having an index of 0 to an HMVP tool corresponding to a bit having an index of 20. A processing process of one or more of the tools will be described below.

As illustrated in FIG. 23A, each bit included in the first bit string may correspond to any one tool of the plurality of tools. The bit having the index of 0, for example, a bit located at the most right side in the first bit string, may indicate whether or not the BTT tool is required, and a bit having an index of 1, for example, a bit located at the left position to the bit having the index of 0, may indicate whether or not a split unit coding ordering (SUCO) tool is required. The bit index illustrated in FIG. 23A indicates a location of the bit included in the first bit string. For example, the bit index may indicate a distance in a left direction, by which a corresponding bit is apart from the bit at the most right side in the first bit string.

When a value of the bit having the index of 0 is 1, the BTT tool may be required to decode the bitstream, and when the value of the bit having the index of 0 is 0, the BTT tool may not be required to decode the bitstream. Also, when a value of the bit having the index of 1 is 1, the SUCO tool may be required to decode the bitstream, and when the value of the bit having the index of 1 is 0, the SUCO tool may not be required to decode the bitstream.

A first tool set index restricts a capability of the decoder of decoding the bitstream.

Thus, the decoder 2030 may identify whether or not the bitstream may be reconstructed based on the capability of the decoder 2030, from the value of each bit included in the first bit string. For example, when the value of the bit having the index of 0 is 1, and when the decoder 2030 cannot use the BTT tool, the decoder 2030 may determine that it is impossible to decode the bitstream. When it is impossible to use a tool identified from the first tool set index, that is, a tool required to decode the bitstream, the decoder 2030 may stop decoding the bitstream.

FIG. 23B is an example diagram illustrating values of tool flags that are restricted according to a value of a first tool set index and a value of a second tool set index.

In FIG. 23B, sps_btt_flag<=toolset_idc_h & 0x1 denotes that when a value of the bit (the bit having the index of 0) located at the right most position in the first bit string is 1, sps_btt_flag may have a value of 0 or 1. Also, sps_btt_flag>=toolset_idc_I & 0x1 denotes that when a value of a bit having the index of 0 in a second bit string is 1, sps_btt_flag may have the value of 1. That is, when the value of the bit having the index of 0 in the first bit string is 1, and the value of the bit having the index of 0 in the second bit string is 1, the value of sps_btt_flag is restricted to 1. Also, when the value of the bit having the index of 0 in the first bit string is 1, and the value of the bit having the index of 0 in the second bit string is 0, the value of sps_btt_flag is restricted to 0 or 1. Also, when the value of the bit having the index of 0 in the first bit string is 0, and the value of the bit having the index of 0 in the second bit string is 0, the value of sps_btt_flag is restricted to 0. As described above, when the value of the bit having the index of 0 in the first bit string is 0, the bit having the index of 0 in the second bit string may not have the value of 1.

As illustrated in FIG. 23B, a value of sps_suco_flag is restricted according to a value of a bit having the index of 1 in the first bit string and a value of a bit having the index of 1 in the second bit string, and a value of sps_amvr_flag is restricted according to a value of a bit having the index of 2 in the first bit string and a value of a bit having the index of 2 in the second bit string.

Hereinafter, processing processes of one or more available tools in the main profile are described.

An image is divided into slices, and a CTU of a predetermined size included in the slice is hierarchically split into at least one coding unit. Each coding unit is prediction-encoded/prediction-decoded through inter-prediction or intra-prediction. A BTT tool is a tool configured to encode/decode a coding unit determined from the CTU via splitting the current coding unit into two lower coding units or three lower coding units. When it is cost-effective (for example, in the aspect of a rate-distortion cost) to encode the current coding unit by splitting the current coding unit into two or three lower coding units, the BTT tool may be used. As described above, the BTT tool may be available in the main profile. In the baseline profile, the current coding unit may be intactly encoded without being split or may be encoded after being quad-split.

A SUCO tool is a technique for increasing the encoding performance by changing an order of encoding/decoding of a coding unit. According to the SUCO tool, when a split direction of the coding unit is a vertical direction, an encoding/decoding order of a lower coding unit may be determined as a left lower coding unit and then a right lower coding unit or as a right lower coding unit and then a left lower coding unit. In the baseline profile, lower coding units split from the coding unit or the CTU may be encoded/decoded in a predetermined order, for example, from a left lower coding unit and then a right lower coding unit.

An AMVR tool is a tool for obtaining a motion vector used for inter-prediction of the current coding unit by any one resolution from among a plurality of resolutions. As a size of an image is increased, when a motion vector is obtained by only one resolution, a great number of bits may be required to represent the motion vector. The resolution may denote a degree of precision of a position of a pixel which the motion vector may indicate, from among pixels included in a reference image (or an interpolated reference image). That the resolution of the motion vector has an N-pixel unit (N is a rational number) denotes that the motion vector may have the precision of the N-pixel unit. In the AMVR tool, a differential motion vector between the motion vector and a prediction motion vector of the current coding unit is downscaled according to the resolution of the motion vector of the current coding unit and then signaled to a decoder. The decoder upscales the downscaled differential motion vector and then reconstructs the motion vector of the current coding unit. In the baseline profile, the motion vector of the current coding unit may be obtained by one resolution. For example, in the baseline profile, as in the AMVP mode defined in the HEVC standards, the differential motion vector between the motion vector and the prediction motion vector of the current coding unit may be signaled to the decoder without being downscaled, and the decoder may reconstruct the motion vector of the current coding unit by combining the differential motion vector with the prediction motion vector.

An MMVD tool is a tool applying the concept of a differential motion vector to a merge mode defined in the HEVC standards. In the merge mode, motion vectors of blocks neighboring a current coding unit are added to a candidate list, and any one of the motion vectors in the candidate list is selected as a motion vector of the current coding unit. Information indicating any one of the motion vectors in the candidate list is signaled to a decoder. Because the motion vector of the current coding unit may be indicated by only the information indicating any one of the motion vectors in the candidate list, the number of bits required to represent the motion vector may be reduced. Generally, in the merge mode, the differential motion vector between the motion vector of the current coding unit and the motion vector selected in the candidate list is not signaled to the decoder. The MMVD tool is different from the merge mode defined in the HEVC standards in that the MMVD tool signals the differential motion vector between the motion vector of the current coding unit and the motion vector selected in the candidate list to the decoder. In the MMVD tool, information indicating a distance by which the motion vector selected in the candidate list has to be moved in a direction is signaled to the decoder. That is, information indicating a variance distance and a variance direction of the motion vector selected in the candidate list is signaled to the decoder as the differential motion vector. The decoder obtains the motion vector of the current coding unit by changing the motion vector selected in the candidate list according to the variance distance and the variance direction. In the baseline profile, the MMVD tool may not be used for inter-prediction of the current coding unit, and instead, the previous merge mode, skip mode, AMVP mode, etc. may be used.

A DMVR tool is a technique for advancing two motion vectors used by a decoder for bi-directional inter-prediction. In the DMVR tool, two initial motion vectors signaled from an encoder are advanced to obtain more accurate motion vectors. In the baseline profile, the motion vectors signaled from the encoder may not be additionally advanced and may be used as a prediction motion vector of a current coding unit or as a motion vector of the current coding unit.

An ALF tool is a filtering technique for suppressing an artifact of reconstructed images and improving visual and objective quality. In the ALF tool, two types of diamond filter patterns (for example, 5×5 and 7×7) are defined for luma filtering, and one type of diamond filter patter (for example, 5×5) is defined for chroma filtering. In the baseline profile, the ALF tool may not be applied, and deblocking filtering and/or SAO filtering may be applied with respect to a reconstructed image.

An HTDF tool is a technique for filtering a reconstructed image as the ALF tool. The HTDF tool reduces a ringing artifact occurring due to quantization of residual coefficients. The HTDF tool may be applied to a reconstructed luma block when a QP is greater than a predetermined value. A transform core may be 2×2 Hadamard transform and consequently may be a 3×3 low bandwidth smoothing filter. In the baseline profile, the HTDF tool may not be applied, and deblocking filtering and/or SAO filtering may be applied with respect to a reconstructed image.

An adaptive transform selection (ATS) tool is a technique to apply DST-VII transform and DCT-VIII transform to transformation/inverse-transformation of a residual block, in addition to DCT-II transform available in the baseline profile An improved delta qp signaling processes (DQUANT) tool may be an improved tool for a method of signaling a difference QP (that is, a difference between a prediction QP and a QP) as a level of a coding unit. Here, the improved tool may be a tool related to a method of additionally identifying a value of cuQpDeltaCode with respect to a coding unit (including a coding unit being split)based on a size (or a width) of the coding unit, a size (or a width) of a signaling unit of a difference QP, and a size of a largest transform unit and obtaining a syntax element with respect to the difference QP based on the additionally identified value. A non-improved tool may be a tool related to a method of obtaining a syntax element with respect to a difference QP without identifying a value of cuQpDeltaCode (or by only identifying a basic value or regardless of the value of cuQpDeltaCode).

An HMVP tool is a technique for including a motion vector of a coding unit far away from a current coding unit in a candidate list, in addition to including motion vectors of temporally or spatially adjacent blocks in the candidate list, in a merge mode or an AMVP mode. In the baseline profile, the motion vectors of the blocks adjacent to the current coding unit may be included in the candidate list, and the motion vector of the coding unit far away from the current coding unit may not be used as a candidate.

FIG. 23C is an example diagram illustrating values of tool flags that are restricted according to a value of a first tool set index, according to an embodiment.

FIG. 23C is similar to Table 4. However, the value of the tool flag may be restricted according to a value toolset_idc of one tool set index, rather than two tool set indexes. In particular, sps_admvp_flag may be a flag combining sps_admvp_flag 2200 and sps_amis_flag 2210 of Table 1, as described above with reference to Table 3.

FIGS. 24A through 24D are diagrams illustrating the syntax of a coding unit based on a value of sps_admvp_flag 2310 of Table 3, according to an embodiment. Table 5 shows the semantics of a coding unit based on a value of sps_admvp_flag 2310.

TABLE 5

| BIT INDEX | TOOL |
|---|---|
| 0 | btt |
| 1 | suco |
| 2 | amvr |
| 3 | mmvd |
| 4 | affine |
| 5 | dmvr |
| 6 | alf |
| 7 | admvp |
| 8 | eipd |
| 9 | adcc |
| 10 | ibc |
| 11 | iqt |
| 12 | htdf |
| 13 | addb |
| 14 | cm_init |
| 15 | ats |
| 16 | rpl |
| 17 | pocs |
| 18 | dquant |
| 19 | dra |
| 20 | hmvp |
| 21 . . . 31 | reserved |

Tables 6 and 7 describe a decoding process (an inter-prediction process) based on the value of sps_admvp_flag 2310 of Table 3, according to an embodiment.

TABLE 6

| Derivation process for motion vector components and reference indices |
|---|
| Inputs to this process are: |
| a luma location ( xCb, yCb ) of the top-left sample of the current luma coding block relative to the top-left luma sample of the current picture, two variables nCbW and nCbH specifying the width and the height of the current luma coding block. |
| Outputs of this process are: |
| the luma motion vectors mvL0[ 0 ][ 0 ] and mvL1[ 0 ][ 0 ], |
| when ChromaArrayType is not equal to 0, the chroma motion vectors mvCL0[ 0 ][ 0 ] and mvCL1[ 0 ][ 0 ] |
| the reference indices refIdxL0 and refIdx1, |
| prediction list utilization flags predFlagL0[ 0 ][ 0 ] and predFlagL1[ 0 ][ 0 ], |
| the DMVR utilization flag dmvrAppliedFlag. |
| Let the variable LX be RefPicListX, with X being 0 or 1, of the current picture. |
| For the derivation of the variables mvL0[ 0 ][ 0 ] and mvL1[ 0 ][ 0 ], refIdxL0 and refIdxL1, predFlagL0[ 0 ][ 0 ] and predFlagL1[ 0 ][ 0 ], and dmvrAppliedFlag, the following applies: |
| If sps_admvp_flag is equal to 1, and at least one of cu_skip_flag[ xCb ][ yCb ] and merge_mode_flag[ xCb ][ yCb ] is equal to 1, the derivation process for luma motion vectors for merge mode as specified in clause 8.5.2.2 is invoked with the luma location ( xCb, yCb ), and the variables nCbW and nCbH as inputs, and the outputs being the luma motion vectors mvL0[ 0 ][ 0 ] and mvL1[ 0 ][ 0 ], the reference indices refIdxL0 and refIdxL1, and the prediction list utilization flags predFlagL0[ 0 ][ 0 ] and predFlagL1[ 0 ]¦ 0 ]. The DMVR utilization flag dmvrAppliedFlag is set equal to 1. |
| Otherwise, if sps_admvp_flag is equal to 0 and cu_skip_flag[ xCb ][ yCb ] is equal to 1, the derivation process for luma motion vectors for skip mode as specified in clause 8.5.2.1 is invoked with the luma location ( xCb, yCb ), and the variables nCbW and nCbH as inputs, and the outputs being the luma motion vectors mvL0[ 0 ][ 0 ] and mvL1[ 0 ][ 0 ], the reference indices refIdxL0 and refIdxL1, and the prediction list utilization flags predFlagL0[ 0 ][ 0 ] and predFlagL1[ 0 ][ 0 ]. The variable dmvrAppliedFlag is set equal to 0. |
| Otherwise, if sps_admvp_flag is equal to 0 and if direct_mode_flag[ xCb ][ yCb ] is equal to 1, the derivation process for luma motion vectors for direct mode as specified in clause 8.5.2.10 is invoked with the luma location ( xCb, yCb ), and the variables nCbW and nCbH as inputs, and the outputs being the luma motion vectors mvL0[ 0 ][ 0 ] and mvL1[ 0 ][ 0 ], the reference indices refIdxL0 and refIdxL1, and the prediction list utilization flags predFlagL0[ 0 ][ 0 ] and predFlagL1[ 0 ][ 0 ]. The variable dmvrAppliedFlag is set equal to 1. |
| Otherwise (direct_mode_flag[ xCb ][ wCb ], merge_mode_flag[ xCb ][ yCb ] and cu_skip_flag[ xCb ][ yCb ] are all equal to 0), for X being replaced by either 0 or 1 in the variabies predFlagLX[ 0 ][ 0 ], |
| mvLX[ 0 ][ 0 ], refIdxLX and MvcLX, in PRED_LX, and in the syntax elements ref_idx_lX, the following ordered steps apply |
| The variable dmvrAppliedFlag is set equal to 0. |
| The variables refIdxLX and predFlagLX[ 0 ][ 0 ] are derived as follows: |
| If sps_admvp_flag is equal to 0, the following applies. |

TABLE 6-continued

Derivation process for motion vector components and reference indices

If inter_prod_idc[ xCb ][ yCb ] is equal to PRED_LX or PRED_BI, the variables refIdxLX and predFlagLX[ 0 ][ 0 ] are specified by:
refIdxLX = ref_idx_lX[ xCb ][ yCb ] (8-256)
predFlagLX[ 0 ][ 0 ] = 1 (8-257)
Otherwise, the variables refIdxLX and predFlagLX[ 0 ][ 0 ] are specified by:
refIdxLX = −1 (8-258)
predFlagLX[ 0 ][ 0] = 0 (8-259)
If sps_admvp_flag is equal to 1, the following applies:
If bL_pred_idx is equal to 0, the following applies:
If inter_pred_idc[ xCb ][ yCb ] is equal to PRED_LX or PRED_BI, the variables refIdxLX and predFlagLX[ 0 ][ 0 ] are specified by:
refIdxLX = ref_idx_lX[ xCb ][ yCb ] (8-260)
predFlagLx[ 0 ][ 0 ] = 1 (8-261)
Otherwise, the variables refIdxLX and predFlagLX[ 0 ][ 0 ] are specified by:
refIdxLX = −1 (8-262)
predFlagLX[ 0 ][ 0 ] = 0 (8-263)
Otherwise (bi_pred_idx is not equal to 0), the following applies:
The variable predFlagLX[ 0 ][ 0 ] is specified by:
predFlagLX[ 0 ][ 0 ] = 1 (8-264)
The derivation process for luma reference index in clause 8.5.2.15 is invoked with the luma coding block location ( xCb, yCb ),
the coding block width nCbW and the coding block height nCbH
as inputs, and the output being refIdxLX.
. . .
When all of the following conditions are true, refIdxL1 is set equal to −1 and predFlagL1[0][0] is set equal to 0:
predFlagL0[ 0 ][ 0 ] is equal to 1,
predFlagL1| 0 ][ 0 ] is equal to 1,
sps_admvp_flag is equal to 1,
the value of (nCbW + nCbH ) is equal to 12.

TABLE 7

8.5.2.10 Derivation process for luma motion vectors for direct mode
This process is only invoked when direct_mode_flag[ xCb ][ yCb ] is equal to 1 and
sps_admvp_flag is equal to 0, where ( xCb, yCb ) specify the top-left sample of the
current luma coding block relative to the top-left luma sample of the current picture.
. . .
8.5.2.13 Derivation process for luma motion vector prediction
Inputs to this process are:
a luma location ( xCb, yCb ) of the top-left sample of the current luma coding block
relative to the top-left luma sample of the current picture,
two variables nCbW and nCbH specifying the width and the height of the current luma coding block,
the reference index of the current coding unit partition refIdxLX, with X being 0 or 1.
Output of this process is the prediction mvpLX of the motion vector mvLX, with X being 0 or 1.
When sps_admvp_flag is equal to 0, the following applies:
The motion vector predictor mvpL0 and mvpL1 are derived in the following ordered steps:
The variables mvpL0 and mvpL1 are set as follows:
mvpL0[ 0 ] = 0 (8-388)
mvpL0[ 1 ] = 0 (8-389)
mvpL1[ 0 ] = 0 (8-390)
mvpL1[ 1 ] = 0 (8-391)
If refIdxL0 is not equal to −1, the derivation process for motion vector predictor from neighbouring
coding unit partitions in clause 8.5.2.9 is invoked with the luma coding block location ( xCb, yCb ),
the coding block width nCbW, the coding block height nCbH, the motion vector prediction index
mvpIdx equal to mvp_idx_l0[ xCb ][ yCb ] and the reference list identifier listX set equal to 0 as inputs,
and the output being the motion vector predictor mvPred. The variable mvpL0 is set equal to mvPred.
If refIdxL1 is not equal to −1, the derivation process for motion vector predictor from neighbouring
coding unit partitions in clause 8.5.2.9 is invoked with the luma coding block location ( xCb, yCb ),
the coding block width nCbW, the coding block height nCbH, the motion vector prediction index
mvpIdx equal to mvp_idx_l1[ xCb ][ yCb ) and the reference list identifier listX set equal to 1 as inputs,
and the output being the motion vector predictor mvPred, The variable mvL1 is set equal to mvPred
Otherwise, when sps_admvp_flag is equal to 1, the following applies:
A variable mvpAvailFlag is set equal to 0.
. . .

FIGS. 24E through 24H are diagrams illustrating an interpolation filter based on the value of sps_admvp_flag 2310 of Table 3, according to an embodiment. FIG. 24I is a diagram illustrating a binarization parameter based on the value of sps_admvp_flag 2310 of Table 3.

Referring to FIGS. 24A through 24D, the image decoding apparatus 2000 may obtain various motion information from the coding unit based on the value of sps_admvp_flag 2310, in which sps_amis_flag 2200 and sps_admvp_flag 2210 are combined as one, rather than based on the value of sps_am-is_flag 2200 and the value of sps_admvp_flag 2210 of Table 1. Also, referring to Tables 5-7, the image decoding apparatus 2000 may perform a specific inter-prediction process based on the value of sps_admvp_flag 2310. Also, referring to FIGS. 24E through 24H, the image decoding apparatus 2000 may identify an interpolation filter (a coefficient of the interpolation filter) used for performing inter-prediction based on the value of sps_admvp_flag 2310. Referring to FIG. 24F, the image decoding apparatus 2000 may identify a binarization parameter based on the value of sps_admvp_flag 2310 and may inversely binarize a syntax element inter_pred_idc obtained from a bitstream.

By merging sps_admvp_flag and sps_amis_flag into one flag, specific functions of a basic inter-prediction mode method are not indicated by being divided into two flags and may be indicated as one flag. Thus, a function (a coding operation) of the inter-prediction according to the baseline profile or the main profile may be divided only based on a value of the corresponding merge flag. Thus, inter-prediction, such as motion information signaling, interpolation, advanced motion vector prediction, etc., may be performed.

It is described with reference to FIGS. 22 and 25 that there are 21 tools that are only available in the main profile. Detailed operation processes of the tools except for the tools described above are not essential parts of the inventive concept of the present disclosure, and thus, are not described in detail.

Figure 25:
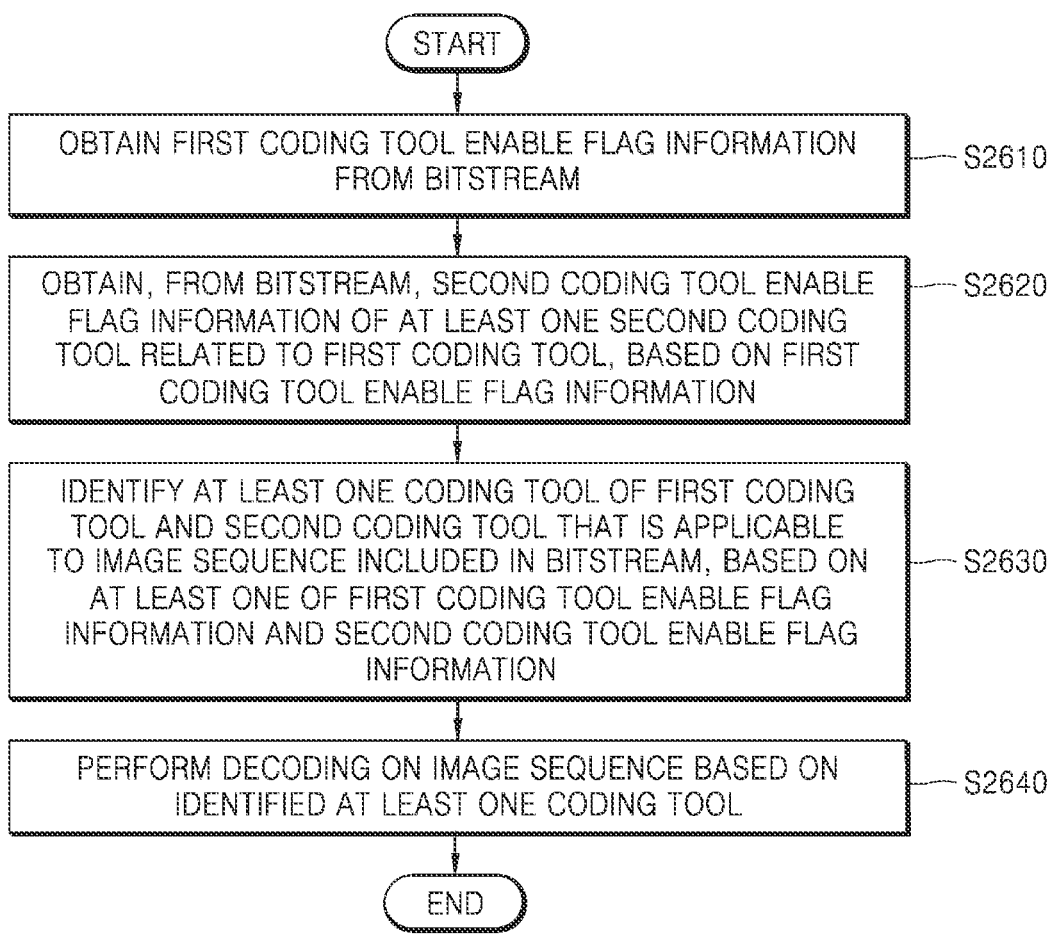
FIG. 25 is a flowchart for describing an image decoding method according to an embodiment.

FIG. 25 is a flowchart for describing an image decoding method according to an embodiment.

In operation S2610, the image decoding apparatus 2000 may obtain first coding tool enable flag information of a first coding tool from a bitstream.

In operation S2620, the image decoding apparatus 2000 may obtain, from the bitstream, second coding tool enable flag information of at least one second coding tool related to the first coding tool, based on the first coding tool enable flag information.

In operation S2630, the image decoding apparatus 2000 may identify at least one coding tool of the first coding tool and the second coding tool which may be applied in an image sequence included in the bitstream, based on at least one of the first coding tool enable flag information and the second coding tool enable flag information.

In operation S2640, the image decoding apparatus 2000 reconstructs the image sequence based on the identified tool.

Figure 26:
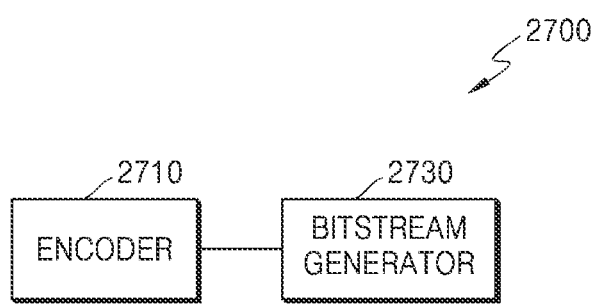
FIG. 26 is a block diagram illustrating components of an image encoding apparatus 2700 according to an embodiment.

FIG. 26 is a block diagram of components of an image encoding apparatus 2700 according to an embodiment.

Referring to FIG. 26, the image encoding apparatus 2700 may include an encoder 2710 and a bitstream generator 2730.

The encoder 2710 illustrated in FIG. 26 may correspond to the encoder 220 illustrated in FIG. 2, and the bitstream generator 2730 may correspond to the bitstream generator 210 illustrated in FIG. 2. Also, the encoder 2710 may correspond to the inter predictor 1905, the intra predictor 1910, the transformer 1920, the quantizer 1925, the inverse quantizer 1933, the inverse transformer 1935, the post-reconstruction filter 1940, and the in-loop filter 1945, and the bitstream generator 2730 may correspond to the entropy encoder 1930 illustrated in FIG. 19.

The encoder 2710 and the bitstream generator 2730 according to an embodiment may be implemented with at least one processor. The image encoding apparatus 2700 may include one or more memories (not shown) storing input and output data of the encoder 2710 and the bitstream generator 2730. Also, the image encoding apparatus 2700 may include a memory controller (not shown) controlling data inputting and outputting of the memories (not shown).

The encoder 2710 may encode an image sequence based on at least one coding tool from among a plurality of coding tools including a first coding tool and a second coding tool.

The encoder 2710 may generate at least one of first coding tool enable flag information indicating whether or not the first coding tool may be applied to the image sequence and second coding tool enable flag information indicating whether or not the second coding tool may be applied to the image sequence.

The bitstream generator 2730 may generate a bitstream including the image sequence data including syntax elements generated as a result of encoding and a sequence parameter set including at least one of the first coding tool enable flag information and the second coding tool enable flag information. Here, when a value of the first coding tool enable flag information is 1, the bitstream may include both of the first coding tool enable flag information and the second coding tool enable flag information, and when the value of the first coding tool enable flag information is 0, the bitstream may include the first coding tool enable flag information, but may not include the second coding tool enable flag information.

Figure 27:
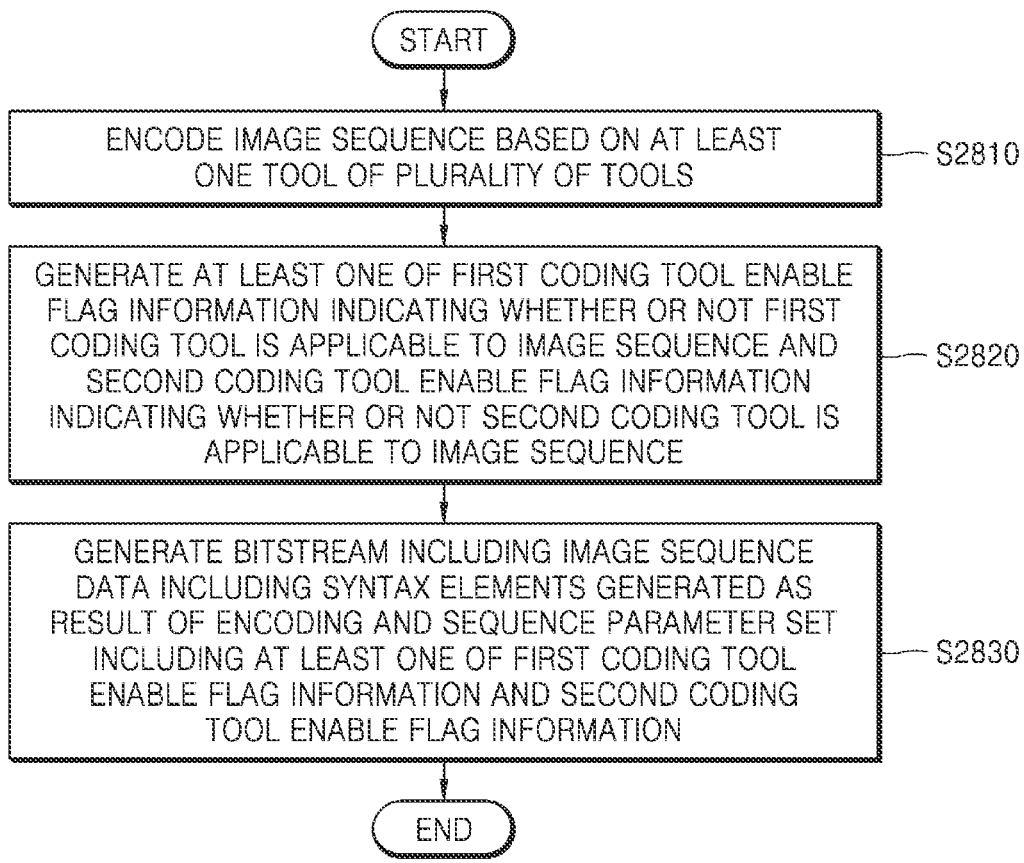
FIG. 27 is a flowchart for describing an image encoding method according to an embodiment.

FIG. 27 is a flowchart for describing an image encoding method according to an embodiment.

In operation S2810, the image encoding apparatus 2700 may encode an image sequence based on at least one tool from among a plurality of tools.

In operation S2820, the image encoding apparatus 2700 may identify at least one of a first coding tool and a second coding tool which may be applied to the image sequence included in a bitstream, based on at least one of first coding tool enable flag information and second coding tool enable flag information.

In operation S2830, the image encoding apparatus 2700 may generate the bitstream including image sequence data including syntax elements generated as a result of encoding and a sequence parameter set including at least one of the first coding tool enable flag information and the second coding tool enable flag information.

Meanwhile, the embodiments of the present disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the media include recording media and storage media managed by application stores distributing applications or by websites, servers, and the like supplying or distributing other various types of software.

While one or more embodiments of the present disclosure have been described with reference to the figures, it will be understood by those of ordinary skill in the art that various changes in form and details may be made therein without departing from the spirit and scope as defined by the following claims.

What is claimed is:

1. An image decoding method performed by an image decoding apparatus, the image decoding method comprising:
obtaining, from a sequence parameter set in a bitstream, extended intra prediction flag information, indicating whether or not an extended intra prediction mode is applied to an image sequence;

when the extended intra prediction flag information indicates that the extended intra prediction mode is applied to the image sequence, obtaining, from the sequence parameter set in the bitstream intra block copy enable flag information related to whether or not an intra block copy mode is applicable to the image sequence;

obtaining, from the sequence parameter set in the bitstream, context modeling flag information indicating whether or not context modeling and initialization processes are applied to the image sequence;

when the context modeling flag information indicates that the context modeling and initialization processes are applied to the image sequence, obtaining, from the sequence parameter set in the bitstream, advanced residual coding flag information related to which of advanced residual coding or run-length based residual coding is applied to the image sequence;

when the context modeling flag information indicates that the context modeling and initialization processes are not applied to the image sequence, determining the run-length based residual coding is applied to the image sequence without obtaining the advanced residual coding flag information from the bitstream;

identifying whether the intra block copy mode is applied to the block included in the image sequence, based on the intra block copy enable flag information; and performing decoding on the block using the extended intra prediction mode when the extended intra prediction mode is applied to the block and the intra block copy mode is not applied to the block, or performing decoding on the block using or the intra block copy mode when the intra block copy mode is applied to the block.

2. An image decoding apparatus comprising at least one processor configured to:
  obtain, from a sequence parameter set in a bitstream, extended intra prediction flag information, indicating whether or not an extended intra prediction mode is applied to an image sequence;
  when the extended intra prediction flag information indicates that the extended intra prediction mode is applied to the image sequence, obtain, from the sequence parameter set in the bitstream, intra block copy enable flag information related to whether or not an intra block copy mode is applicable to the image sequence;
  obtain, from the sequence parameter set in the bitstream, context modeling flag information, indicating whether or not context modeling and initialization processes are applied to the image sequence;
  when the context modeling flag information indicates that the context modeling and initialization processes are applied to the image sequence, obtain, from the sequence parameter set in the bitstream, advanced residual coding flag information related to which of advanced residual coding or run-length based residual coding is applied to the image sequence;
  when the context modeling flag information indicates that the context modeling and initialization processes are not applied to the image sequence, determine the run-length based residual coding is applied to the image sequence without obtaining the advanced residual coding flag information from the bitstream;
  identify whether the intra block copy mode is applied to the block included in the image sequence, based on the intra block copy enable flag information, and
  performing decoding on the block using the extended intra prediction mode when the extended intra prediction mode is applied to the block and the intra block copy mode is not applied to the block, or performing decoding on the block using the intra block copy mode when the intra block copy mode is applied to the block.

3. An image encoding method performed by an image encoding apparatus, the image encoding method comprising:
  encoding an image sequence based on at least one coding tool from among a plurality of coding tools comprising an extended intra prediction mode, an intra block copy mode, context modeling and initialization processes, advanced residual coding or run-length based residual coding;
  generating at least one of extended intra prediction flag information indicating whether or not the extended intra prediction mode is to be applied to the image sequence, intra block copy enable flag information indicating whether or not the intra block copy mode is to be applicable to the image sequence, context modeling flag information indicating whether or not context modeling and initialization processes are applied to the image sequence, and advanced residual coding flag information related to which of advanced residual coding or run-length based residual coding is applied to the image sequence; and
  generating a bitstream comprising image sequence data that comprises syntax elements generated as a result of the encoding, and a sequence parameter set comprising at least one of the extended intra prediction flag information, the intra block copy enable flag information, context modeling flag information, and advanced residual coding flag information,
  wherein, when a value of the extended intra prediction flag information is 1, the bitstream comprises both of the extended intra prediction flag information and the intra block copy enable flag information, and when the value of the extended intra prediction flag information is 0, the bitstream comprises the extended intra prediction flag information and does not comprise the intra block copy enable flag information,
  wherein, when a value of the context modeling flag information is 1, the bitstream comprises both of the context modeling flag information and the advanced residual coding flag information, and when the value of the context modeling flag information is 0, the bitstream comprises the context modeling flag information and does not comprise the advanced residual coding flag information.

4. A method for transmitting a bitstream by an image encoding apparatus, the method comprising:
  encoding an image sequence based on at least one coding tool from among a plurality of coding tools comprising extended intra prediction mode, intra block copy mode, context modeling and initialization processes, advanced residual coding or run-length based residual coding;
  generating at least one of extended intra prediction flag information indicating whether or not the extended intra prediction mode is to be applied to the image sequence, intra block copy enable flag information indicating whether or not the intra block copy mode is to be applicable to the image sequence, context modeling flag information indicating whether or not context modeling and initialization processes are applied to the image sequence, and advanced residual coding flag information related to which of advanced residual coding or run-length based residual coding is applied to the image sequence;
generating the bitstream comprising image sequence data that comprises syntax elements generated as a result of the encoding, and a sequence parameter set comprising at least one of the extended intra prediction flag information, the intra block copy enable flag information, context modeling flag information, and advanced residual coding flag information; and
transmitting the bitstream to an image decoding apparatus,
wherein, when a value of the extended intra prediction flag information is 1, the bitstream comprises both of the extended intra prediction flag information and the intra block copy enable flag information, and when the value of the extended intra prediction flag information is 0, the bitstream comprises the extended intra prediction flag information and does not comprise the intra block copy enable flag information,
wherein, when a value of the context modeling flag information is 1, the bitstream comprises both of the context modeling flag information and the advanced residual coding flag information, and when the value of the context modeling flag information is 0, the bitstream comprises the context modeling flag information and does not comprise the advanced residual coding flag information.

* * * * *